(12) United States Patent
Iwaki et al.

(10) Patent No.: US 8,381,853 B2
(45) Date of Patent: Feb. 26, 2013

(54) ELECTRIC VEHICLE

(75) Inventors: Koji Iwaki, Hyogo (JP); Kazunari Koga, Hyogo (JP); Kengo Sasahara, Hyogo (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 256 days.

(21) Appl. No.: 12/971,687

(22) Filed: Dec. 17, 2010

(65) Prior Publication Data

US 2011/0155486 A1 Jun. 30, 2011

Related U.S. Application Data

(60) Provisional application No. 61/290,075, filed on Dec. 24, 2009.

(51) Int. Cl.
*B60W 10/04* (2006.01)
(52) U.S. Cl. .................. 180/65.285; 318/139; 318/134; 318/132; 180/165
(58) Field of Classification Search ............... 180/65.1, 180/65.21, 65.31, 65.265, 65.27, 65.285, 180/65.29, 165; 318/34, 132, 134, 139
See application file for complete search history.

(56) References Cited

U.S. PATENT DOCUMENTS

| | | | | |
|---|---|---|---|---|
| 5,186,286 A * | 2/1993 | Lindberg | ...................... | 188/171 |
| 5,502,957 A | 4/1996 | Robertson | | |
| 6,044,941 A * | 4/2000 | Abend et al. | ................. | 192/13 R |
| 6,260,645 B1 * | 7/2001 | Pawlowski et al. | ......... | 180/65.22 |
| 6,626,505 B2 * | 9/2003 | Frank et al. | ..................... | 303/15 |
| 6,634,446 B2 * | 10/2003 | Ima | .............................. | 180/24.1 |
| 7,008,025 B2 * | 3/2006 | McCann | .................. | 303/122.15 |
| 7,073,330 B1 | 7/2006 | Hauser | | |
| 7,332,881 B2 * | 2/2008 | Clark et al. | .................... | 318/139 |
| 7,742,852 B1 * | 6/2010 | Tang | ................................ | 701/22 |
| 8,186,488 B2 * | 5/2012 | Poertzgen | ..................... | 188/162 |
| 2001/0050188 A1 * | 12/2001 | Ima | ................................. | 180/22 |
| 2003/0146035 A1 | 8/2003 | Satou et al. | | |
| 2004/0000130 A1 * | 1/2004 | Bartel | ............................ | 56/11.3 |
| 2011/0155486 A1 * | 6/2011 | Iwaki et al. | .................. | 180/65.1 |

FOREIGN PATENT DOCUMENTS

| | | |
|---|---|---|
| DE | 19841828 A1 | 3/2000 |
| EP | 1985487 A2 | 10/2008 |
| JP | 2002-178896 A | 6/2002 |
| WO | 98/37614 | 8/1998 |

OTHER PUBLICATIONS

European Search Report for EP Patent Application No. 10193483 mailed May 13, 2011.

* cited by examiner

*Primary Examiner* — John Walters
*Assistant Examiner* — James Triggs
(74) *Attorney, Agent, or Firm* — Cantor Colburn LLP

(57) ABSTRACT

An electric vehicle comprising a drive wheel which is driven by a traction electric motor, a brake command device, a brake releasing unit, a brake shaft, a friction plate, and a braking spring. The brake shaft is rotatable in a brake realizing direction which is one direction by an operation of the brake command device, and is rotatable in a brake releasing direction which is the other direction by driving of the brake releasing unit. The friction plate is operatively connected to the traction electric motor, and is frictionally braked when the brake shaft is rotated in the brake realizing direction. The braking spring applies an elastic force to the brake shaft in a direction to rotate the brake shaft in the brake realizing direction.

6 Claims, 27 Drawing Sheets

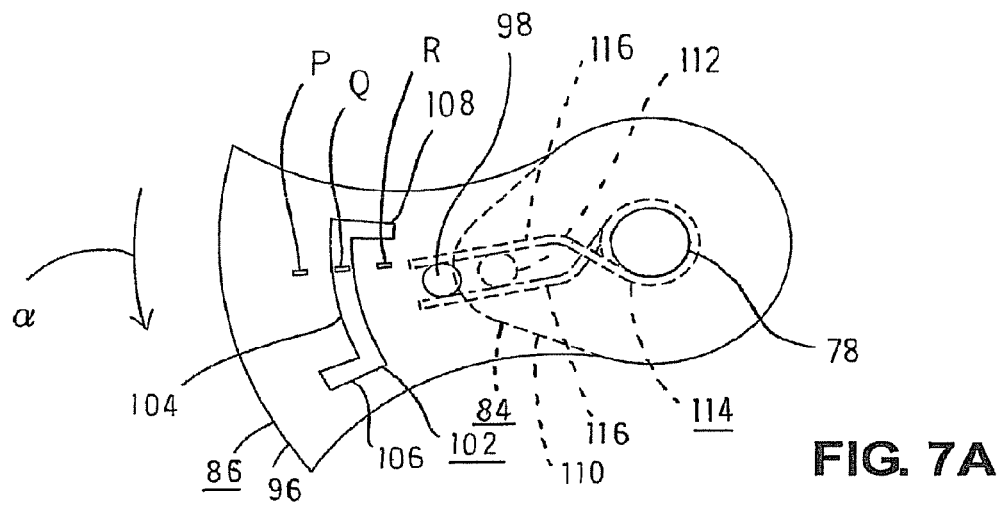
FIG. 7A
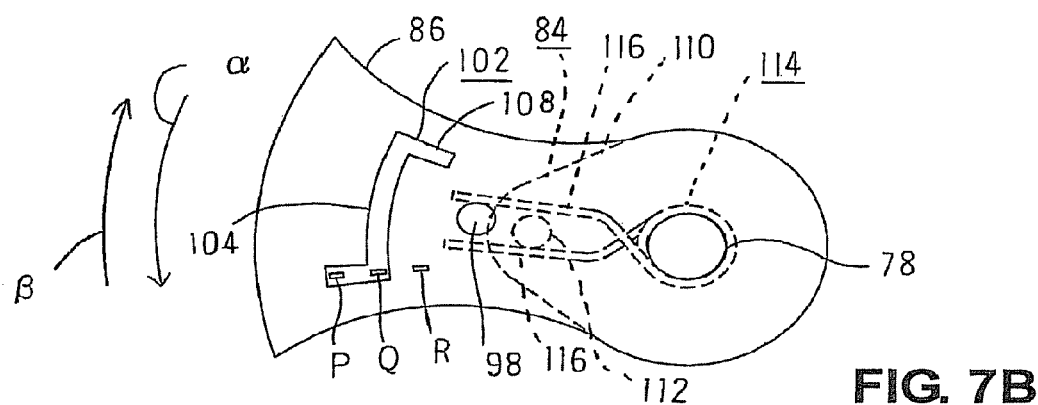
FIG. 7B
FIG. 7C

ELECTRIC VEHICLE

This application claims the benefit of U.S. Provisional Application No. 61/290,075, filed Dec. 24, 2009, the entire disclosure of which is incorporated by reference herein.

BACKGROUND

1. Technical Field

The present invention relates to a electric vehicle having a drive wheel which is driven by a traction electric motor, a brake command device which can be operated by a driver, a brake releasing unit which is driven by supplying electricity, a brake shaft, and a friction plate.

2. Related Art

In the related art, a motor-driven structure in which a drive wheel which is a vehicle wheel is driven by a traction electric motor is considered in vehicles such as ground work vehicles having working machines driven for ground work such as lawn mowing and tilling, carriage vehicles such as golf carts used in golf courses, and service vehicles for transporting a plurality of passengers. A electric vehicle which is a vehicle driven by an electric motor is considered to be effective in view of energy conservation and environmental protection.

For example, as the ground work vehicle, a lawnmower vehicle is known which is equipped with a lawn mower which is the working machine, in which a worker rides on the vehicle and executes running of the vehicle and operation of the lawn mowing on the vehicle, and which is capable of self-running, and is called a ride-on lawnmower vehicle. As the lawn mower, for example, a lawn mowing rotary tool or the like is known. As the ride-on lawnmower vehicle, a structure may be considered which comprises a hydraulic pump which is driven by an engine, a hydraulic motor which is driven by the hydraulic pump, a drive wheel which is driven by the hydraulic motor, a motive power transmitting mechanism which transmits a motive power between the hydraulic motor and a drive wheel, a brake pedal which is a brake command device which can be operated by a driver, and a braking mechanism which blocks transmission of motive power from the hydraulic motor to the drive wheel by the motive power transmitting mechanism and brakes the drive wheel based on an operation of the brake pedal.

During the operation of such a lawnmower vehicle, when the driver operates on, that is, depresses the accelerator pedal which is an acceleration command device, the hydraulic motor is driven and the drive wheel is driven. When the accelerator pedal is put on a non-operation state, that is, an OFF state, or the amount of depression of the accelerator pedal becomes 0, the amount of exhaust of the hydraulic pump becomes 0 and a braking force is applied on the hydraulic motor, resulting in braking of the drive wheel. In addition, when a large braking force is required such as a case when the vehicle is to be stopped on an inclined surface or a case when rapid braking is required, the driver depresses the brake pedal such that the braking mechanism is actuated and the drive wheel is braked.

If, on the other hand, an electric motor can be used in place of the hydraulic motor in this lawnmower vehicle, the equipment of the engine and the hydraulic pump in the vehicle becomes unnecessary, and there is a possibility that the space can be conserved and the energy can be conserved. However, a simple replacement of the hydraulic motor with the electric motor would result in a behavior of the vehicle different from that in the case of the hydraulic motor driven vehicle when supply of electricity to the electric motor is stopped, and consequently, an uncomfortable feeling for the crew.

For example, when the wheel is driven by the driving of the hydraulic motor, even when the engine is stopped and the supply of hydraulic pressure to the hydraulic motor is stopped, a braking force is generated by the hydraulic motor during running of the vehicle by the resistance of the oil in the hydraulic motor. In addition, even when the vehicle is parked on a slope, the engine is stopped, and the operation of the hydraulic motor is stopped, the oil in the hydraulic motor causes a resistance, and the vehicle does not tend to slip downhill on the slope. Even if the vehicle slips downhill on the slope, the vehicle can be stopped by the driver depressing the brake pedal or operating a side brake for maintaining the braked state of the drive wheel. However, the vehicle slipping significantly downhill during non-operation of the brake pedal or side brake is not preferred because an uncomfortable feeling may be caused for the driver.

On the other hand, if the hydraulic motor is replaced with the electric motor in the hydraulic motor driven vehicle described above without any special consideration, there is a possibility that the vehicle can be driven by the driving force of the electric motor and that that the drive wheel can be braked by operating on the brake pedal during braking. However, when the supply of electricity to the electric motor is stopped by, for example, switching the main power supply switch OFF or a sudden failure of a circuit including the power supply, unlike the hydraulic motor driven vehicle, the electric motor does not become a resistance, and the braking force would not act during the running of the vehicle. Because of this, when the brake pedal is not operated, the vehicle continues to run by inertia. In addition, when the power supply switch is switched OFF in a state where the vehicle is parked on a slope, because the supply of electricity to the electric motor is stopped, there is a possibility that the vehicle will slip downhill during the non-operation of the brake pedal or the side brake. Thus, there is a possibility that simple replacement of the hydraulic motor with the electric motor may cause an uncomfortable feeling for the driver with regard to the behavior of the vehicle.

JP 2002-178896 A discloses a golf cart comprising an engine, front wheels and rear wheels, and a transmission case for transmitting motive power from the engine to the rear wheels. In this golf cart, the four wheels including the front and rear wheels can be simultaneously braked by two systems of a manual operation and an automatic control. In addition, a brake is applied by pressing a brake pad against a brake drum or a disc brake plate, and the brake pad is made to act in the braking direction by pulling of a brake cable. Moreover, a case with a built-in deceleration mechanism with a brake clutch is placed on an output side of the electric motor functioning as an automatic brake actuator, and an arm fixed on one of output shafts protruding from the case and a brake releasing arm are connected by an interference connection mechanism. A pipe for manual operation and a pipe for automatic operation are rotatably fitted on a main axle placed at a lower side of the vehicle and extending in a vehicle width direction. In a state where the motor is reversely rotated for a certain amount, the pipe for manual operation is rotated in the counterclockwise direction by a biasing force of a biasing spring, and all of the front and rear wheels are braked. On the other hand, when the motor is normally rotated and the arm is rotated in the counterclockwise direction, the pipe for automatic operation is rotated in the clockwise direction against the biasing force of the biasing spring and the pipe for manual operation is rotated in the clockwise direction, resulting in releasing of the braking of the front and rear wheels. When the main switch of the golf cart is in the OFF state, an electromagnetic solenoid is switched OFF, the brake clutch is disconnected, the force from the electric motor does not act on the output shaft, and the output shaft becomes free. Consequently, the braking force acts on the front and rear wheels due to the biasing spring, and the parked state of the vehicle is maintained.

In the case of such a golf cart as described in JP 2002-178896 A, because the wheel is driven by the engine, when the engine is stopped during running, if the motive power transmitting mechanism which transmits the motive power from the engine to the wheel is connected, the braking force would act on the wheel. In addition, even when the engine is stopped during parking of the vehicle on a slope, if the motive power transmitting mechanism is connected, downhill slipping of the vehicle can be prevented. Such a reference does not disclose a structure for reducing the uncomfortable feeling for the driver with regard to the behavior of the vehicle when supply of electricity is stopped in a electric vehicle in which the drive wheel is driven with the traction electric motor.

SUMMARY

Under the above-described circumstances, the present inventors have conceived a structure for reducing the uncomfortable feeling for the driver with regard to the behavior of the vehicle when supply of electricity is stopped in a electric vehicle in which the drive wheel is driven with a traction electric motor.

An advantage of the present invention is that and uncomfortable feeling for a driver with regard to the behavior of the vehicle when supply of electricity is stopped is reduced in a structure, in a electric vehicle, in which the drive wheel is driven with a traction electric motor.

According to a first aspect of the present invention, there is provided a electric vehicle comprising a drive wheel which is driven by a traction electric motor, a brake command device which can be operated by a driver, a brake releasing unit which is driven by supply of electricity, a brake shaft which can be rotated in two directions, wherein the brake shaft is rotatable in a brake realizing direction which is one of the two directions by an operation of the brake command device, and rotatable in a brake releasing direction which is the other one of the two directions by driving of the brake releasing unit, a friction plate which is operatively connected to the traction electric motor and which is frictionally braked when the brake shaft is rotated in the brake realizing direction, and a braking spring which applies an elastic force to the brake shaft in a direction to rotate the brake shaft in the brake realizing direction, wherein the brake releasing unit comprises a brake releasing motor which is driven by supply of electricity, a displacement member which is displaced by driving of the brake releasing motor, and a displacement permitting spring provided between the displacement member and the brake shaft, and which permits an elastic relative displacement between the displacement member and the brake shaft and applies an elastic force to the brake shaft in a direction to maintain a relative position between the brake shaft and the displacement permitting spring or the displacement member, and the brake releasing motor rotates the brake shaft against the elastic force of the braking spring in the brake releasing direction through the displacement member and the displacement permitting spring.

According to the electric vehicle of the present invention, in a structure in which the drive wheel is driven by a traction electric motor, the uncomfortable feeling for the driver with regard to the behavior of the vehicle when supply of electricity is stopped can be reduced. Specifically, when the supply of electricity to the traction electric motor is stopped, the brake shaft is rotated in the brake realizing direction by the braking spring and the drive wheel is braked. In addition, during the normal running, because the brake can be released by the driving of the brake releasing motor, there is no problem with regard to running. Moreover, when a brake command device such as a brake pedal is operated, the vehicle can be normally braked. Because of this, with the above-described stopping of the supply of electricity, the braking force is generated during the running of the vehicle, and when the vehicle is parked on a slope, even when the brake command device and the parking brake command device are not operated, the downhill slipping of the vehicle on the slope can be prevented. Because of this, the behavior of the vehicle becomes similar to that of the vehicle in which the wheel is driven by driving of the hydraulic motor. Therefore, the uncomfortable feeling for the driver can be reduced.

According to another aspect of the present invention, it is preferable that the electric vehicle further comprises a protection unit which protects the brake releasing motor.

According to the above-described configuration, endurance of the brake releasing motor can be improved and the reliability can be improved.

According to another aspect of the present invention, it is preferable that, in the electric vehicle, the protection unit comprises an actuator which is provided in the brake releasing unit, which is driven by supply of electricity in a state where the brake shaft is rotated by a predetermined angle which is set in advance in the brake releasing direction, to disable the displacement of the displacement member, and which, with stopping of the supply of electricity, enables the displacement of the displacement member and permits rotation of the brake shaft in the brake realizing direction by the braking spring.

According to the above-described configuration, an actuator which can reduce power consumption compared to the brake releasing motor is driven when the brake is released and driving of the brake releasing motor can be stopped, and thus it is not necessary to continue driving the brake releasing motor, and disadvantages such as burn-out of the brake releasing motor can be more effectively prevented. Because of this, the endurance of the brake releasing motor can be improved and the reliability can be improved. In addition, the power consumption at the time of brake release can be reduced.

According to another aspect of the present invention, it is preferable that, in the electric vehicle, the protection unit comprises an input current varying mechanism which is provided in the brake releasing unit, and which reduces a current which is input to the brake releasing motor as an amount of displacement is increased when the displacement member is displaced in the brake releasing direction.

According to the above-described configuration, the current which continues to be applied to the brake releasing motor can be reduced. Because of this, it is possible to effectively prevent disadvantages such as burn-out of the brake releasing motor. Therefore, the endurance of the brake releasing motor can be improved and the reliability can be improved. In addition, the power consumption at the time of brake release can be reduced.

According to another aspect of the present invention, it is preferable that, in the electric vehicle, the protection unit comprises an operative connection mechanism, a lock-type one-way clutch, and an electromagnetic clutch provided in the brake releasing unit, the operative connection mechanism is provided between a rotational shaft of the brake releasing motor and the displacement member and operatively connects the rotational shaft and the displacement member, the lock-type one-way clutch is provided in the operative connection mechanism, transmits a rotational force by driving of the brake releasing motor to the side of the displacement member, and blocks transmission of a rotational force from the side of the displacement member to the brake releasing motor by locking or stopping the rotation of a rotational member on the side of the displacement member, and the electromagnetic clutch is provided in the operative connection mechanism, enables transmission of motive power between the side of the brake releasing motor and the side of the displacement member when electricity is supplied, and blocks the transmission of motive power between the side of the brake releasing motor and the side of the displacement member when the supply of electricity is stopped.

According to the above-described configuration, because supply of electricity of the brake releasing motor can be stopped in the brake release state, it is possible to more effectively prevent disadvantages such as burn-out of the brake releasing motor. Therefore, the endurance of the brake releasing motor can be improved and the reliability can be improved. In addition, power consumption at the time of brake release can be reduced.

According to a second aspect of the present invention, there is provided a electric vehicle comprising a drive wheel which is driven by a traction electric motor, a brake command device which can be operated by a driver, a brake releasing unit which is driven by supply of electricity, a brake shaft which can be rotated in two directions, wherein the brake shaft is rotatable in a brake realizing direction which is one of the two directions by an operation of the brake command device, and a friction plate which is operatively connected to the traction electric motor and which is frictionally braked when the brake shaft is rotated in the brake realizing direction, wherein the brake releasing unit comprises an electromagnetic brake or a link-type actuator which is driven by supply of electricity and enables free rotation of a rotational shaft of the traction electric motor or of a coupled rotational member which is rotated in a coupled manner with the rotational shaft of the traction electric motor, and the driving of which is stopped by stopping of the supply of electricity, to block the rotation of the rotational shaft of the traction electric motor or the rotation of the coupled rotational member, or a short-circuiting brake device which short-circuits intermediate points of phase arms of an inverter which drives the traction electric motor.

According to the electric vehicle of the second aspect of the present invention, uncomfortable feeling for the driver with regard to the behavior of the vehicle when supply of electricity is stopped can be reduced in a structure in which the drive wheel is driven by the traction electric motor. In other words, with the stopping of the supply of electricity as described above, the braking force is generated during running of the vehicle, and when the vehicle is parked on a slope, even when the brake command device such as a brake pedal or a parking brake command device is not operated, the downhill slipping of the vehicle on the slope is prevented. Because of this, the behavior of the vehicle becomes similar to that in the case of a vehicle in which the wheel is driven by the driving of the hydraulic motor. Therefore, the uncomfortable feeling for the driver can be reduced.

As described, according to the electric vehicle of various aspects of the present invention, the uncomfortable feeling for the driver with regard to the behavior of the vehicle when supply of electricity is stopped can be reduced in a structure in which the drive wheel is driven by the traction electric motor.

BRIEF DESCRIPTION OF THE DRAWINGS

FIG. 7A is a diagram showing rotation of a brake shaft in a brake realizing direction by a braking spring when the power supply is in an OFF state, and a diagram in which a brake shaft side rotational shaft, a swinging arm, a displacement permitting spring, and a loose-fit arm are taken out of FIG. 5 and viewed from top toward the bottom.

FIG. 7B is a diagram related to FIG. 7A and showing rotation of the brake shaft in a brake releasing direction by driving of a brake releasing motor when the power supply is in an ON state.

FIG. 7C is a diagram related to FIG. 7A and showing rotation of the brake shaft in the brake realizing direction by an operation of a brake pedal when the power supply is in the ON state.

DESCRIPTION OF EMBODIMENTS OF THE PRESENT INVENTION

[First Embodiment]

Figure 1:
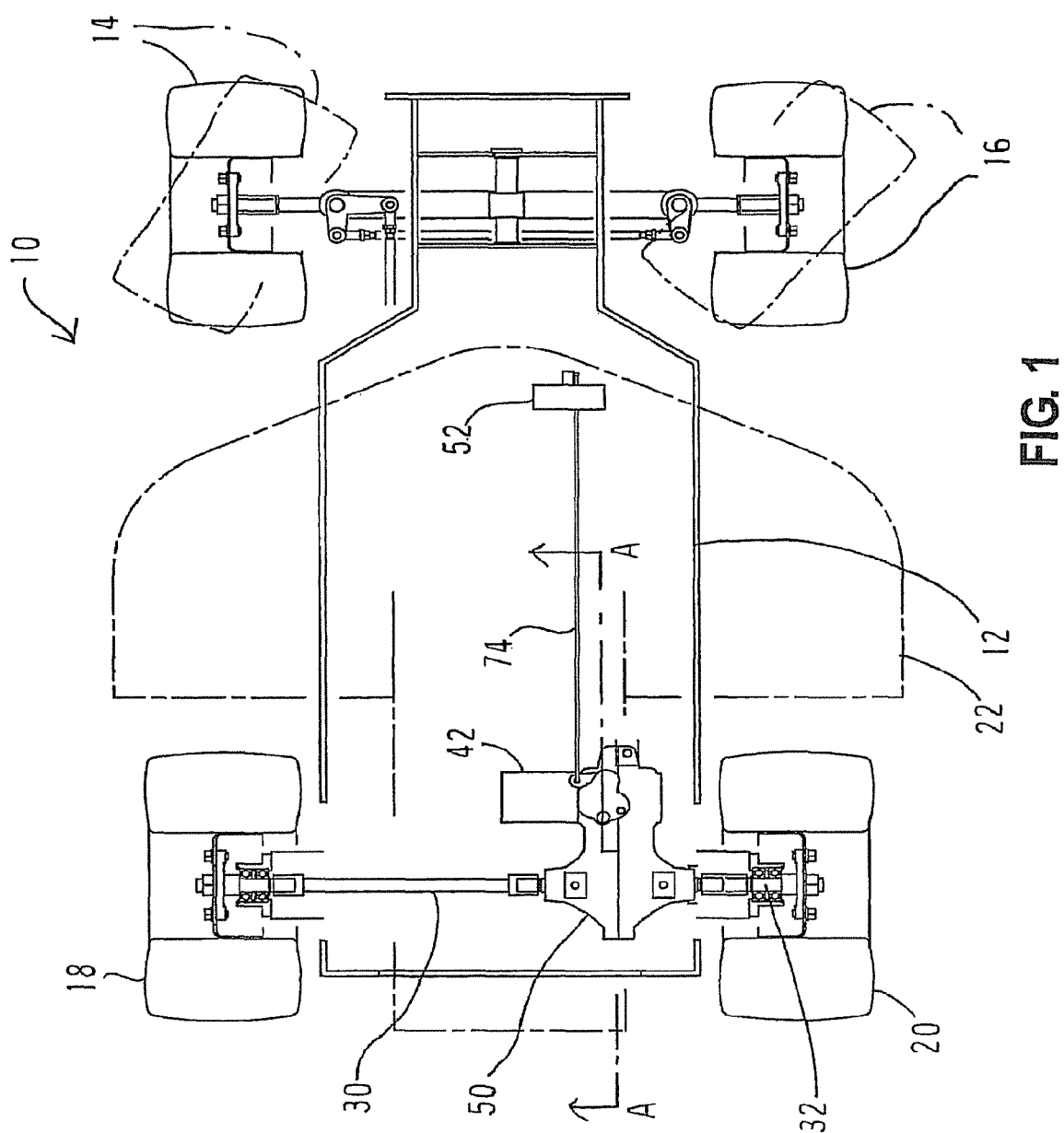
FIG. 1 is a diagram schematically showing a structure of a lawnmower vehicle which is a electric vehicle according to a first embodiment of the present invention.

Embodiments of the present invention will now be described with reference to the drawings. FIGS. 1 through 10 are diagrams showing a first embodiment of the present invention. In the following, the present invention will be described with reference to a case where the present invention is applied to a lawnmower vehicle which is a electric vehicle, but the electric vehicle is not limited to a lawnmower vehicle, and the present invention can be applied to various vehicles in which a wheel is driven by an electric motor. For example, the electric vehicle may be any vehicle in which the wheel is driven by the electric motor other than the lawnmower vehicle, such as ground work vehicles having working machines such as a tiller which are driven for groundwork such as tilling, carriage vehicles such as golf carts used in golf courses, and service vehicles which transport a plurality of passengers. In addition, a drive wheel to be driven by the electric motor is described as the rear wheel, but the drive wheel may alternatively be all wheels including the front and rear wheels. Moreover, a drive source of a lawn mower which is a part of the lawnmower vehicle may be an electric motor, a hydraulic motor, or an internal combustion engine. When the drive source is the internal combustion engine, the lawn mower and the internal combustion engine are connected through a motive power transmitting mechanism.

The electric motor is described as having functions to receive supply of electricity and to output a rotational driving force to a wheel, but the present invention is not limited to such a configuration, and alternatively, an electric motor having a function of a generator which recovers regenerative energy when the wheel is braked may be used.

Moreover, because the lawnmower vehicle to be described below is not equipped with an engine or a generator, and electricity from a power supply unit is supplied to the electric motor, the equipment space for the engine or the like may be reduced. As the power supply unit, a secondary battery which receives supply of charged electricity from outside may be used or a unit having a self-generating capability such as a fuel cell and a solar cell may be used with the secondary battery. An engine and a generator may be equipped in the lawnmower vehicle to be described below, to realize a hybrid-type lawnmower vehicle. In this case, the generator is driven by the engine, the electricity generated by the generator is supplied to the secondary battery, and electricity is supplied from the secondary battery to the electric motor.

The lawnmower vehicle comprises a lawn-mowing blade type lawn mower having a rotational shaft perpendicular to the ground surface, having blades which are a plurality of lawn mowing rotary tools around the rotational shaft, and which cuts and mows lawn or the like by a rotation of the blades. The lawn mower can be switched between an operation state and a non-operation state by an operation of a mower switch provided at a periphery of a seat. The grass mowed by the lawn mower can be discharged to one side of the vehicle in the width direction. Alternatively, a grass collecting tank may be equipped on the lawnmower vehicle and connected to a deck which is a part of the lawn mower with a duct, and the grass mowed by the lawn mower may be collected in the grass collecting tank by driving of a blower provided in the duct. Alternatively, as the lawn mower, a lawn mowing reel type lawn mower may be used having, for example, a screw-shaped blade on a cylinder having a rotational shaft parallel to the ground surface and which cuts and mows the lawn or the like.

The present embodiment will now be described with reference to the drawings. As shown in FIG. 1, in a lawnmower vehicle 10 which is a electric vehicle is a self-running, off-the-road vehicle suitable for lawn mowing, left and right wheels 14 and 16 which are steering control wheels and front wheels are supported on a front (right side of FIG. 1) of a main frame 12, and left and right drive wheels 18 which are rear wheels are supported on a rear (left side in FIG. 1) of the main frame 12. In addition, a seat (not shown) on which a driver is seated is provided at an upper side of the main frame 12. Moreover, a lawn mower (mower) 22 which is a working machine is supported at a lower side of the main frame 12 and between the left and right wheels 14 and 16 and the left and right wheels 18 and 20. The lawnmower vehicle 10 comprises an Ackermann-type steering mechanism. Furthermore, a steering operation element (not shown) which is a turning command device operated by the driver during steering is provided in front of the seat. The steering operation element is, for example, a steering wheel having a circular or segmental circle shape, or a mono-lever having an approximate rod shape.

The steering operation element enables change of an orientation of axles connected to the left and right wheels 14 and 16 through a steering shaft, a rack-and-pinion mechanism, and a link mechanism. Because of this, the orientation of the left and right wheels 14 and 16 can be changed to a desired orientation by the driver rotating the steering operation element to the right or to the left. In FIG. 1, the left and right wheels 14 and 16 shown with a solid line represent a state of moving straight and the left and right wheels 14 and 16 shown with a dot-and-chain line represent a state where the orientation is changed to the right.

Figure 3:
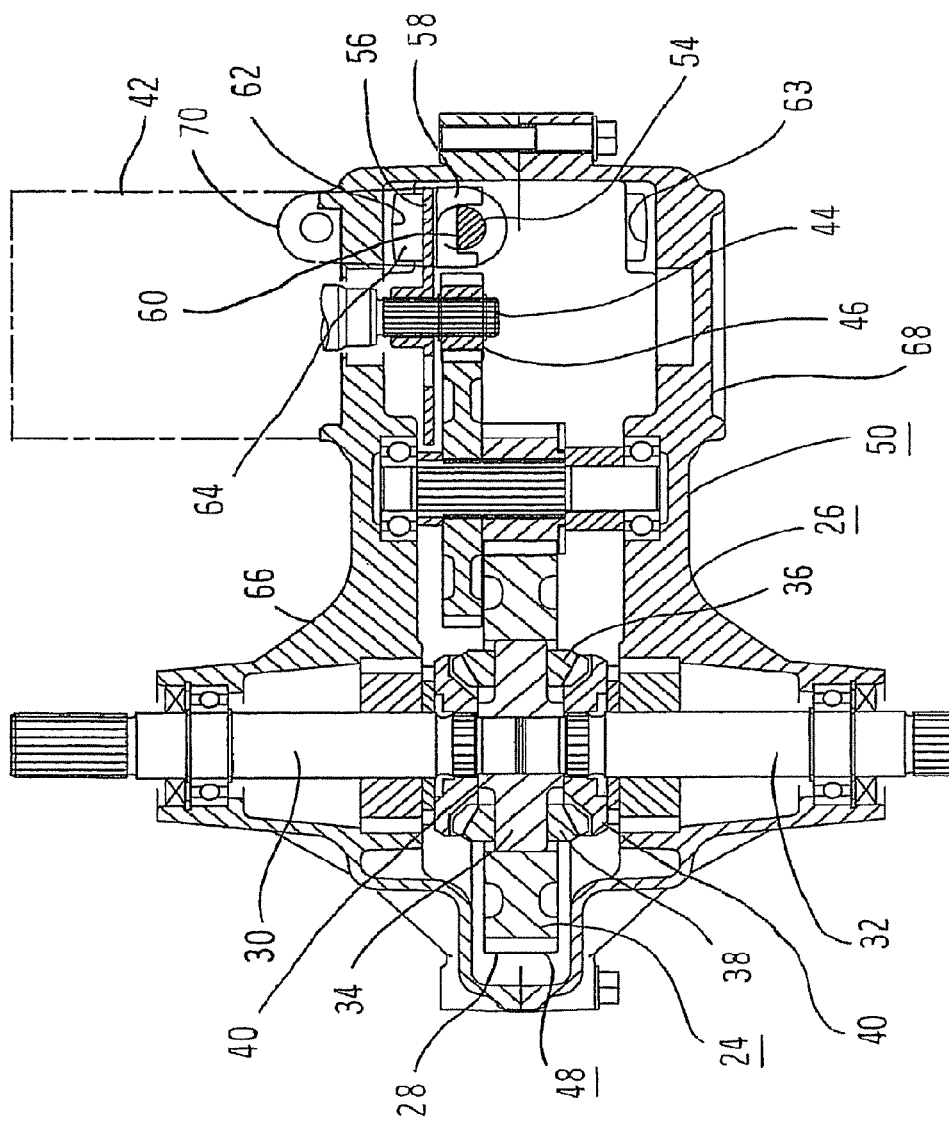
FIG. 3 is a B-B cross sectional view of FIG. 2.

Two axles 30 and 32 (FIG. 3) connected to the left and right drive wheels 18 and 20 are connected to a differential gear mechanism (differential mechanism) 24. That is, as shown in FIG. 3, the differential gear mechanism 24 is provided inside a gear housing 26 which is a gear package. The differential gear mechanism 24 comprises a ring gear 28 having an internal gear and an external gear, an inner support member 34 engaged with the inner side of the ring gear 28, two pinion gears 36 and 38 rotatably supported on shafts provided on both ends of the inner support member 34 in the radial direction, and two side gears 40 engaged with left and right sides of each of the pinion gears 36 and 38. One end of the axle 30 and one end of the axle 32 are connected to the corresponding side gears 40 so as to prohibit relative rotation. Intermediate portions of the two axles 30 and 32 are rotatably supported on the gear housing 26 by a bearing. When the ring gear 28 is rotated, the resistances of the left and right side gears 40 change according to the orientation of the vehicle, the side gears 40 are rotated with corresponding rotational speeds, and the left and right axles 30 and 32 are rotated, so that the left and right drive wheels 18 and 20 are driven.

A case which is a package of a traction electric motor 42 is connected to the gear housing 26, so that a motive power of the traction electric motor 42 is transmitted to the ring gear 28. Specifically, a rotational shaft 44 of the traction electric motor 42 is fixed to a gear which constitutes a gear mechanism 46 provided inside the gear housing 26. The gear mechanism 46 is constituted by engaging a plurality of gears, and allows transmission of rotation between the rotational shaft 44 of the traction electric motor 42 and the ring gear 28. In addition, a configuration is employed to transmit the rotation of the traction electric motor 42 to the ring gear 28 while reducing with the gear mechanism. In this manner, a motive power transmitting mechanism 48 including the differential gear mechanism 24 and the gear mechanism 46 is provided between the traction electric motor 42 and the axles 30 and 32, and stored in the gear housing 26, and the traction electric motor 42 is fixed on the gear housing 26, to form a motive power generating unit 50.

Driving of the traction electric motor 42 is controlled by a controller (not shown). The controller comprises a microcomputer having a CPU, a memory, etc. An accelerator pedal (not shown) is provided in front of the seat, an amount of depression which is the amount of operation of the accelerator pedal is detected by a pedal sensor, and a detection signal of the pedal sensor is input to the controller. The controller calculates a target torque or a target rotational speed based on the amount of operation of the accelerator pedal, and applies control to drive the traction electric motor 42 at the target torque or the target rotational speed. In addition, the traction electric motor 42 is a three-phase AC motor or the like. The controller also drives the traction electric motor 42 through a driving circuit (not shown) including an inverter (not shown).

Figure 2:
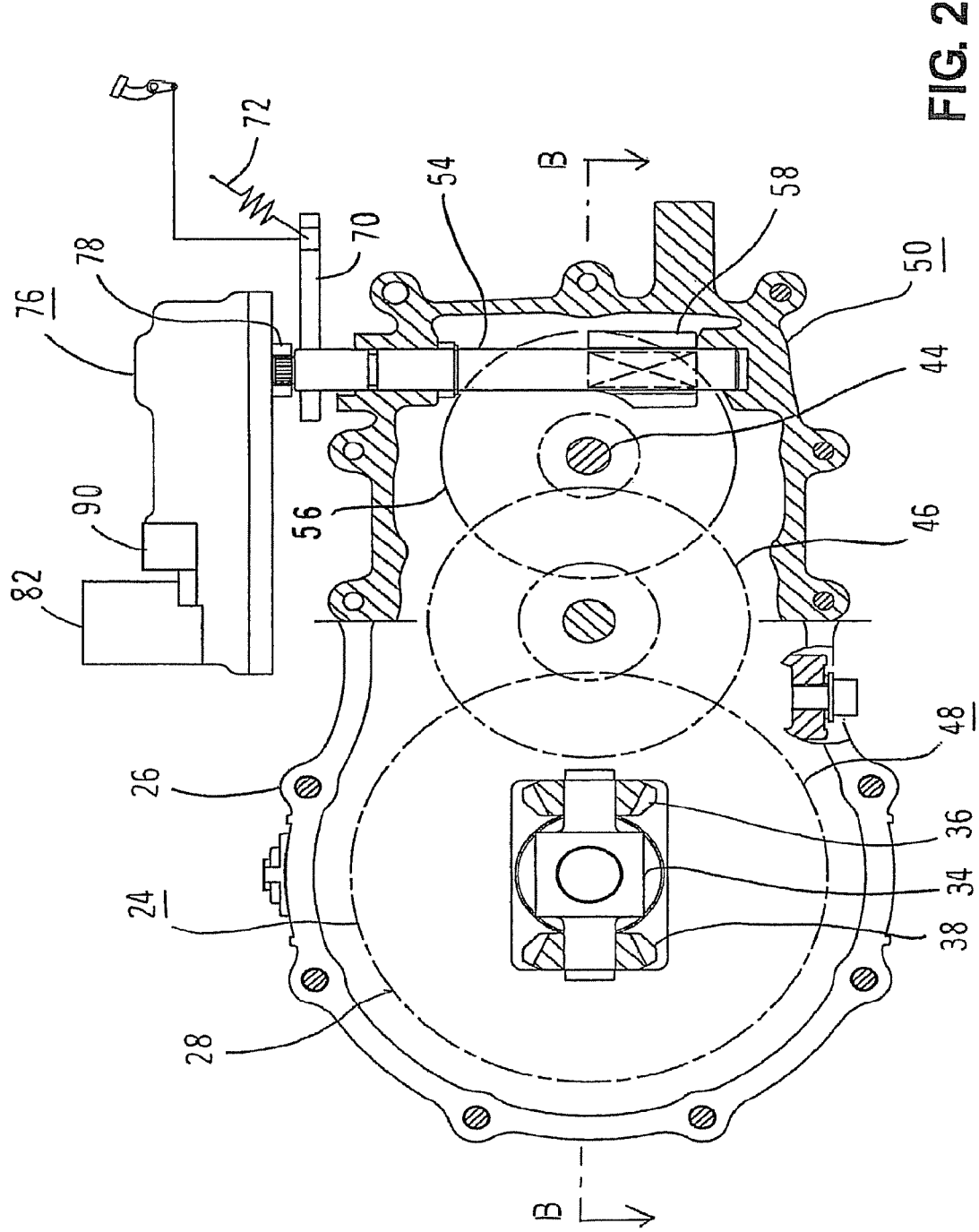
FIG. 2 is an A-A cross sectional view of FIG. 1.

In addition, a swinging type brake pedal 52 (refer to FIG. 1) which is a brake command device is provided in front of the seat. With the operation of the brake pedal 52, that is, depression of the brake pedal 52, the drive wheels 18 and 20 can be braked. In order to realize this function, as shown in FIG. 2, a brake shaft 54 is rotatably supported in front of the gear housing 26 (right side in FIG. 2) in the vertical direction (up and down direction in FIG. 2). As shown in FIG. 3, a disc-shaped friction plate 56 is connected to an end of the rotational shaft 44 of the traction electric motor 42 in a manner to prohibit relative rotation, and an intermediate portion of the brake shaft 54 is positioned on one side (surface of FIG. 2 and lower surface of FIG. 3) on the front of the friction plate 56. A brake shoe 56 is loosely engaged between the lower end of the brake shaft 54 and one side of the friction plate 56. As shown in FIG. 3, a portion of the brake shaft 54 opposing the brake shoe is a flat portion 60. Because of this, the brake shaft 54 has a segmental circle cross section in portions including the flat portion 60. In addition, a recess 62 is provided on an inner surface of the gear housing 26 at portions opposing the other side (surface of FIG. 2 and lower surface of FIG. 3) of the friction plate 56, and a second brake shoe 64 is held at an inside of the recess 62. The gear housing 26 is formed by combining, with a bolt, two housing elements 66 and 68 which have an approximately symmetric structure on the left and right. Because of this, the two housing elements 66 and 68 can be created from components that are made into the same shape, which results in reduction of the component cost. Thus, recesses 62 and 63 having the same shape are formed on both left and right sides at the inside of the gear housing 26, but the recess 63 on one side (lower side of FIG. 3) is not used. Therefore, in the case where the housing elements 66 and 68 are not created from the components of the same shape, one of the recesses, namely, the recess 63, may be omitted.

A brake arm 70 is fixed on a portion which protrudes toward the outside of the gear housing 26 at an upper end of the brake shaft 54. In addition, a braking spring 72 (FIG. 2) is provided between the brake arm 70 and the gear housing 26 or between the brake arm 70 and a fixed portion of the main frame 12, to apply an elastic force which is a biasing force by the braking spring 72 to rotate the brake shaft 54 in a brake realizing direction which is one direction. Moreover, a brake link 74 of a rigid body (FIG. 1) (or a brake cable) is provided between a tip of the brake arm 70 and a displacement member which is displaced by swinging of the brake pedal 52. The brake pedal 52 is supported in a manner to allow swinging by a shaft fixed to the vehicle body, and is maintained at a position swung to a direction opposite to the depression direction during a non-operation state, by a spring provided between the brake pedal 52 and the member fixed to the vehicle body. Because of this, when the brake pedal is displaced by swinging to the side of being depressed by depression of the brake pedal 52, the brake arm 70 is displaced in a swinging manner through the brake link 74 (or brake cable). For example, when the brake pedal 52 is depressed, the brake shaft 54 is rotated in the brake realizing direction through the brake arm 70. In this case, the flat portion 60 of the brake shaft 54 (FIG. 3) is inclined toward one side of the friction plate 56, the brake shoe 58 is pressed toward one side of the friction plate 56 to surface-contact the one side, the friction plate 56 is pinched between the brake shoe 58 and the second brake shoe 64, and the friction plate 56 is braked. In other words, by a cam mechanism between the brake shaft 54 and the brake shoe 58, the brake shoe 58 is pressed toward the friction plate 56 in response to the rotation of the brake shaft 54. The surface opposing the friction plate 56 on an inner surface of the recess 62 is formed in a partial cylindrical surface shape of an arc shape cross section, and the outer surface of the second brake shoe 64 opposing the partial cylindrical surface is also formed in a corresponding partial cylindrical surface shape. In addition, a width of the inner surface of the recess 62 in the front and rear direction is slightly larger than a width of the second brake shoe 64 in the front and rear direction. Because of this, even when the brake shaft 54 is rotated and a tendency occurs in which a strong force is applied from a part of the brake shoe 58 to the friction plate 56, the second brake shoe 64 is shifted inside the recess 62 along the partial cylindrical surface, to achieve uniform surface contact between the friction plate 56 and the brake shoe 58 and the friction plate 56 and the second brake shoe 64.

In addition, as shown in FIG. 2, a brake releasing unit 76 is provided at an upper side of the brake shaft 54, and an end of a brake shaft side rotational shaft 78 protruding at a lower side of the brake releasing unit 76 is fixed to the end of the brake shaft 54 through a spline engagement section, in a manner to prohibit relative rotation with respect to the brake shaft 54. The brake releasing unit 76 is fixed to the vehicle body, that is, the main frame 12, directly or through another member or other members.

Next, the structure of the brake releasing unit 76 will be described in detail with reference to FIGS. 4-8. As shown in FIG. 5, the brake releasing unit 76 comprises a housing 80 which is a brake release package, a brake releasing motor 82 which is an electric motor such as a DC motor, the brake shaft side rotational shaft 78 which is supported to be rotatable in a vertical direction on the housing 80, a swinging arm 84 fixed on the brake shaft side rotational shaft 78 by the spline engagement section in a manner to prohibit relative rotation, a loose-fit arm 86 which is a displacement member loose-fit-supported on the brake shaft side rotational shaft 78, a gear mechanism 88 which is an operative connection mechanism and a motive power transmitting mechanism provided between the brake releasing motor 82 and the loose-fit arm 86, and a solenoid 90 (FIG. 6 or the like) which is an actuator constituting a protection unit.

Figure 4:
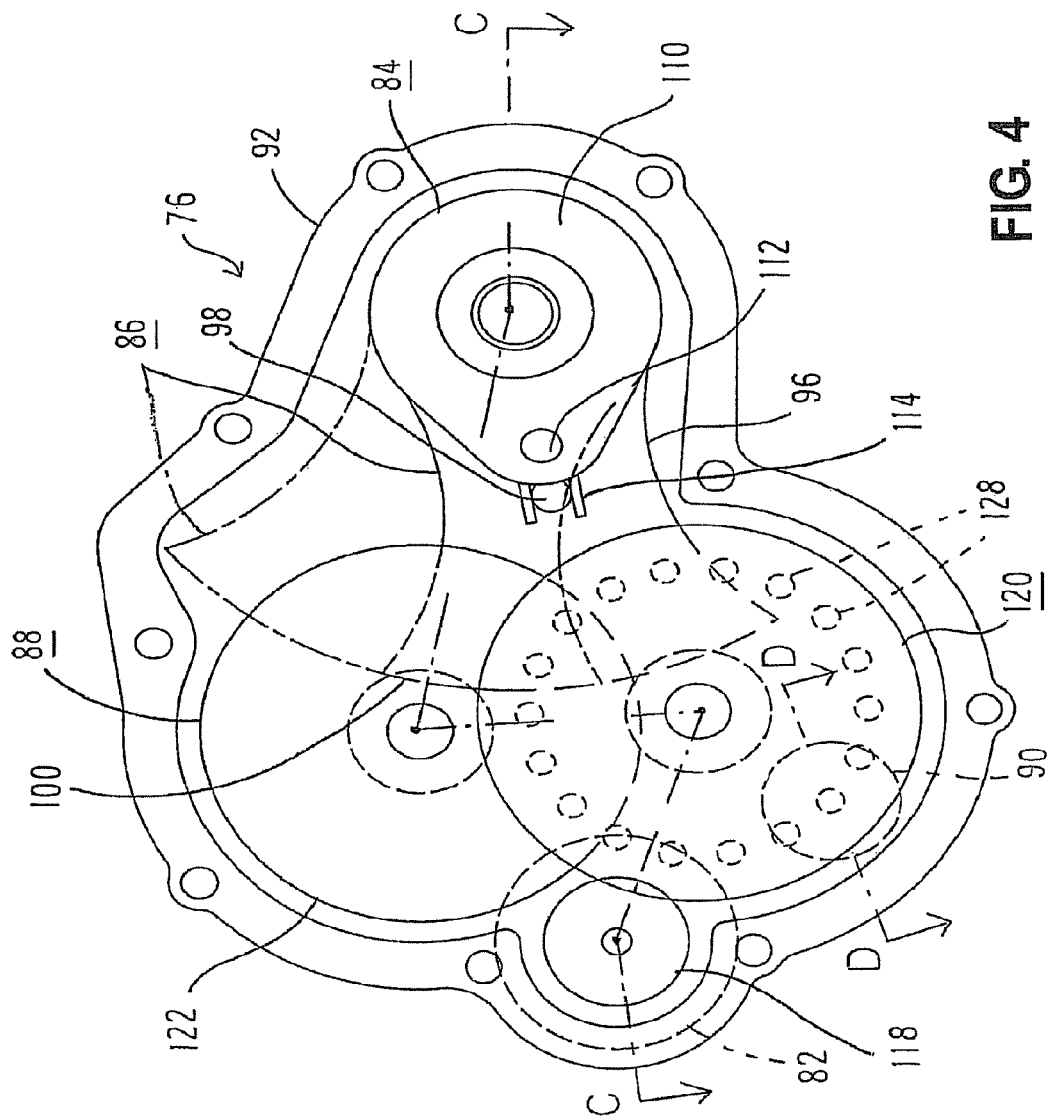
FIG. 4 is a diagram showing a brake releasing unit from which a lower cover is removed and with a part of the structure omitted, viewed from the bottom toward the top.
Figure 5:
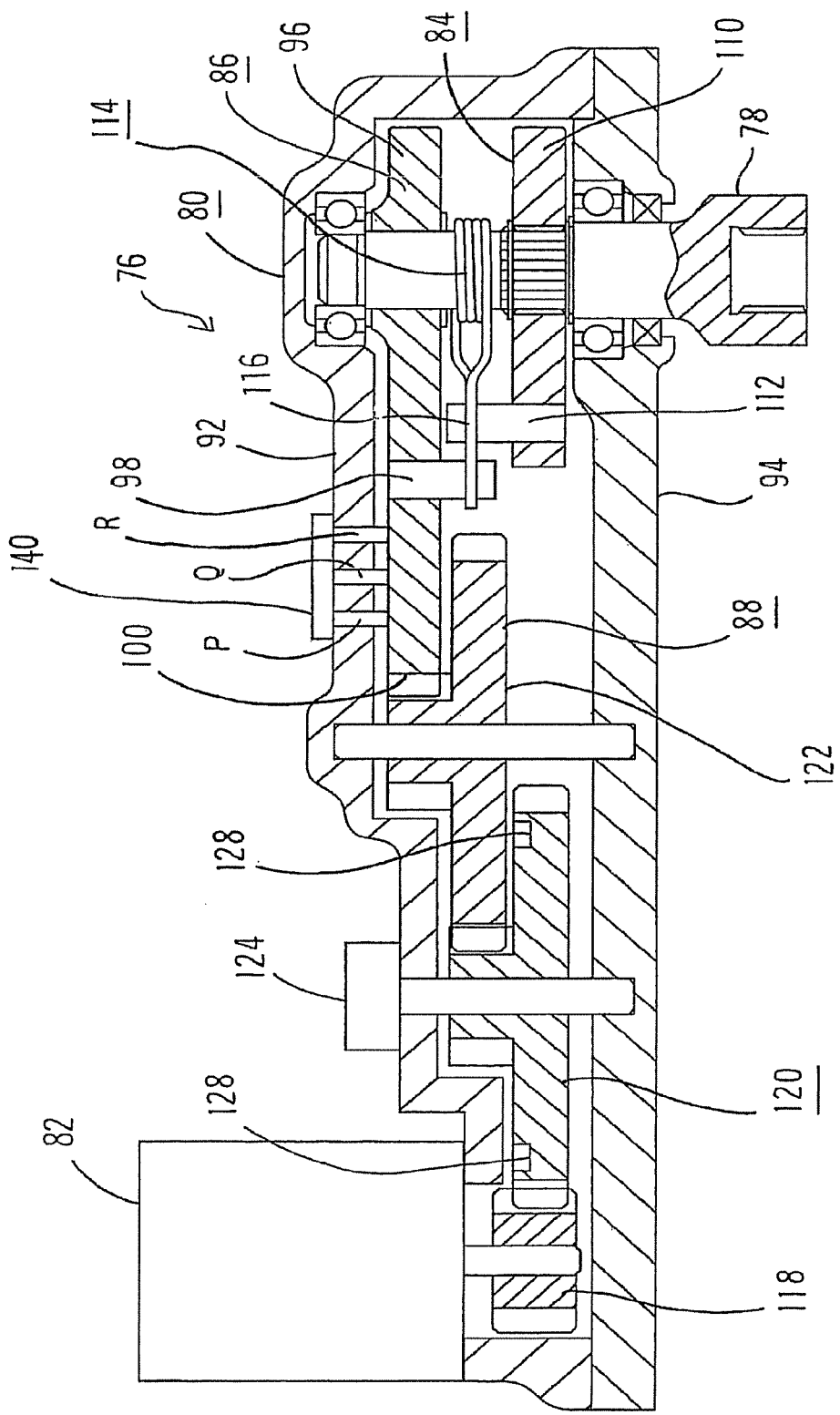
FIG. 5 is a C-C cross sectional view of FIG. 4 showing the brake releasing unit.
Figure 6:
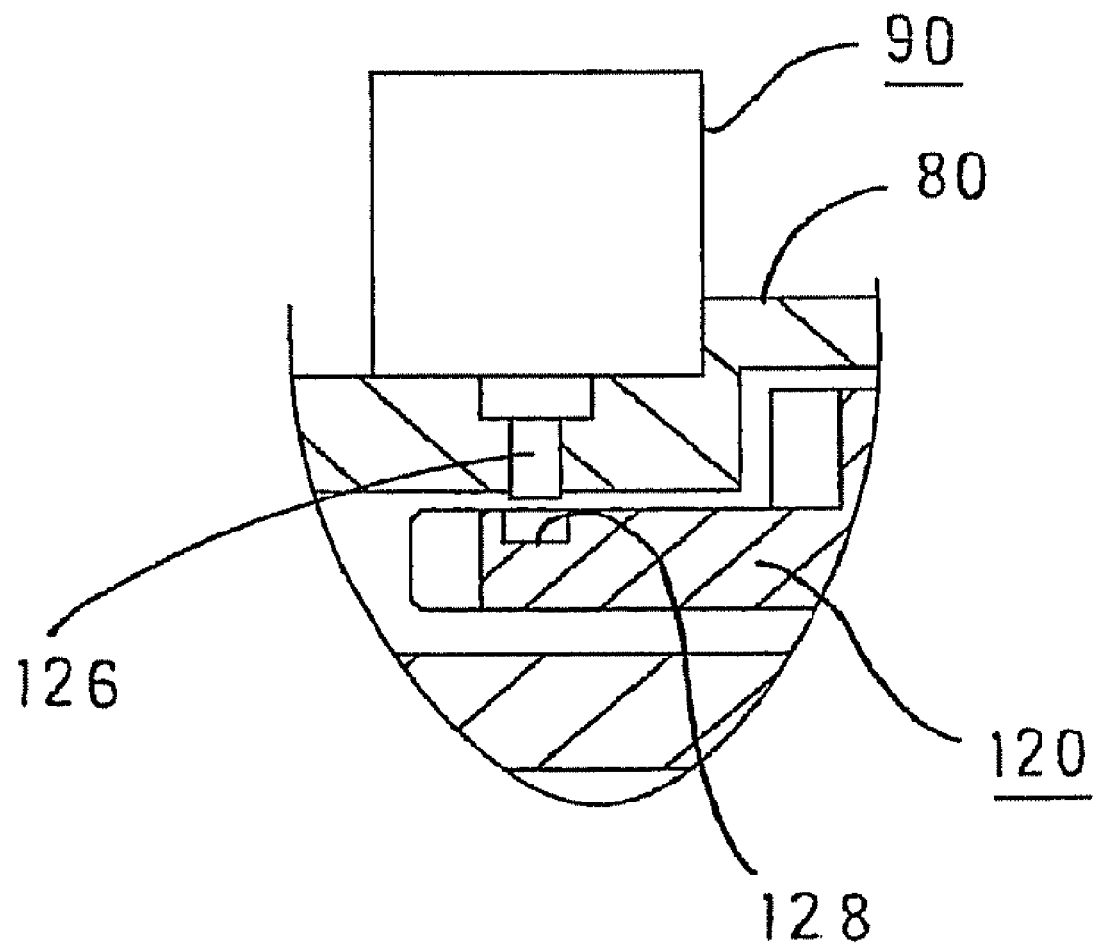
FIG. 6 is a D-D cross sectional view of FIG. 4 showing a solenoid which functions as an actuator.

FIG. 4 is a diagram showing the brake releasing unit with the lower cover removed and a portion omitted, viewed from the bottom toward the top. FIG. 6 is a C-C cross sectional view of FIG. 4 showing the brake releasing unit. As shown in FIG. 5, the housing 80 is formed by connecting an upper cover 92 and a lower cover 94 with a bolt or the like.

As shown in FIG. 4, the loose-fit arm 86 comprises a main body section 96 in which a base having a plate shape and which becomes a swinging center side and a body section connected to one side of the base and having a width widened from an intermediate portion toward a tip are connected, and an engagement pin 98 fixed on the main body section 96 to protrude toward the lower side.

In addition, as shown in FIG. 5, a hole penetrating in the up and down direction is formed through the main body section 96, and the upper end of the brake shaft side rotational shaft 78 is loosely fitted to the hole, so that the loose-fit arm 86 is fitted and supported to the out side of the brake shaft side rotational shaft 78 in a manner to allow relative rotation. Engagement members are fixed at two positions, that is, an upper position and a lower position, of the intermediate portion of the brake shaft side rotational shaft 78, to restrict positional deviation in the up and down direction with respect to the rotational shaft of the loose-fit arm 86 by the two engagement members.

The engagement pin 98 is fixed in the up and down direction on the main body section 96 of the loose-fit arm 86. The tip of the engagement pin 98 protrudes from a lower surface of the loose-fit arm 86. A sector gear 100 is formed on an arc section of an outer peripheral surface of the tip of the main body section 96. In FIGS. 7A-7C, the outer peripheral surface of the tip of the main body section 96 is shown as a simple arc shape, but in reality, the sector gear is formed in this portion. In addition, as shown in FIGS. 7A-7C, a thin conductive section 102 which is a conductor of an approximate crank shape in which a corner of an S-shape is set in a right angle is fixed on the upper surface of the main body section 96. The conductive section 102 has an arc section 104 having a shape along the swinging direction of the loose-fit arm 86, and arm sections 106 and 108 oriented in opposite directions on both ends of the arc section 104 on the tip side and the swinging shaft side. The conductive section 102 can contact three contact point sections P, Q, and R to be described later. In FIGS. 7A-7C, for the brake shaft side rotational shaft 78, only the outer peripheral shape is shown (this similarly applies to FIGS. 16A-16C and FIGS. 20A-20C to be described later).

As shown in FIG. 5, a swinging arm 84 is fixed to a portion shifted toward the lower side of the shaft direction with respect to the loose-fit arm 86 of the intermediate portion of the brake shaft side rotational shaft 78, by a spline engagement section in a manner to prohibit relative rotation. The swinging arm 84 comprises a main body section 110 having a plate shape, formed with a plan view of an approximate egg shape, and having a size in the length direction (left and right direction in FIG. 5) that is smaller than the loose-fit arm 86, and an engagement pin 112 fixed on the tip of the main body section 110, protruding from the upper surface of the main body section 110. A spline hole is formed in the main body section 110 of the swinging arm 84, to spline-engage the brake shaft side rotational shaft 78 in the spline hole. A displacement permitting spring 114 is loosely fitted between the swinging arm 84 and the loose-fit arm 86 of the brake shaft side rotational shaft 78. As shown in FIGS. 7A-7C, the displacement permitting spring 114 is formed by extending a pair of leg sections 116 which are both end sections of a coil spring approximately parallel to each other, the main body section of the displacement permitting spring 114 is loosely fitted to the brake shaft side rotational shaft 78, and the engagement pin 112 of the swinging arm 84 and the engagement pin 98 of the loose-fit arm 86 are placed in a sandwiched manner at the inside of the pair of the leg sections 116. The elastic force of the displacement permitting spring 114 is set to be larger than the elastic force of the braking spring 72 (FIG. 2).

As shown in FIGS. 4 and 5, the gear mechanism 88 comprises a motor gear 118 fixed on the rotational shaft of the brake releasing motor 82, a first intermediate gear 120, and a second intermediate gear 122. Each of the first intermediate gear 120 and the second intermediate gear 122 is provided with a small gear and a large gear on the same axis and shifted in the axial direction. The motor gear 118 is engaged with the large gear of the first intermediate gear 120, and the large gear of the second intermediate gear 122 is engaged with the small gear of the first intermediate gear 120. The sector gear 100 of the loose-fit arm 86 is engaged with the small gear of the second intermediate gear 122. The first intermediate gear 120 is fixed on a shaft of a rotary damper 124 fixed at an upper side of the housing 80. In the rotary damper 124, for example, a rotor fixed on a shaft is rotatably supported in a case and oil such as silicone oil is sealed in a gap between an inner surface of the case and an outer surface of the rotor. With the rotary damper 124, it is possible to inhibit rapid change of rotation of the first intermediate gear 120. Alternatively, the rotary damper 124 may be omitted, and the first intermediate gear 120 may be simply fixed on the shaft section on the up and down direction rotatably supported on the housing 80. Such a gear mechanism 88 is provided between the rotational shaft of the brake releasing motor 82 and the loose-fit arm 86, and operatively connects the rotational shaft of the brake releasing motor 82 and the loose-fit arm 86. In other words, with the gear mechanism 88, the rotation of the brake releasing motor 82 can be transmitted to the loose-fit arm 86.

As shown in FIGS. 4 and 6, the solenoid 90 which is an electromagnetic actuator is fixed at an upper side of the housing 80, so that a shaft portion 126 of the solenoid 90 can protrude from the lower surface of the upper cover 92 toward the lower side. The solenoid 90 comprises a case fixed on the housing 80, the shaft portion 126 which is a moving member at least a part of which is formed with a magnetic material such as iron, a coil placed around the moving member, and a spring connected to the shaft portion 126. The solenoid 90 has a function to move the shaft portion 126 in the axial direction, that is, toward the lower side, by applying an electric signal to the coil. The spring connected to the shaft portion 126 applies an elastic force in a direction to pull the shaft portion 126 toward an upper direction, that is, into the case. Therefore, the solenoid 90 is driven by supply of electricity, displaces the shaft portion 126 downward, and, when the supply of electricity is stopped, pulls the shaft portion 126 upward. The tip of the shaft portion 126 opposes the upper surface of the portion of the first intermediate gear 120 where the large gear is formed. A plurality of holes 128 are formed on the upper surface on the same circumference centered at a central axis of the first intermediate gear 120. The shaft portion 126 can be inserted into each hole 128. In addition, the solenoid 90 is driven by supplying electricity in a state where the brake shaft 54 is rotated by a predetermined angle which is set in advance in the brake releasing direction, so that the shaft portion 126 is engaged with the hole 128 of the first intermediate gear 120, the rotation of the first intermediate gear 120 is blocked, and the swinging displacement of the loose-fit arm 86 is disabled. In this state, the loose-fit arm 86 and the swinging arm 84 which is integrally swung and displaced with the loose-fit arm 86 by the displacement permitting spring 114 do not collide with the inner surface of the housing 80. In addition, by stopping the supply of electricity to the solenoid 90, swinging displacement of the loose-fit arm 86 is enabled and rotation of the brake shaft 54 in the brake realizing direction is enabled by the braking spring 72. Even in the state where the brake shaft 54 is rotated in the brake realizing direction and the brake is realized, the swinging arm 84 and the loose-fit arm 86 do not collide with the inner surface of the housing 80.

Figure 8:
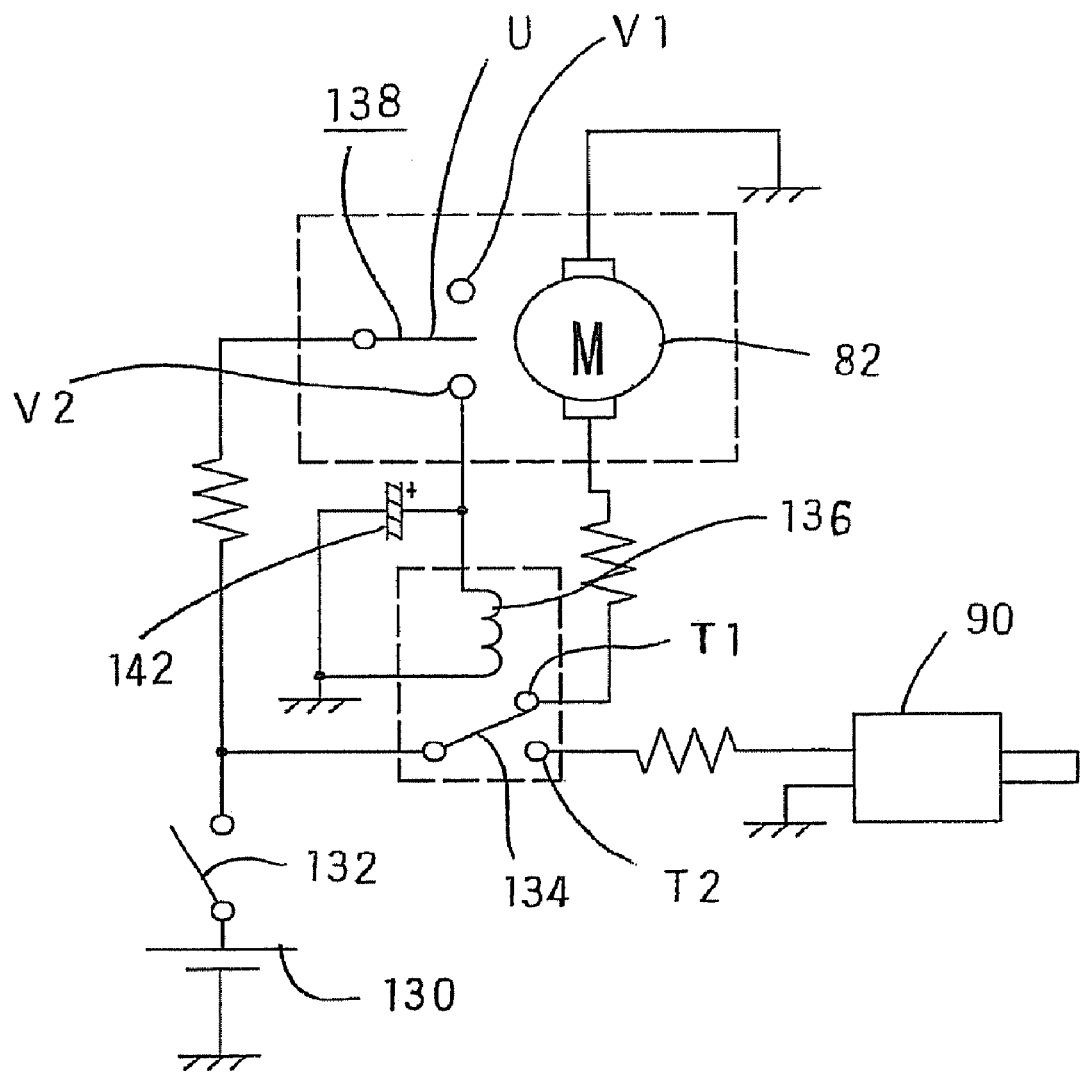
FIG. 8 is a diagram showing a motor driving circuit for selectively supplying electricity to the brake releasing motor and the solenoid.

In addition, a configuration is employed in which electricity from a battery 130 (FIG. 8) is selectively supplied to the brake releasing motor 82 and the solenoid 90. FIG. 8 is a diagram showing a motor driving circuit which selectively supplies electricity to the brake releasing motor 82 and the solenoid 90. As shown in FIG. 8, a positive electrode side of the battery 130 and the brake releasing motor 82 are connectable by a relay type main switch 132 which is switched ON and OFF in connection with a power supply switch (not shown) operable by the driver, a relay-type switching switch 134, and a resistor. The power supply switch itself may be used as the main switch 132. The switching switch 134 can be switched between a state to connect the side of the main switch 132 to a terminal T1 connected to the brake releasing motor 82 and a state to connect the side of the main switch 132 to a terminal T2 connected to the solenoid 90, according to an electrically conductive state of a coil 136.

The terminals of the switching switch 134 and the main switch 132 are connected to a switching contact point U of a second switching switch 138. The switching contact point U can be switched between a position to be connected to one of a first contact point V1 and a second contact point V2 or a position to maintain a neutral state in which the contact point U is not connected to either one of the contact points V1 and V2. In order to realize this function, as shown in FIG. 5, a contact point unit 140 including the switching contact point U of the second switching switch 138 is fixed at an upper side of the housing 80. In the contact point unit 140, three contact point sections P, Q, and R protrude from the lower surface of the upper cover 92 and can contact the conductive section 102 of the loose-fit arm 86 (FIG. 7A or the like). Of the three contact point sections P, Q, and R, the middle contact point section Q and the conductive section 102 form the switching contact point U of the second switching switch 138 (FIG. 8). For this purpose, the middle contact point section Q is connected to the terminals of the main switch 132 and the switching switch 134 through a cable (not shown). In addition, of the three contact point sections P, Q, and R, the contact point section R on a side of the brake shaft forms the first contact point V1 (FIG. 8). Moreover, of the three contact point sections P, Q, and R, the contact point section P on the side of the brake releasing motor 82 forms the second contact point V2 (FIG. 8). As shown in FIG. 8, the second contact point V2 is connected to one side of an electrolytic capacitor 142 which is a large capacity and a coil 136, which are connected in parallel to each other. As shown in FIGS. 7A-7C, of the three contact point sections P, Q, and R, the middle contact point section Q has its lower end contacted to the arc section 104 of the conductive section 102 (FIG. 7A or the like) during the swinging displacement of the loose-fit arm 86 in a particular range. In addition, the lower end of the contact point section R forming the first contact point V1 can be contacted to the arm section 108 of the conductive section 102, oriented toward the side of the swinging center axis of the loose-fit arm 86. The lower end of the contact point section P forming the second contact point V2 can be contacted to the arm section 106 of the conductive section 102 oriented toward the side of the tip of the loose-fit arm 86.

The conductive section 102 is set in an approximate S-shape and three contact point sections P, Q, and R are employed in order to allow the use of the common conductive section 102 and the common contact point sections P, Q, and R even in cases where the rotational direction of the brake shaft 54 becomes opposite in relation to the brake realization and brake release due to, for example, the left and right positions of the brake arm 70 becoming opposite, and to thereby reduce the cost. Therefore, if such is not necessary, the conductive section 102 may be formed in an approximate L-shape with only the arm section 106 oriented toward the side of the tip of the loose-fit arm 86 and the arc section 104, and only two contact point sections which can contact the approximate L-shaped conductive section 102 may be employed.

Alternatively, a configuration may be employed in which a parking brake command device such as a parking lever, which is a side brake, or a parking pedal is provided on the lawn-mower vehicle 10, and a rotational position of the brake shaft 54 is maintained in a state where the brake shaft 54 is rotated in the brake realizing direction, by an operation of pulling-up or depressing the parking brake command device. For example, when the parking brake is pulled up, the brake shaft 54 is rotated in the brake realizing direction through the brake arm 70, and is mechanically locked to maintain this state.

The brake realization and brake release in such a lawnmower vehicle 10 are realized in the following manner. First, a case will be described in which the supply of electricity to the brake releasing motor 82 is stopped by, for example, switching OFF of the power supply switch. In this case, as shown in FIG. 8, first, the main switch 132 is switched OFF, and the supply of electricity to the brake releasing motor 82 and the solenoid 90 is stopped. As a consequence, the shaft portion 126 of the solenoid 90 is pulled upward, and the motive power transmitting function of the gear mechanism 88 can be realized. In this case, the brake shaft 54 is rotated in the brake realizing direction by the braking spring 72, and as shown in FIG. 7A, the swinging arm 84 is rotated in the brake realizing direction (in direction of an arrow α), and the loose-fit arm 86 is also rotated in the brake realizing direction (direction of the arrow α) integrally with the swinging arm 84 by the elastic force of the displacement permitting spring 114. The friction plate 56 shown in FIGS. 2 and 3 is frictionally braked by the brake shoes 58 and 64. As a result, rotation of the rotational shaft 44 of the traction electric motor 42 is disabled, and the drive wheels 18 and 20 operatively connected to the rotational shaft 44 are braked. Therefore, even when the vehicle is positioned on an inclined surface at the time when the power supply switch is switched OFF, the downhill slipping of the vehicle can be prevented.

Next, a method of realizing this braking will be described. As shown in a flowchart of FIG. 9, when the power supply switch is switched OFF in step S10 (hereinafter step will be simply referred by "S"), the brake releasing motor 82 is switched OFF and the solenoid 90 is switched OFF (S12). In S14, the brake shaft 54 is rotated in the brake realizing direction by the elastic force of the braking spring 72, and the brake is switched ON, that is, the drive wheels 18 and 20 are braked.

On the other hand, when the power supply switch is switched ON, as shown in FIG. 8, electricity is supplied from the battery 130 through the main switch 132 and the switching switch 134 to the brake releasing motor 82, and the brake releasing motor 82 is driven. With this drive, the brake releasing motor 82 is rotated in one direction, the rotational force is transmitted through the gear mechanism 88 to the loose-fit arm 86, and the loose-fit arm 86 is rotated in a direction of an arrow β in FIG. 7B, which is the brake releasing direction. In a state where the loose-fit arm 86 is rotated to the state of FIG. 7B, in the second switching switch 138 of FIG. 8, the switching contact point U is connected to the second contact point V2 and electricity is supplied to the coil 136 and the electrolytic capacitor 142. In this case, because the current flowing through the coil 136 is gradually increased, a large current for switching the switching contact point of the switching switch 134 to the contact point T1 on the side of the solenoid 90 flows through the coil 136 with a time lag, that is, with a time delay, from the time when the connection of the switching contact point U and the second contact point V2 is started, and the switching contact point of the switching switch 134 is connected to the contact point T2 on the side of the solenoid 90. Because of this, electricity from the battery 130 is supplied to the solenoid 90, and supply of electricity to the brake releasing motor 82 is stopped. Because the solenoid 90 is driven by supply of electricity, the shaft portion 126 is displaced downward, and if the shaft portion 126 and the hole 128 of the first intermediate gear 120 are aligned, the shaft portion 126 is engaged with the hole 128. Even if the shaft portion 126 and the hole 128 are not aligned, because the loose-fit arm 86 is slightly shifted to return to the brake realizing rotation direction (direction of α in FIG. 7B) by the rotation of the brake shaft 54 due to the elastic force of the braking spring 72, the position of the hole 128 is shifted while the shaft portion 126 is displaced downward, and the shaft portion 126 is engaged with the hole 128 in a state where the shaft portion 126 and the hole 128 are aligned. Because of this, the motive power transmitting function of the gear mechanism 88 is blocked. In other words, the rotation of the gears of the gear mechanism 88 is blocked.

In this process, the swinging arm 84 is rotated from the state shown in FIG. 7A in the brake releasing direction (direction of β) integrally with the loose-fit arm 86 by the elastic force of the displacement permitting spring 114, and the brake shaft 54 is also rotated in the brake releasing direction. The frictional brake by the brake shoes 58 and 64 of the friction plate 56 shown in FIGS. 2 and 3 is released, and this state is maintained. As a result, the rotation of the rotational shaft 44 of the traction electric motor 42 is enabled, and when the rotational shaft 44 of the traction electric motor 42 is rotationally driven by an input of an electric signal to the traction electric motor 42 based on depression of the accelerator pedal, the drive wheels 18 and 20 operatively connected to the rotational shaft 44 of the traction electric motor 42 are driven. Therefore, in a state where the brake pedal 52 is not operated at the time when the power supply switch is switched ON, the brake shaft 54 is rotated in the brake releasing direction, and the brake is released by the rotational position of the brake shaft 54 being maintained. In other words, the brake releasing motor 82 rotates the brake shaft 54 in the brake releasing direction through the loose-fit arm 86 and the displacement permitting spring 114 against the elastic force of the braking spring 72.

Figure 10:
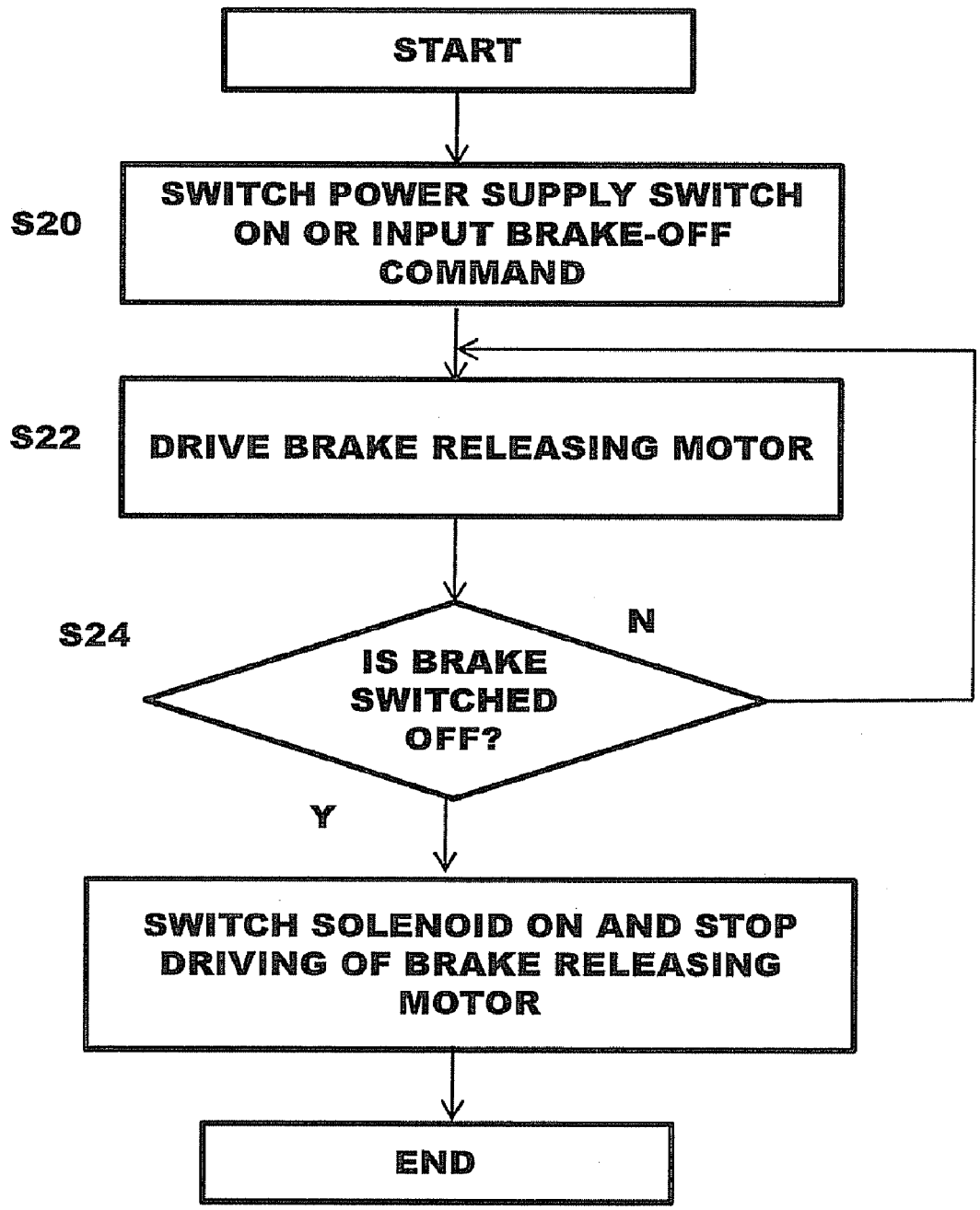
FIG. 10 is a flowchart showing a method of rotating the brake shaft in the brake releasing direction and switching the brake OFF, that is, releasing the brake of the drive wheel, in the first embodiment or another embodiment of the present invention.

When the brake is switched OFF in this manner, that is, when the brake shaft 54 is rotated in the brake releasing direction, as shown in a flowchart of FIG. 10, the power supply switch is switched ON in S20, and the brake releasing motor 82 is driven, that is, the brake releasing motor 82 is switched ON (S22). In S24, the loose-fit arm 86 is rotated in the brake releasing direction to the state shown in FIG. 7B, and brake is switched OFF, that is, the brake is released. In S26, the solenoid 90 is switched ON, and the driving of the brake releasing motor 82 is stopped. The brake release state is then maintained.

In addition, when the brake shaft 54 is rotated to the brake realizing direction by the brake pedal 52 or the parking brake command device being operated, as shown in FIG. 7C, the swinging arm 84 is also rotated in the brake realizing direction (direction of the arrow α). In this case, the gap between the leg sections 116 of the displacement permitting spring 114 is elastically widened while in a state where the displacement of the loose-fit arm 86 is stopped by the driving of the solenoid 90. In other words, while the displacement permitting spring 114 permits elastic relative displacement between the loose-fit arm 86 and the brake shaft 54, an elastic force in a direction to maintain the relative position between the brake shaft 54 and the displacement permitting spring 114 or the loose-fit arm 86 is applied to the brake shaft 54.

According to such a lawnmower vehicle 10, in a structure where the drive wheels 18 and 20 are driven by the traction electric motor 42, the uncomfortable feeling for the driver with regard to the behavior of the vehicle when the supply of electricity is stopped can be reduced. In other words, when the supply of electricity to the traction electric motor 42 is stopped, the brake shaft 54 is rotated in the brake realizing direction by the braking spring 72 and the drive wheels 18 and 20 are braked. In normal running, the brake can be released by the driving of the brake releasing motor 82, and thus there is no problem in running. When the brake pedal 52 is operated, the vehicle can be normally braked. Because of this, with the above-described stopping of the supply of electricity, a brake force is generated during the running of the vehicle, and when the vehicle is parked on a slope, even when the brake pedal 52 or the parking brake is not operated, the downhill slipping of the vehicle on the slope can be prevented. Thus, the behavior of the vehicle is similar to that of the vehicle in which the wheel is driven by driving of the hydraulic motor. Therefore, it is possible to reduce the uncomfortable feeling for a driver who has changed from the vehicle in which the wheel is driven by the driving of the hydraulic motor to the lawnmower vehicle 10 of the present embodiment.

Because the solenoid 90, which is a protection unit for protecting the brake releasing motor 82 and which is also an actuator, is provided, the solenoid 90 which can reduce the power consumption compared to the brake releasing motor 82 can be driven at the time of brake release, and the driving of the brake releasing motor 82 can be stopped. Because of this, it is not necessary to continue driving the brake releasing motor 82, and disadvantages such as burn-out of the brake releasing motor 82 can be more effectively prevented. Because of this, the endurance of the brake releasing motor 82 can be improved and the reliability can be improved. In addition, the power consumption at the time of brake release can be reduced.

In addition, because the first intermediate gear 120 which constitutes the gear mechanism 88 is supported on the shaft portion of the rotary damper 124, a damping section can be provided in the gear mechanism 88. Because of this, even when the supply of electricity to the brake releasing motor 82 is suddenly stopped due to failure or the like during high-speed running of the vehicle, sudden braking of the vehicle does not tend to occur. In place of the oil sealed in the rotary damper 124, it is also possible to use grease. Alternatively, a damping section which uses oil or the like having a function of a shock absorber may be provided between the brake arm 70 fixed on the brake shaft 54 and the fixed section of the vehicle body, and the rotary damper 124 may be omitted.

Figure 9:
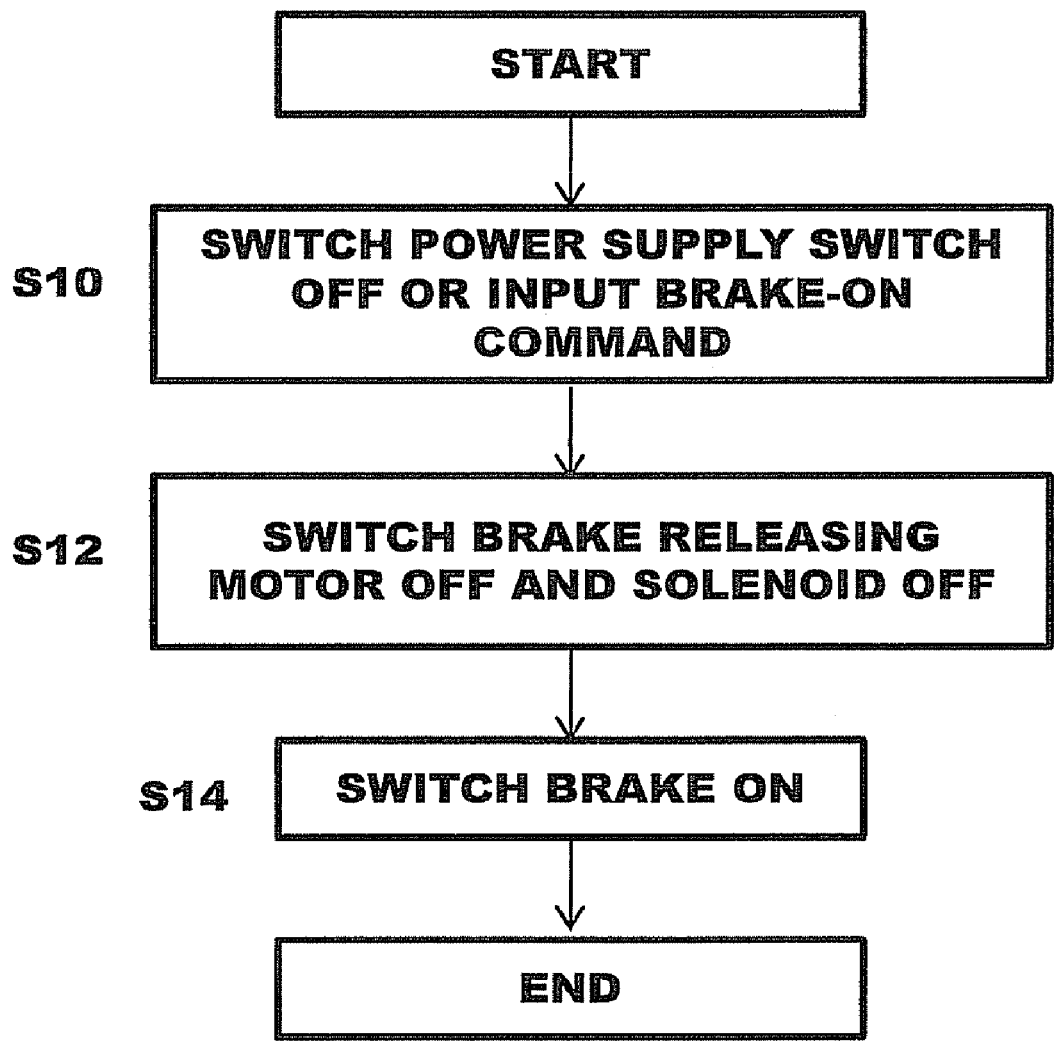
FIG. 9 is a flowchart showing a method of rotating the brake shaft in the brake realizing direction and switching the brake ON, that is, braking the drive wheel, in the first embodiment or another embodiment of the present invention.

In the present embodiment, the contact point sections P, Q, and R are contacted with the conductive section 102 to allow switching between the driving and stopping of the brake releasing motor 82. However, for the drive switching section for switching the drive state, various structures may be employed. For example, it is also possible to use a circuit different from the circuit shown in FIG. 8, and a drive switching section of the controller may judge whether or not a brake-ON command based on switching OFF of the power supply switch or the like is input. FIG. 9 described above also shows a method of switching the brake ON with another example structure. In S10 of FIG. 9, when the drive switching section judges that the brake-ON command is input, the method transitions to S12, and the drive switching section outputs an command signal to switch the brake releasing motor 82 OFF and switch the solenoid 90 OFF. With this command signal, the drive switching section controls the connection state of the battery 130 and the brake releasing motor 82, and of the battery 130 and the solenoid 90, to disconnect the battery 130 and the brake releasing motor 82, and the battery 130 and the solenoid 90, the brake shaft 54 is rotated in the brake realizing direction, and the brake is switched ON.

In addition, a method for switching the brake OFF with another example structure is also shown in FIG. 10 described above. In S20 of FIG. 10, when the drive switching section of the controller judges that the brake-OFF command is input by switching ON of the power supply switch or the like, the method transitions to S22. In S22, the drive switching section outputs a command signal to drive the brake releasing motor 82. With the command signal, the drive switching section controls the connection state of the battery 130 and the brake releasing motor 82 to connect the battery 130 and the brake releasing motor 82, and the brake shaft 54 and the loose-fit arm 86 are rotationally driven in the brake releasing direction by the driving of the brake releasing motor 82. In S22 and S24, a rotational angle of the brake shaft 54 or the loose-fit arm 86 is detected with a rotational angle sensor or the like, and the brake releasing motor 82 is driven until the drive switching section judges that the brake shaft 54 or the loose-fit arm 86 is rotated to a predetermined position which is set in advance and that the brake is switched OFF, that is, the brake release state is reached. In S24, when the drive switching section judges that the brake is switched OFF, in S26, the drive switching section controls the connection states of the battery 130 and the solenoid 90, and the battery 130 and the brake releasing motor 82, so that the solenoid 90 is switched ON, the rotation of the gear of the gear mechanism 88 is stopped by the solenoid 90, and the driving of the brake releasing motor 82 is stopped. As described, in the present embodiment, it is also possible to judge with the controller whether or not an ON command or an OFF command of the brake is input, and to control the driving of the brake releasing motor 82 and the solenoid 90 based on this judgment.

The drive switching section which switches the driving and non-driving of the brake releasing motor 82 may have a constitution having a section which monitors a continued drive time of the brake releasing motor 82, and a switch control section which switches, when the continued drive time is greater than or equal to a predetermined time which is set in advance, from driving of the brake releasing motor 82 by the battery 130 to the driving of the solenoid 90, in order to switch from driving of the brake releasing motor 82 to non-driving of the brake releasing motor 82. For example, at least a part of the time monitoring section and the switch control section may be realized by functions of the controller.

Alternatively, the drive switching section may have a constitution having a current sensor which detects a current supplied to the brake releasing motor 82, and a switch control device which switches, when the detected value of the current sensor is greater than or equal to a threshold current which is set in advance, from driving of the brake releasing motor 82 by the battery 130 to the driving of the solenoid 90, in order to switch from driving of the brake releasing motor 82 to non-driving of the brake releasing motor 82, similar to the above.

Alternatively, the drive switching section may have a constitution in which the swinging arm 84 is configured to be pressed against a limit switch fixed on the housing 80 when the swinging arm 84 swings and displaces by a predetermined amount by driving of the brake releasing motor 82, and a switching control section is provided which switches, when the swinging arm 84 is pressed against the limit switch, from driving of the brake releasing motor 82 by the battery 130 to the driving of the solenoid 90, in order to switch from driving of the brake releasing motor 82 to non-driving of the brake releasing motor 82, similar to the above.

Alternatively, the drive switching section may have a constitution having a storage section which stores a particular running pattern of the vehicle which is set in advance, and a switching control section which switches, when it is judged that an actual running state of the vehicle matches the particular running pattern which is read from the storage section, from the driving of the brake releasing motor 82 by the battery 130 to the driving of the solenoid 90, in order to switch from the driving of the brake releasing motor 82 to the non-driving of the brake releasing motor 82, similar to the above.

[Second Embodiment]

Figure 11:
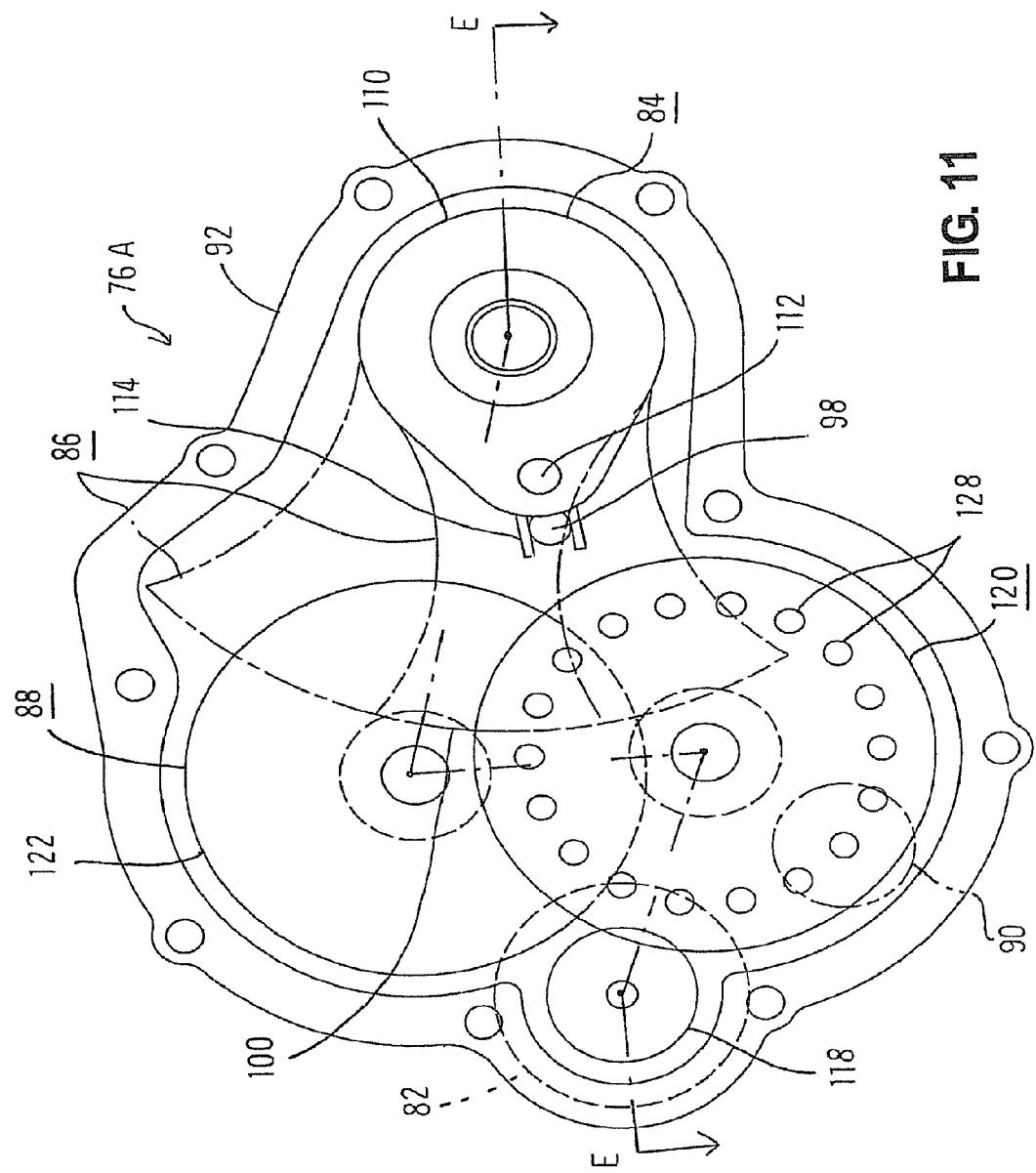
FIG. 11 is a diagram corresponding to FIG. 4 and showing a brake releasing unit in a second embodiment of the present invention.
Figure 12:
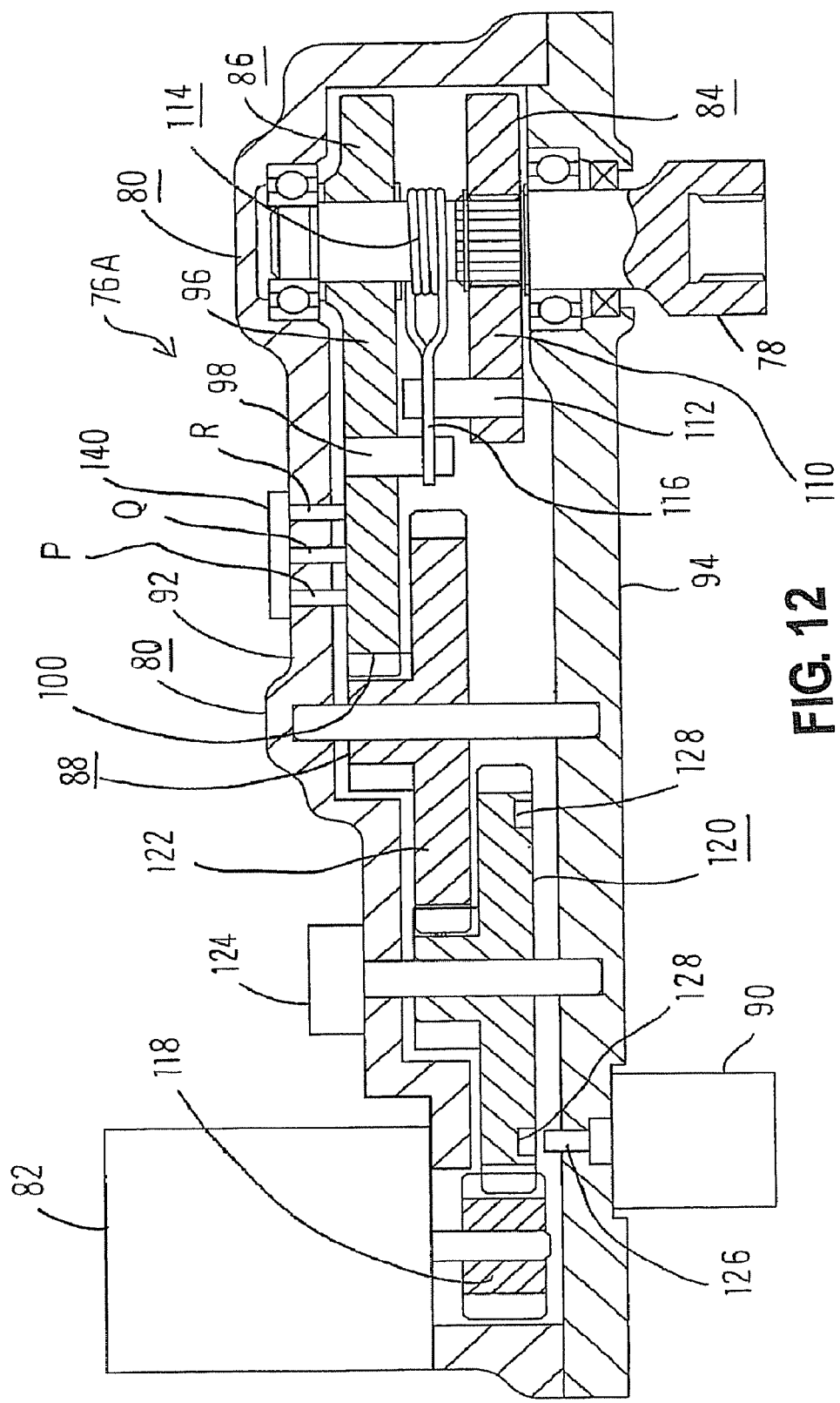
FIG. 12 is an E-E cross sectional view of FIG. 11 showing the brake releasing unit.

FIG. 11 is a diagram corresponding to FIG. 4 and showing a brake releasing unit 76A in a second embodiment of the present invention. FIG. 12 is an E-E cross sectional view of FIG. 11 showing the brake releasing unit 76A. In the present embodiment, as shown in FIGS. 11 and 12, in the configuration of the first embodiment, the solenoid 90 is fixed at a lower side of the housing 80 so that the shaft portion 126 can be protruded upward from the upper surface of the lower cover 94 of the housing 80. In addition, the shaft portion 126 of the solenoid 90 can be engaged with a plurality of holes 128 placed on the same circumference centered at a central axis on a lower surface of the first intermediate gear 120. The solenoid 90 is driven by supply of electricity, to displace the shaft portion 126 upward, and when the supply of electricity is stopped, the shaft portion 126 is pulled downward by a spring provided inside. When the shaft portion 126 moves downward by its own weight, the internal spring may be omitted. The other structures and operations are similar to those of the first embodiment described above, and will not be repeatedly described or shown in the figures.

[Third Embodiment]

Figure 13:
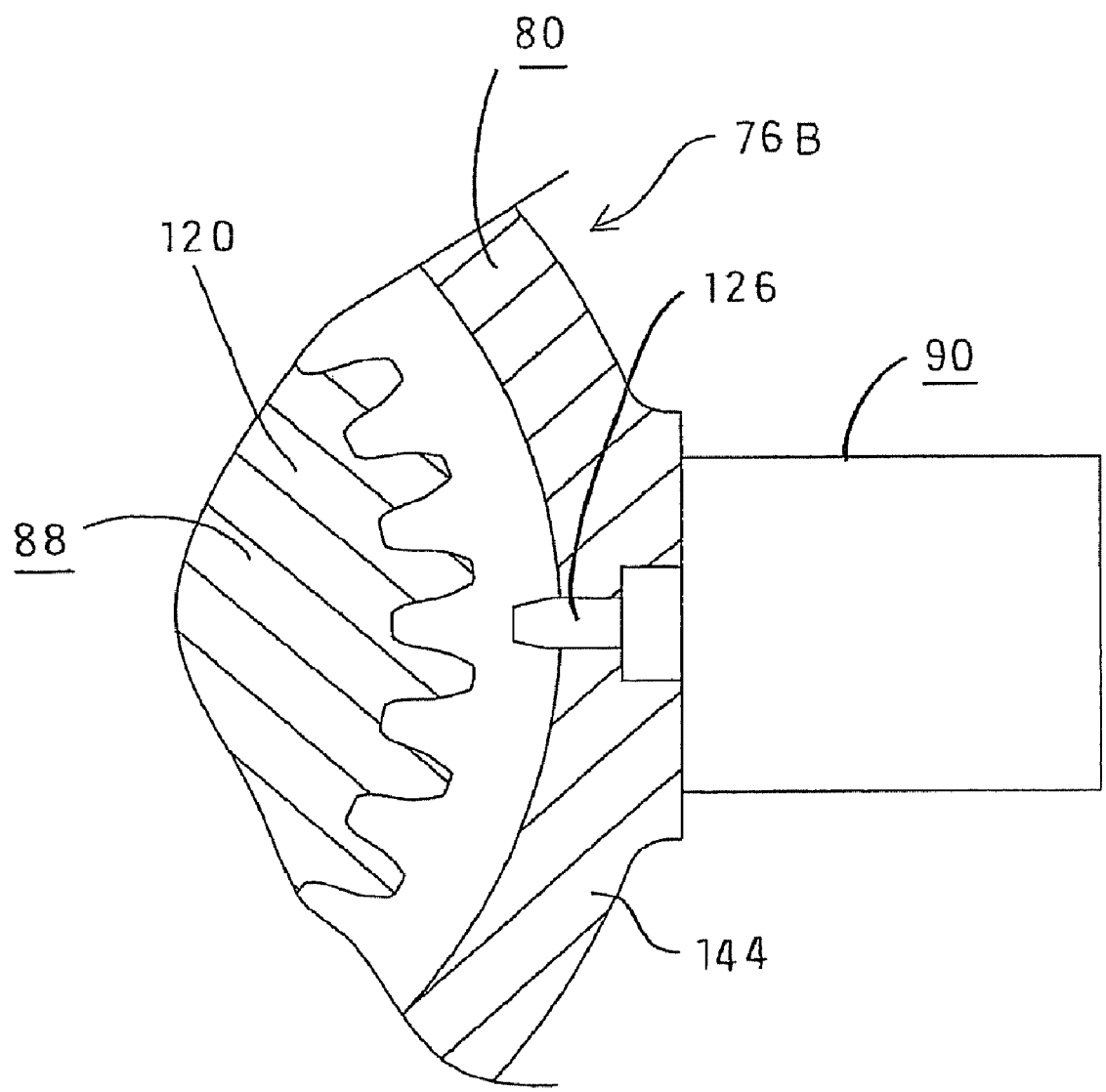
FIG. 13 is a cross sectional view of a part of a brake releasing unit showing a configuration where a shaft of the solenoid opposes a tooth surface of a gear in a third embodiment of the present invention.

FIG. 13 is a partial cross sectional view of a brake releasing unit 76B of a third embodiment of the present invention where the shaft portion 126 of the solenoid 90 is opposed to the gear surface of the gear. In the present embodiment, in the configuration of the first embodiment shown in FIGS. 1 through 10, the solenoid 90 is fixed on a side wall section 144 provided on an outer periphery section of the housing 80, to allow the shaft portion 126 to protrude in the lateral direction from the inner surface of the side wall section 144. The shaft portion 126 of the solenoid 90 can enter a region between adjacent teeth sections of the large gear provided on the outer peripheral section of the first intermediate gear 120. By the shaft portion 126 entering the region between the adjacent teeth sections of the large gear, the shaft portion 126 can be engaged with the first intermediate gear 120. The solenoid 90 is driven by supply of electricity, to displace the shaft portion 126 to the inside of the housing 80, and when the supply of electricity is stopped, the shaft portion 126 is displaced to the inside of the case of the solenoid 90 by a spring provided at the inside. In the case of such an embodiment, the holes to be engaged with the shaft portion 126 need not be formed on the first intermediate gear 120. The other structures and operations are similar to those of the first embodiment, and thus will not be repeatedly described or shown in the figures. As described, the solenoid 90 can be fixed on the top, the bottom, or the sides of the housing 80, and a structure may be employed in which the shaft portion of the solenoid 90 can be engaged with the gear of the gear mechanism 88.

[Fourth Embodiment]

Figure 14:
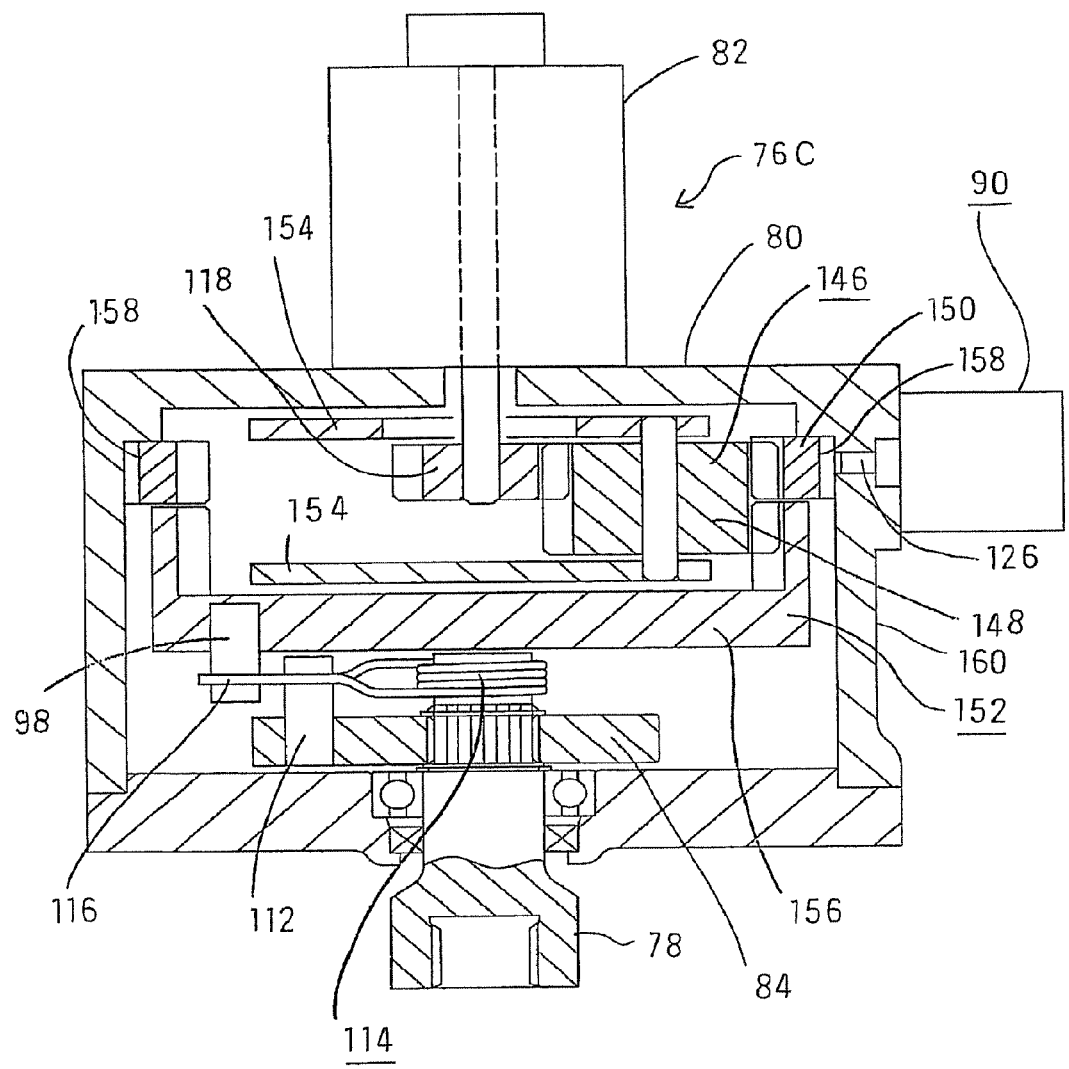
FIG. 14 is a cross sectional view showing a brake releasing unit in a fourth embodiment of the present invention.

FIG. 14 is a cross sectional view showing a brake releasing unit 76C in a fourth embodiment of the present invention. In the present embodiment, in the configuration of the first embodiment shown in FIGS. 1-10, a mechanical paradox gear mechanism 146 is employed in the brake releasing unit 76C. In other words, the brake releasing unit 76C is positioned on an upper side of the brake shaft 54 (refer to FIG. 2 or the like). The brake releasing unit 76C is fixed on the vehicle body, that is, the main frame 12, directly or through another member or other members.

The brake releasing unit 76C comprises a housing 80 and a brake releasing motor 82 fixed on the upper side of the housing 80, and a brake shaft side rotational shaft 78 to be fixed on the brake shaft 54 is rotatably supported on a lower portion of the housing 80. In addition, a mechanical paradox gear mechanism 146 which is an operative connection mechanism is provided at the inside of the housing 80 and between the rotational shaft of the brake releasing motor 82 and the brake shaft side rotational shaft 78. The mechanical paradox gear mechanism 146 comprises a motor gear 118 which is an inner gear fixed on the rotational shaft of the brake releasing motor 82, a plurality of planetary gears 148 engaged with the motor gear 118, a first outer gear 150 which is rotatably supported at the inside of the housing 80 and around the plurality of planetary gears 148, and which is engaged with each planetary gear 148, and a second outer gear 152 which is a displacement member which is engaged with portions around the plurality of planetary gears 148 and positioned at different position from the first outer gear 150. The plurality of planetary gears 148 are supported on a shaft supported on two plate portions 154 placed on both sides in the axial direction. The planetary gear 148 allows rotation and revolution. The numbers of teeth are different between the first outer gear 150 and the second outer gear 152. A plate section 156 is provided on a lower portion of the second outer gear 152. The second outer gear 152 is restricted downward displacement by putting on a support section (not shown) fixed on the housing 80 or the like. In addition, at a plurality of locations in the circumferential direction of the outer peripheral surface of the first outer gear 150, holes 158 depressed in the radial direction are formed.

The swinging arm 84 is fixed on an upper end of the brake shaft side rotational shaft 78, and the engagement pin 112 is fixed in the up and down direction on the main body section of the swinging arm 84. The engagement pin 98 fixed in the up and down direction on the second outer gear 152 and the engagement pin 112 fixed on the swinging arm 84 are pinched by the leg section 116 of the displacement permitting spring 114 fitted to the upper end of the brake shaft side rotational shaft 78. The case of the solenoid 90 is fixed on the side wall section 160 of the housing 80, and with the driving of the solenoid 90, the shaft portion 126 protrudes to the inside of the hole 158 on the outer peripheral surface of the first outer gear 150, so that the shaft portion 126 can be engaged with the hole 158. Therefore, when the solenoid 90 is driven by supply of electricity, rotation of the first outer gear 150 is blocked, and the first outer gear 150 is fixed. In this case, if the brake releasing motor 82 is driven, the speed of the rotation is significantly reduced and the rotation is transmitted to the second outer gear 152, and the second outer gear 152 is rotationally displaced. With this process, the engagement pin 98 of the second outer gear 152 is rotationally moved, and with the elastic force of the displacement permitting spring 114, the brake shaft 54 (refer to FIG. 2 or the like) is rotated in the brake releasing direction against the elastic force of the braking spring 72 (refer to FIG. 2 or the like) through the swinging arm 84 and the brake shaft side rotational shaft 78, and the braking of the drive wheels 18 and 20 (refer to FIG. 1 or the like) is released.

When the mechanical paradox gear mechanism 146 is provided in this manner, by decreasing the difference in the number of teeth between the first outer gear 150 and the second outer gear 152 while maintaining that there is a difference in number of teeth, it is possible to reduce the rotational speed of the brake releasing motor 82 with a high reduction ratio, and to transmit the rotation to the second outer gear 152 which is the rotational member. In addition, even if a tendency occurs in this state for a rotational force to be applied from the side of the brake shaft 54 to the second outer gear 152, the brake releasing motor 82 is not rotated. That is, the second outer gear 152 is not rotated. Because of this, in the state where the brake releasing motor 82 is rotated in the brake releasing direction by a certain angle, the driving is stopped by stopping the supply of electricity to the brake releasing motor 82. In this case also, the second outer gear 152 is not rotated. If the brake pedal 52 is operated in this state, because the brake shaft 54 is rotated in the brake releasing direction without the second outer gear 152 being rotated, a braked state can be realized.

When supply of electricity to the brake releasing motor 82 and the solenoid 90 is stopped, because the shaft portion 126 of the solenoid 90 is disengaged from the hole 158 of the first outer gear 150, the first outer gear 150 can be rotated. In this case, the brake shaft 54 is rotated in the brake realizing direction by the elastic force of the braking spring 72 (refer to FIG. 2 or the like). In addition, the second outer gear 152 is also rotated in the brake realizing direction by the elastic force of the displacement permitting spring 114. Specifically, the displacement permitting spring 114 is provided between the second outer gear 152 and the brake shaft 54, and while permitting elastic relative displacement between the second outer gear 152 and the brake shaft 54, the displacement permitting spring 114 applies an elastic force to the brake shaft 54 in a direction to maintain the relative position of the brake shaft 54 and the displacement permitting spring 114 or the second outer gear 152.

In the case of the present embodiment also, in a structure in which the drive wheels 18 and 20 (refer to FIG. 1) are driven with the traction electric motor 42, the uncomfortable feeling for the driver with regard to the behavior of the vehicle when supply of electricity is stopped can be reduced. In addition, because the solenoid 90 which is a protection unit for protecting the brake releasing motor 82 and which is also an actuator is provided, the solenoid 90 which can reduce the power consumption compared to the brake releasing motor 82 can be driven, and the driving of the brake releasing motor 82 can be stopped when the brake is released. Because of this, the endurance of the brake releasing motor 82 can be improved and reliability can be improved. In addition, the power consumption at the time of the brake release can be reduced. The other structures and operations are similar to those of the first embodiment shown in FIGS. 1-10, and thus will not be repeatedly described or shown in the figures.

[Fifth Embodiment]

Figure 15:
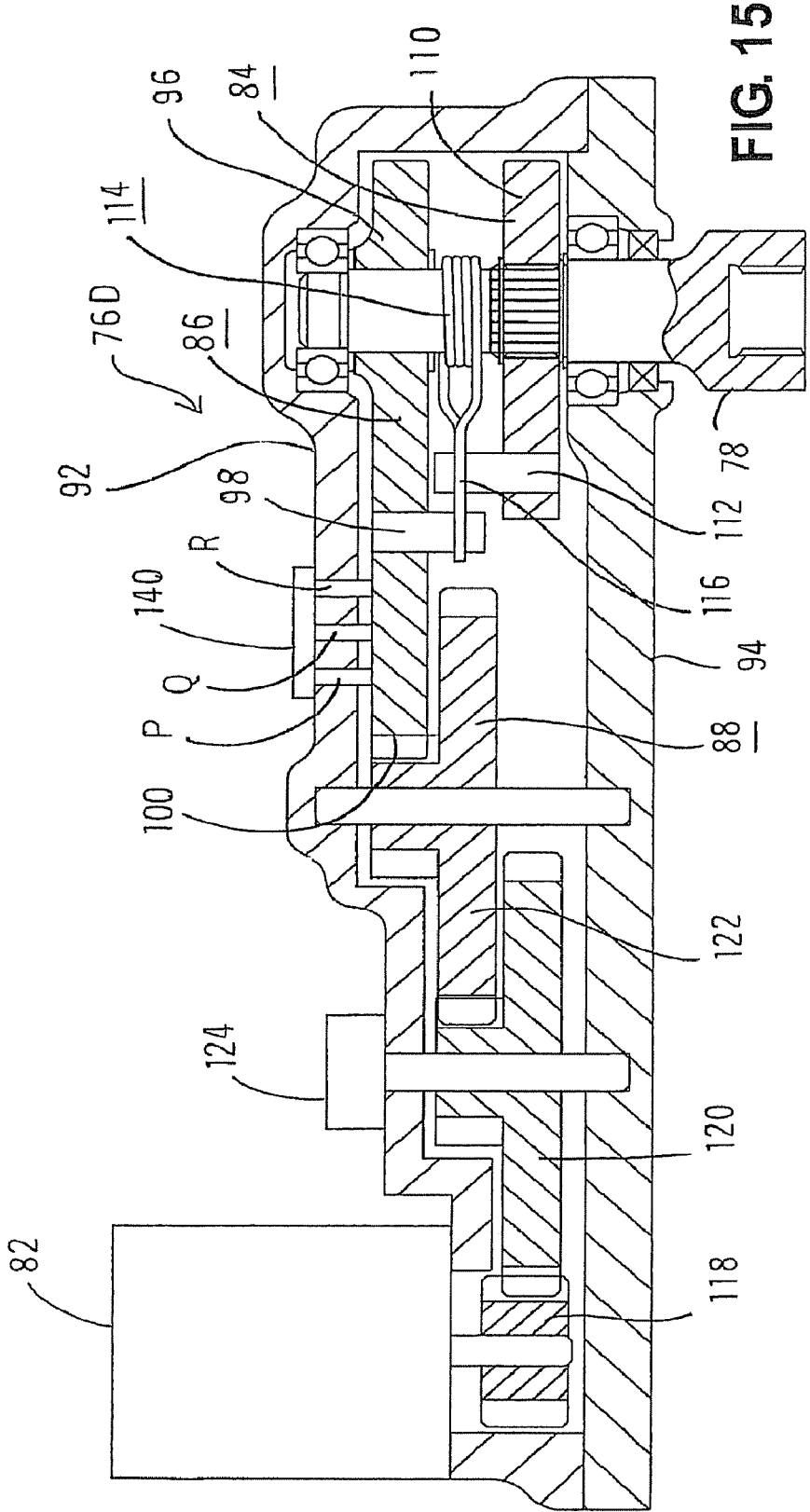
FIG. 15 is a diagram corresponding to FIG. 5 and showing a brake releasing unit in a fifth embodiment of the present invention.
Figure 16A:
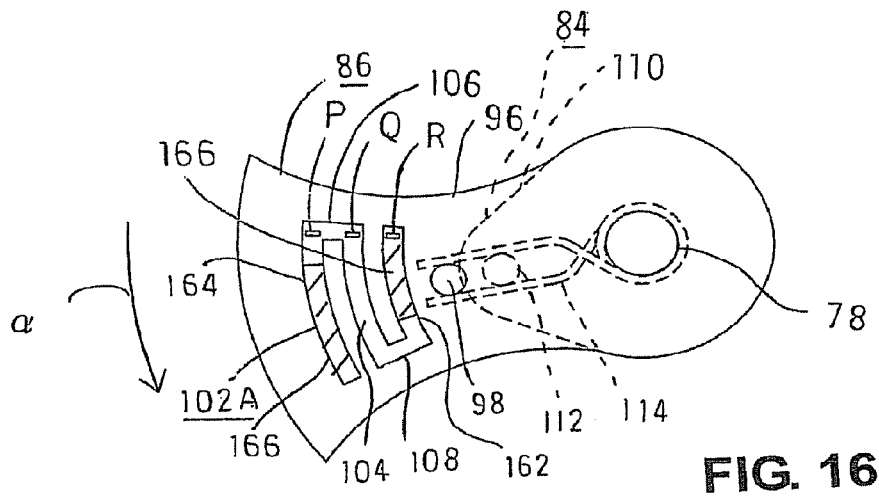
FIG. 16A is a diagram showing rotation of the brake shaft in a brake realizing direction by a braking spring when the power supply is in the OFF state in the fifth embodiment and is a diagram viewed from top toward the bottom in which the brake shaft side rotational shaft, the swinging arm, the displacement permitting spring, and the loose-fit arm are taken out of FIG. 15.
Figure 16B:
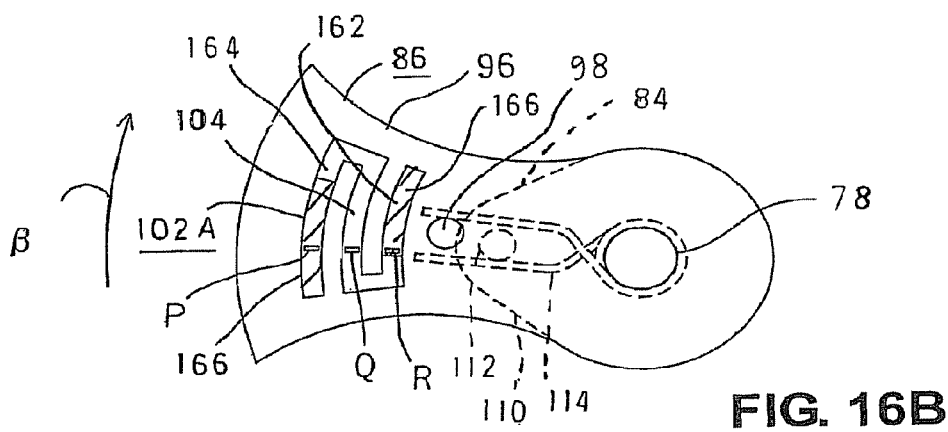
FIG. 16B is a diagram related to FIG. 16A and showing rotation of the brake shaft in the brake releasing direction by driving of the brake releasing motor when the power supply is in the ON state in the fifth embodiment of the present invention.
Figure 16C:
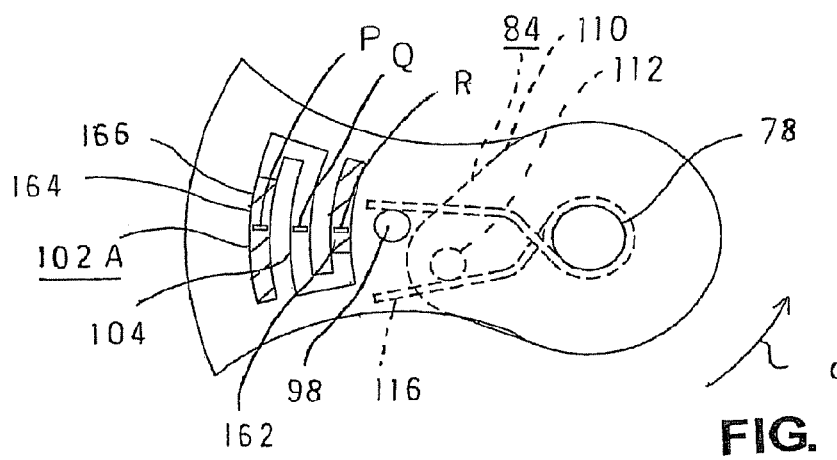
FIG. 16C is a diagram related to FIG. 16A and showing rotation of the brake shaft in the brake realizing direction by an operation of the brake pedal when the power supply is in the ON state in the fifth embodiment of the present invention.
Figure 17:
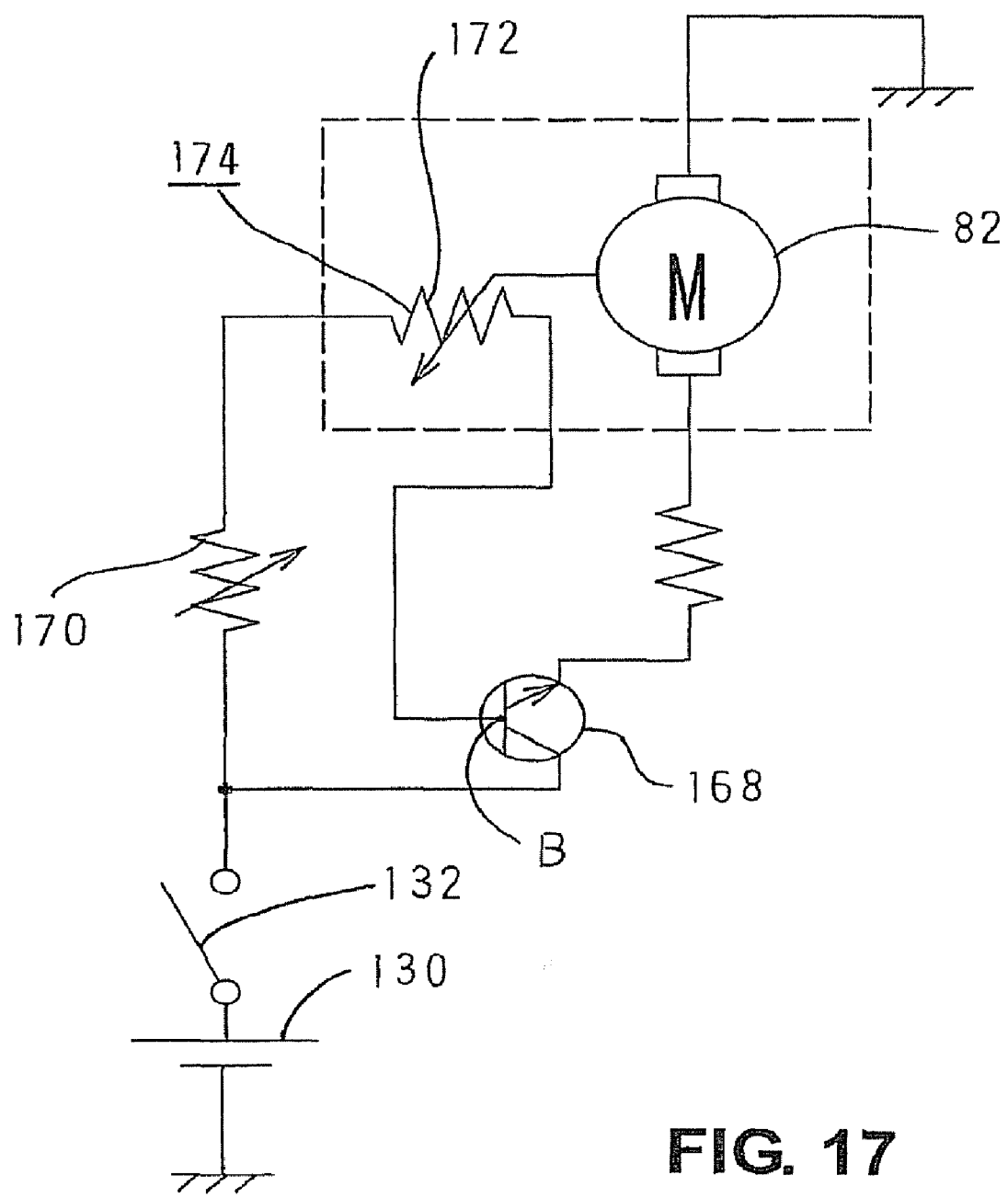
FIG. 17 is a diagram showing a motor driving circuit for supplying electricity to the brake releasing motor in the fifth embodiment of the present invention.

FIG. 15 is a diagram corresponding to FIG. 5 and showing a brake releasing unit 76D in a fifth embodiment of the present invention. FIG. 16A is a diagram showing rotation of the brake shaft in the brake realizing direction by the braking spring when the power supply is in the OFF state in the present embodiment, and is a diagram viewed from top toward the bottom in which the brake shaft side rotational shaft 78, the swinging arm 84, the displacement permitting spring 114, and the loose-fit arm 86 shown are taken out of FIG. 15. FIG. 16B is a diagram related to FIG. 16A and showing rotation of the brake shaft in the brake releasing direction by the driving of the brake releasing motor 82 when the power supply is in the ON state in the present embodiment. FIG. 16C is a diagram related to FIG. 16A and showing rotation of the brake shaft in the brake realizing direction by an operation of the brake pedal when the power supply is in the ON state in the present embodiment. FIG. 17 is a diagram showing a motor driving circuit for supplying electricity to the brake releasing motor 82 in the present embodiment.

As shown in FIG. 15, in the present embodiment, unlike the first embodiment shown in FIG. 5, the solenoid is not provided in the brake releasing unit 76D. Accordingly, the hole for engagement with the shaft portion of the solenoid is not formed in the first intermediate gear 120.

In place of such a structure, as shown in FIGS. 16A-16C, a conductive section 102A fixed on one side of the loose-fit arm 86 comprises an arc section 104 provided at an intermediate portion, arm sections 106 and 108 connected to both ends of the arc section 104, and a base side arc section 162 and a tip side arc section 164 connected to the arm sections 106 and 108 in a manner to extend in opposite directions in the swinging rotation direction. A high resistance section 166 is provided from the intermediate section to the tip section of the base side arc section 162 and the tip side arc section 164 in which the resistance is higher compared to the other portions, that is, the portions which are almost non-resistive. For this purpose, in the conductive section 102, the high resistance section 166 and the other sections are formed with materials having different conductivities. The three contact point sections P, Q, and R contact the conductive section 102A. Of the three contact point sections P, Q, and R, the tip of the middle contact point section Q contacts the intermediate arc section 104 regardless of the swinging displacement of the loose-fit arm 86. The tip of the contact point section P on the side of the brake releasing motor 82 (FIG. 15) contacts the tip side arc section 164 regardless of the swinging displacement of the loose-fit arm 86. The tip of the contact point section R on the swinging center axis side contacts the base side arc section 162 regardless of the swinging displacement of the loose-fit arm 86.

The conductive section 102A is formed in such a shape and three contact point sections P, Q, and R are employed in order to allow the use of the common conductive section 102A and contact point sections P, Q, and R even in cases where the direction of rotation of the brake shaft 54 (refer to FIG. 2 or the like) is opposite in relation to the brake realization and brake release of the brake due to, for example, the left and right positions of the brake arm 70 (refer to FIG. 2 or the like) becoming opposite, and to consequently reduce the cost. Therefore, when such a consideration is not necessary, the conductive section 102A may be formed in an approximate C-shape, with the arc section 104, the arm section 106 oriented toward the tip side of the loose-fit arm 86, and the tip side arc section 164, and only two contact point sections which can contact the approximate C-shaped conductive section 102A may be employed for the contact point sections. In the present embodiment, the contact point section R on the swinging center axis side is not for connecting the brake releasing motor 82 to the battery 130 (FIG. 17).

As shown in FIG. 17, the positive electrode side of the battery 130 is connected to the brake releasing motor 82 through the main switch 132, a switching element 168 such as a transistor, and a resistor. The main switch 132 and a base B of the switching element 168 are connected through a variable resistance section 170 which can be controlled by a controller (not shown) and a second variable resistance section 172 in which the resistance changes according to the rotational angle of the brake releasing motor 82. The second variable resistance section 172 is formed by the contact point section P on the side of the brake releasing motor 82, the conductive section 102A, and the middle contact point section Q shown in FIG. 16. Specifically, when the loose-fit arm 86 swings from the state of FIG. 16A to the state of FIG. 16B, the resistance of the second variable resistance section 172 is increased. In this case, the current which is input to the base B of the switching element 168 is reduced, and, therefore, the drive current of the brake releasing motor 82 is reduced, and consequently torque is reduced. The second variable resistance section 172 and the loose-fit arm 86 form a current varying mechanism 174 which is a protection unit. The current varying mechanism 174 reduces the current which is input to the brake releasing motor 82 as the amount of swinging displacement, that is, the rotational angle, is increased when the loose-fit arm 86 is swung and displaced in the brake releasing direction (direction of arrow β of FIG. 16B).

In a lawnmower vehicle having such a brake releasing unit 76D, the braking and the brake release are realized in the following manner. First, a case will be described in which the supply of electricity to the brake releasing motor 82 is stopped due to, for example, switching OFF of the power supply switch or the like. In this case, as shown in FIG. 17, the main switch 132 is switched OFF, and the supply of electricity to the brake releasing motor 82 is stopped. Therefore, the brake shaft 54 is rotated in the brake realizing direction by the braking spring 72 in a state where the transmission function of the motive power by the gear mechanism 88 can be realized. Because of this, as shown in FIG. 16A, the swinging arm 84 is rotated in the brake realizing direction (direction of the arrow α), the loose-fit arm 86 is rotated in the brake realizing direction (direction of the arrow α) integrally with the swinging arm 84 by the elastic force of the displacement permitting spring 114, and a braked state of the drive wheels 18 and 20 (refer to FIG. 1 or the like) is realized. Because of this, even when the vehicle is positioned on an inclined surface at the time when the power supply switch is switched OFF, the downhill slipping of the vehicle is prevented.

When the power supply switch is switched ON, as shown in FIG. 17, electricity is supplied from the battery 130 through the switching element 168 to the brake releasing motor 82, and the brake releasing motor 82 is driven. Due to this driving, the brake releasing motor 82 is rotated in one direction, the rotational force is transmitted to the loose-fit arm 86 through the gear mechanism 88, and the loose-fit arm 86 is rotated in the direction of the arrow β in FIG. 16B which is the brake releasing direction. In this case, as the loose-fit arm 86 is rotated in the direction of the arrow β, the second variable resistance section 172 is increased, and the drive current of the brake releasing motor 82 is reduced. When the torque of the brake releasing motor 82 and the spring torque rotating the loose-fit arm 86 in the brake realizing direction by the braking spring 72 are balanced, the rotation of the brake releasing motor 82 is stopped, and the rotational position is maintained. In this state, the brake release state of the drive wheels 18 and 20 (refer to FIG. 1 or the like) is maintained.

Figure 18:
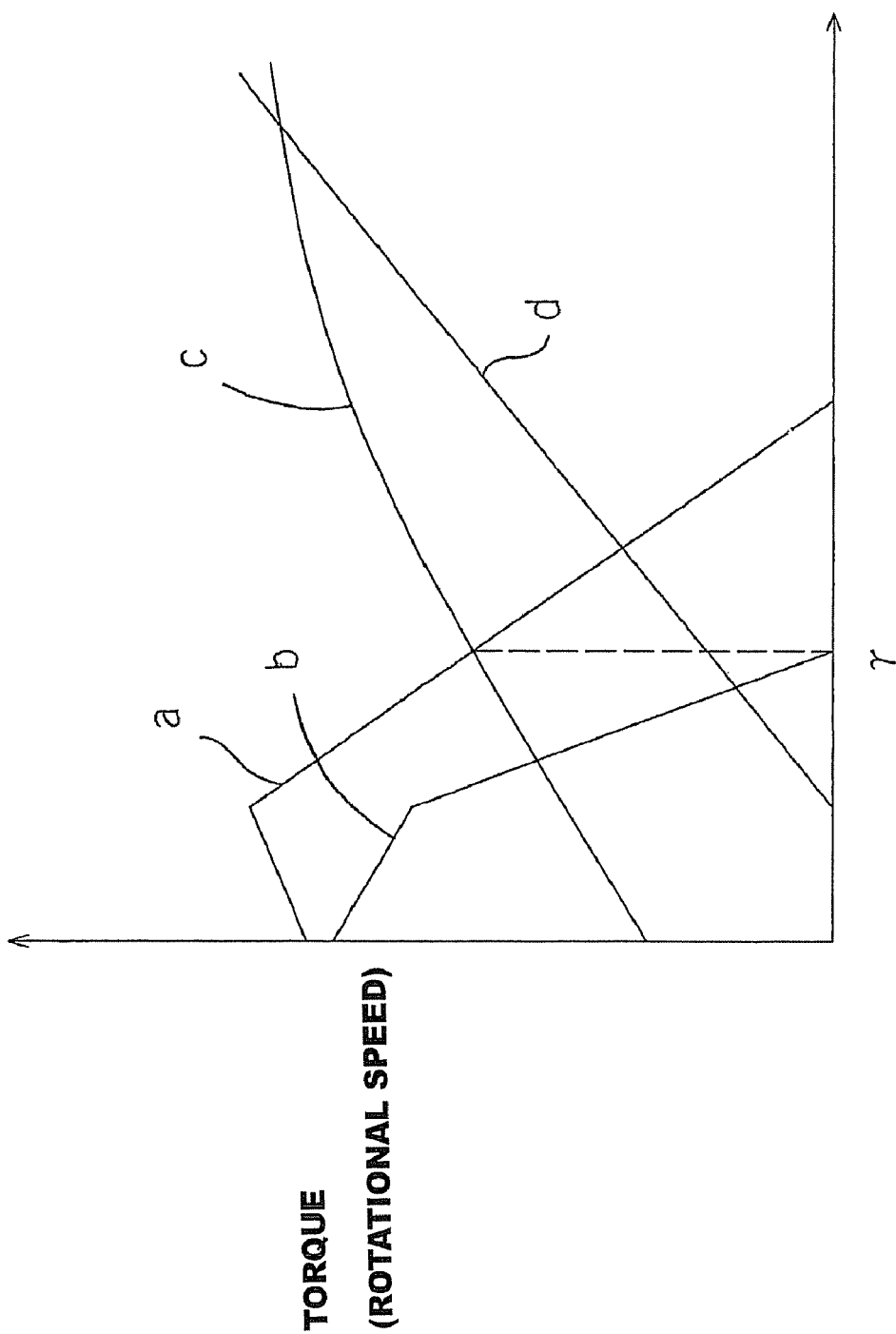
FIG. 18 is a diagram showing, in relation to a rotational angle of the loose-fit arm, a torque and a rotational speed of the brake releasing motor, a torque acting on the loose-fit arm by the spring, and a reduced torque of the brake releasing motor by a variable resistance in the fifth embodiment.

This process will be described with reference to FIG. 18. For the following description of the present embodiment, the reference numerals of FIGS. 15-17 are referred to. FIG. 18 is a diagram showing the torque and rotational speed of the brake releasing motor 82, the torque acting on the loose-fit arm 86 by the spring, and the reduced torque of the brake releasing motor 82 by the variable resistance of the second variable resistance section 172, in relation to the rotational angle of the loose-fit arm 86 in the present embodiment. A solid line a represents a relationship between the torque of the brake releasing motor 82 and the rotational angle of the loose-fit arm 86. A solid line b represents a relationship between the rotational speed of the brake releasing motor 82 and the rotational angle of the loose-fit arm 86. A solid line c represents a relationship between the spring torque acting on the loose-fit arm 86 by the braking spring 72 (FIG. 2 or the like) and the rotational angle of the loose-fit arm 86. A solid line d represents a relationship between the reduced torque of the brake releasing motor 82 by the variable resistance of the second variable resistance section 172 and the rotational angle of the loose-fit arm 86.

As is clear from FIG. 18, as the rotational angle when the loose-fit arm 86 is rotated in the direction of the arrow β in FIG. 16B is increased, the spring torque c is increased, and when the loose-fit arm 86 is rotated to an angle greater than or equal to a predetermined angle, the reduced torque d due to the variable resistance is also increased. Because of this, the torque a of the brake releasing motor 82 is gradually reduced for an angle of the predetermined angle or greater, and in a state where the torque a of the brake releasing motor 82 and the spring torque c are balanced at an angle γ, the rotation of the brake releasing motor 82 is stopped, that is, the rotational speed becomes zero, and a state is achieved in which the rotational position is maintained.

When the brake pedal 52 and the parking brake command device are operated from the state shown in FIG. 16B, and the brake shaft 54 is rotated in the brake realizing direction, as shown in FIG. 16C, the loose-fit arm 84 is also rotated in the brake realizing direction (direction of the arrow α). In this case, the gap between the leg sections 116 of the displacement permitting spring 114 is elastically widened in a state where the displacement of the loose-fit arm 86 continues to be stopped.

In the present embodiment, even though the solenoid 90 is omitted, the collision of the loose-fit arm 86 and the swinging arm 84 to the inner surface of the housing 80 by the driving of the brake releasing motor 82 is prevented. In addition, as is clear from FIG. 18, the current which continues to flow in the brake releasing motor 82 can be reduced. Because of this, disadvantages such as burn-out of the brake releasing motor 82 can be more effectively prevented. Therefore, the endurance of the brake releasing motor 82 can be improved and the reliability can be improved. In addition, the power consumption when the brake is released can be reduced. The other structures and operations are similar to those of the first embodiment shown in FIGS. 1-10, and will not be repeatedly described or shown in the figures.

[Sixth Embodiment]

Figure 19:
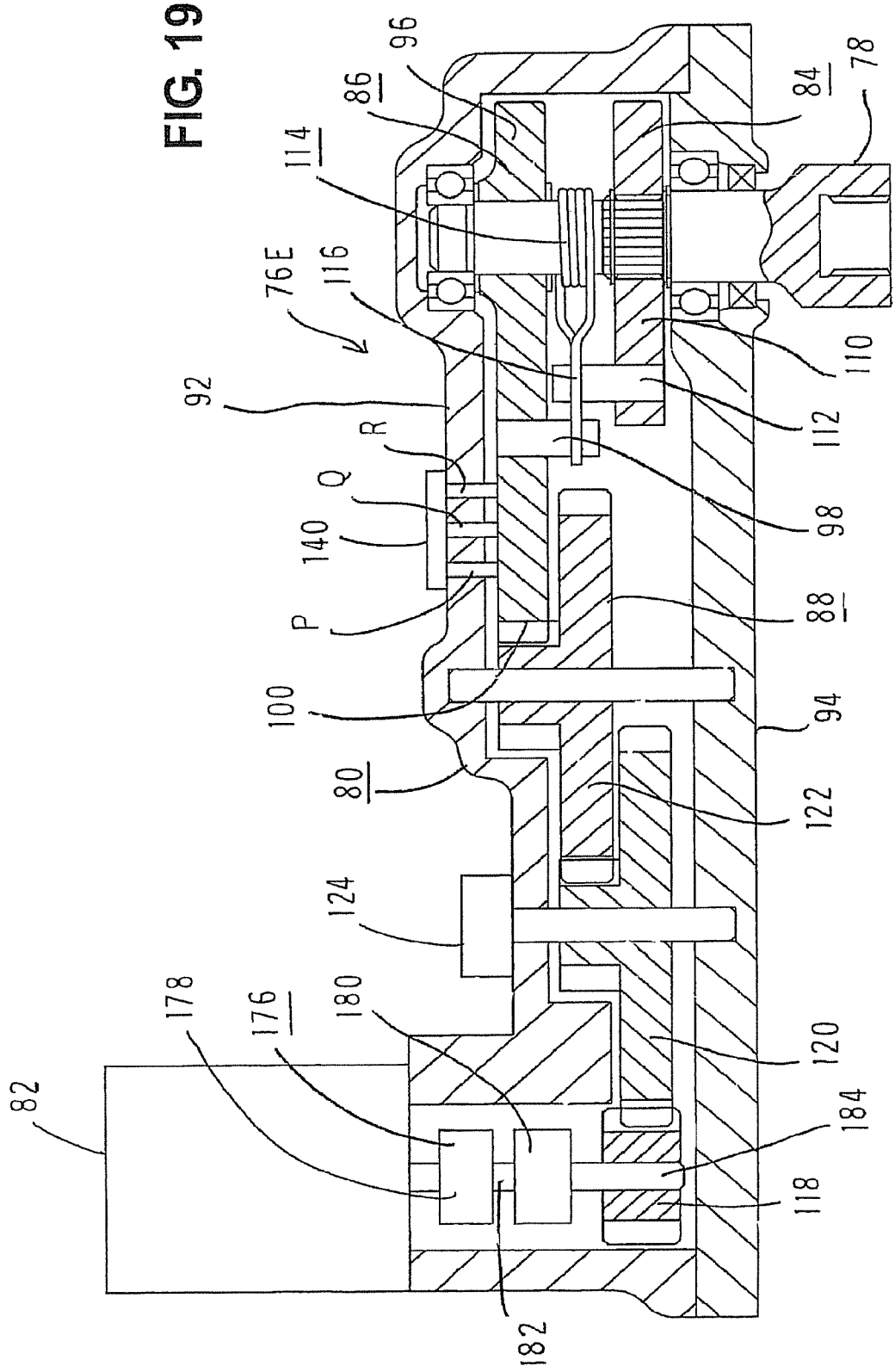
FIG. 19 is a diagram corresponding to FIG. 5 and showing a brake releasing unit in a sixth embodiment of the present invention.
Figure 20A:
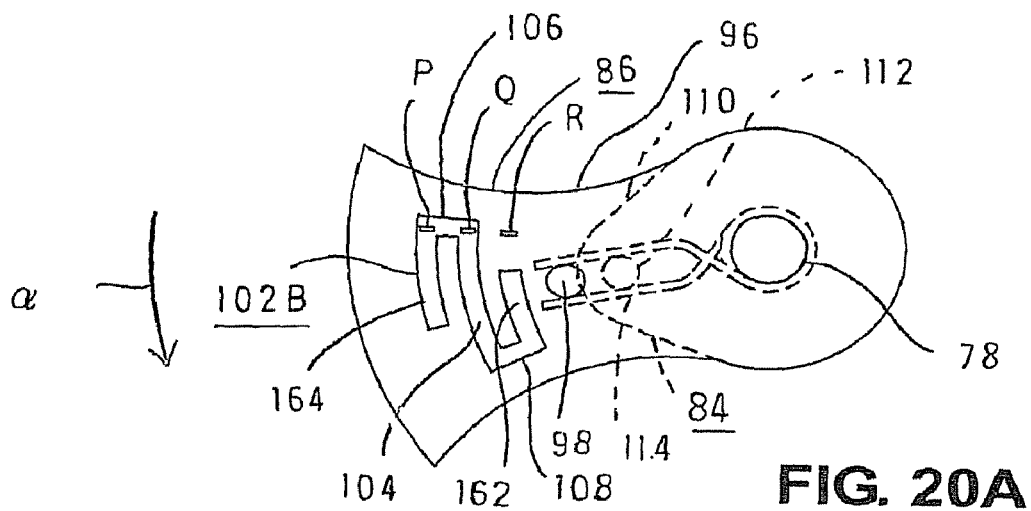
FIG. 20A is a diagram showing rotation of the brake shaft in the brake realizing direction by the braking spring when the power supply is in the OFF state in the sixth embodiment of the present invention, and a diagram in which the brake shaft side rotational shaft, the swinging arm, the displacement permitting spring, and the loose-fit arm are taken out of FIG. 19 and viewed from the top toward the bottom.
Figure 20B:
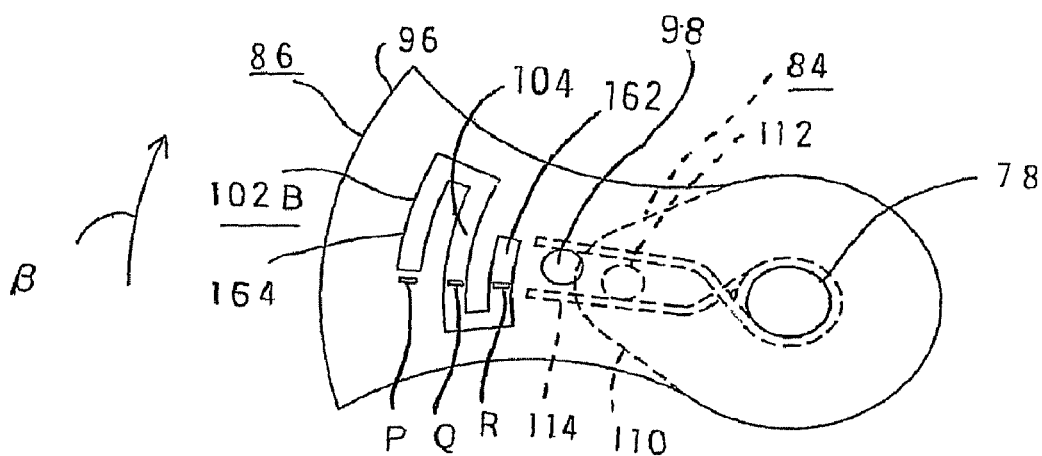
FIG. 20B is a diagram related to FIG. 20A and showing switching OFF of the brake releasing motor in a brake release state after the brake shaft is rotated in the brake releasing direction by the driving of the brake releasing motor when the power supply is in the ON state in the sixth embodiment of the present invention.
Figure 20C:
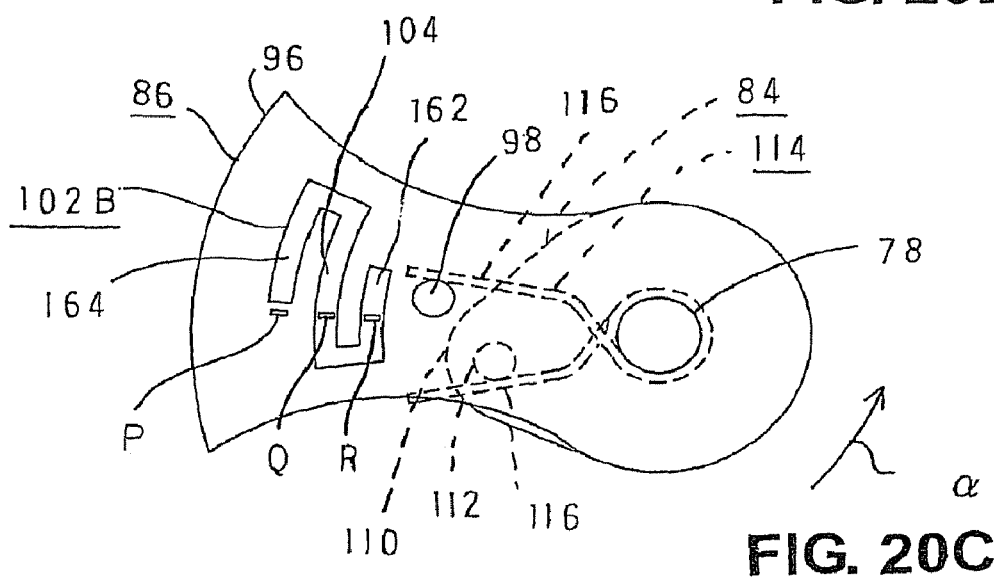
FIG. 20C is a diagram related to FIG. 20A and showing rotation of the brake shaft in the brake realizing direction by an operation of the brake pedal when the power supply is in the ON state in the sixth embodiment of the present invention.

FIG. 19 is a diagram corresponding to FIG. 5 and showing a brake releasing unit 76E in a sixth embodiment of the present invention. FIG. 20A is a diagram showing rotation of the brake shaft in the brake realizing direction by the braking spring when the power supply is in the OFF state in the present embodiment, and is a diagram viewed from the top toward the bottom in which the brake shaft side rotational shaft 78, the swinging arm 84, the displacement permitting spring 114, and the loose-fit arm 86 are taken out of FIG. 19. FIG. 20B is a diagram related to FIG. 20A and showing switching OFF of the brake releasing motor 82 in the brake releasing state of the brake after the brake shaft is rotated in the brake releasing direction by the driving of the brake releasing motor 82 when the power supply is in the ON state in the present embodiment. FIG. 20C is a diagram related to FIG. 20A and showing rotation of the brake shaft in the brake realizing direction by an operation of the brake pedal when the power supply is in the ON state in the present embodiment.

In the present embodiment also, unlike the first embodiment shown in FIG. 5, the solenoid is omitted from the brake releasing unit 76. Accordingly, the hole for engagement of the shaft portion of the solenoid to the first intermediate gear 120 is not formed.

In place of such a structure, in the present embodiment, as shown in FIG. 19, an operative connection mechanism which operatively connects the rotational shaft of the brake releasing motor 82 provided in the brake releasing unit 76E and the loose-fit arm 86 which is the displacement member is formed by the gear mechanism 88 and a clutch mechanism 176. The clutch mechanism 176 comprises a lock-type one-way clutch 178 and an electromagnetic clutch 180. The lock-type one-way clutch 178 is provided between the rotational shaft of the brake releasing motor 82 and an intermediate shaft 182 which is coaxially placed with the rotational shaft, and which is a rotational member on the side of the loose-fit arm 86. The electromagnetic clutch 180 is provided between the intermediate shaft 182 and a shaft 184 fixed on a motor gear 118 constituting the gear mechanism 88.

The lock-type one-way clutch 178 has functions to transmit the rotational force by the driving of the brake releasing motor 82 through the intermediate shaft 182 or the like to the side of the loose-fit arm 86, and to block the transmission of the rotational force from the side of the loose-fit arm 86 to the brake releasing motor 82 by stopping the rotation of the intermediate shaft 182 on the side of the loose-fit arm 86, that is, by locking the intermediate shaft 182. In general, the one-way clutches include two types: the above-described lock-type one-way clutch and a free-rotation type one-way clutch. The free-rotation type one-way clutch has functions to transmit the rotational force from one side to the other side and to block the transmission of the rotational force from the other side to the one side by setting the rotation of the rotational member of the other side to a free rotation state without being limited by the rotational member of the one side. The lock-type one-way clutch used in the present embodiment, on the other hand, has functions to transmit the rotational force from one side to the other side and to block the transmission of the rotational force from the other side to the one side by stopping the rotation of the rotational member on the other side. The electromagnetic clutch 180 has functions to enable transmission of the motive power between the side of the intermediate shaft 182 which is the side of the brake releasing motor 82 and the side of the shaft 184 which is the side of the loose-fit arm 86 when electricity is supplied, and to block the transmission of motive power between the side of the intermediate shaft 182 and the side of the shaft 184 when the supply of electricity is stopped.

In addition, the structure is configured to stop the supply of electricity of the brake releasing motor 82 when the loose-fit arm 86 is rotated a predetermined angle when the brake is released. Because of this, as shown in FIGS. 20A-20C, a conductive section 102B fixed on one side of the loose-fit arm 86 is formed in a shape similar to that in the fifth embodiment shown in FIGS. 16A-16C and in which lengths of the base side arc section 162 and the tip side arc section 164 are reduced. Moreover, the overall conductive section 102B is formed with a material having the same conductivity.

Figure 21:
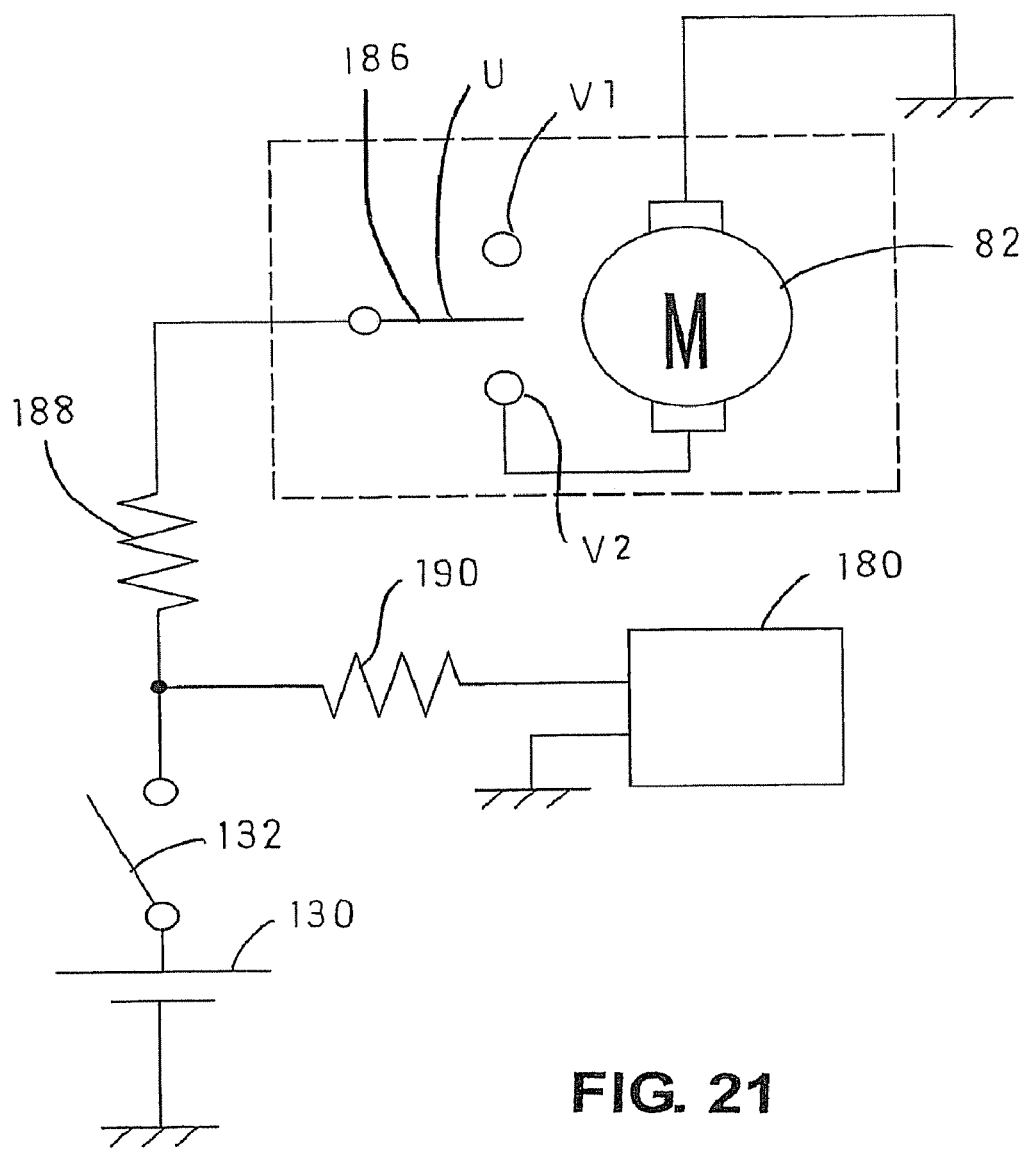
FIG. 21 is a diagram showing a motor driving circuit which supplies electricity to the brake releasing motor and the electromagnetic clutch in the sixth embodiment of the present invention.

The tips of the three contact point sections P, Q, and R can contact the conductive section 102B. FIG. 21 is a diagram showing a motor driving circuit for supplying electricity to the brake releasing motor 82 and the electromagnetic clutch 180 in the present embodiment. The positive electrode side of the battery 130 and the brake releasing motor 82 can be connected through the main switch 132, a resistor 188, and a switching switch 186. The switching switch 186 can be switched between connection of the switching contact point U connected to the side of the main switch 132 to the second contact point V2 connected to the brake releasing motor 82 and to the first contact point V1.

In order to realize this function, of the three contact point sections P, Q, and R of the contact point unit 140 fixed on the upper side of the housing 80, the middle contact point section Q and the conductive section 102B form the switching contact point U of the switching switch 186. In addition, the middle contact point section Q is connected to the resistor 188 and the main switch 132 through a cable (not shown). Of the three contact point sections P, Q, and R, the contact point section R on the side of the swinging center axis forms the first contact point V1 (FIG. 21). Of the three contact point sections P, Q, and R, the contact point section P on the side of the brake releasing motor 82 forms the second contact point V2 (FIG. 21). In addition, as shown in FIG. 8, the second contact point V2 is connected to the brake releasing motor 82.

In addition, the main switch 132 is connected through the resistor 190 to the electromagnetic clutch 180. As shown in FIGS. 20A-20C, of the three contact point sections P, Q, and R, a lower end of the middle contact point section Q contacts the arc section 104 of the conductive section 102B during swinging displacement of the loose-fit arm 86 in a certain range. A lower end of the contact point section R forming the first contact point V1 can contact the base side arc section 162 of the conductive section 102 in a certain range when the loose-fit arm 86 is rotated from a state in which the loose-fit arm 86 is moved to the brake realizing direction (direction of the arrow α in FIG. 20A) to the brake releasing direction (direction of the arrow β in FIG. 20B). A lower end of the contact point section P forming the second contact point V2 can contact the tip side arc section 164 of the conductive section 102 in a certain range when the loose-fit arm 86 is rotated from a state in which the loose-fit arm 86 is moved in the brake releasing direction to the brake realizing direction.

An approximate S-shape is employed for the conductive section 102 and three contact point sections P, Q, and R are employed in order to allow the use of the common conductive section 102B and contact point sections P, Q, and R even when the rotational direction of the brake shaft 54 (refer to FIG. 2 or the like) becomes opposite in relation to the brake realization and brake release of the brake due to, for example, the left and right positions of the brake arm 70 (refer to FIG. 2 or the like) becoming opposite, and to consequently reduce the cost. Therefore, if such a consideration is not necessary, the conductive section 102B may be formed in an approximate C-shape with only the arm section 106 oriented toward the tip side of the loose-fit arm 86, the arc section 104, and the tip side arc section 164, and only two contact point sections which can contact the conductive section 102B of the approximate C-shape may be employed for the contact point sections.

In a lawnmower vehicle 10 having such a brake releasing unit 76, the brake and brake release are realized in the following manner First, a case will be described in which supply of electricity to the brake releasing motor 82 is stopped by, for example, switching OFF of the power supply switch. In this case, as shown in FIG. 21, the main switch 132 is switched OFF, and the supply of electricity to the brake releasing motor 82 and the electromagnetic clutch 180 is stopped. Because of this, transmission of rotation between the intermediate shaft 182 and the shaft 184 by the electromagnetic clutch 180 is stopped, and a motive power transmission function of the gear mechanism 88 between the motor gear 118 and the loose-fit arm 86 can be realized. In this state, the brake shaft 54 (FIG. 2 or the like) is rotated in the brake realizing direction by the brake spring 72 (FIG. 2 or the like). Because of this, as shown in FIG. 20A, the swinging arm 84 is rotated in the brake realizing direction (direction of the arrow α), the loose-fit arm 86 is also rotated in the brake realizing direction (direction of the arrow α) integrally with the swinging arm 84 by the elastic force of the displacement permitting spring 114, and the braked state of the drive wheels 18 and 20 (refer to FIG. 1) is realized. Therefore, downward slipping of the vehicle is prevented even when the vehicle is on an inclined surface at the time when the power supply switch is switched OFF.

When the power supply switch is switched ON, as shown in FIG. 20A, the contact point section P forming the second contact point V2 and the middle contact point section Q forming the switching contact point U of the switching switch 186 are connected through the conductive section 102B. Therefore, electricity is supplied from the battery 130 to the brake releasing motor 82, and the brake releasing motor 82 is driven. With this driving, the brake releasing motor 82 is rotated in one direction, the rotational force of the brake releasing motor 82 is transmitted through the gear mechanism 88 to the loose-fit arm 86, and the loose-fit arm 86 is rotated in the direction of the arrow β of FIG. 20B which is the brake releasing direction. In this case, in a state where the loose-fit arm 86 is rotated by a certain angle, the contact point section P forming the second contact point V2 is separated from the tip side arc section 164 of the conductive section 102B, as shown in FIG. 20B. Because of this, the switching switch 186 is switched to a position shown in FIG. 21, the supply of electricity to the brake releasing motor 82 is stopped, and the driving is stopped. In this state, because the electromagnetic clutch 180 is being driven, the motor gear 118 cannot be rotated from the side of the brake shaft side rotational shaft 78, and the position of the loose-fit arm 86 is maintained. Therefore, the brake release state of the drive wheels 18 and 20 (refer to FIG. 1) is maintained.

When the brake shaft 54 is rotated to the brake realizing direction from the state shown in FIG. 20B by operation of the brake pedal 52 or the parking brake command device, the swinging arm 84 is also rotated in the brake realizing direction (direction of α) as shown in FIG. 20C. In this case, in a state where the displacement of the loose-fit arm 86 is stopped, the gap between the leg sections 116 of the displacement permitting spring 114 is elastically widened.

In the present embodiment having the configuration as described above, even though the solenoid is omitted, the collision of the loose-fit arm 86 and the swinging arm 84 with the inner surface of the housing 80 by the driving of the brake releasing motor 82 is prevented. In addition, because the supply of electricity to the brake releasing motor 82 can be stopped in the brake release state, disadvantages such as burn-out of the brake releasing motor 82 can be more effectively prevented. Therefore, the endurance of the brake releasing motor 82 can be improved and the reliability can be improved. In addition, the power consumption when brake is released can be reduced. The other structures and operations are similar to those of the first embodiment shown in FIGS. 1-10, and will not be repeatedly described or shown in the figures.

[Seventh Embodiment]

Figure 22:
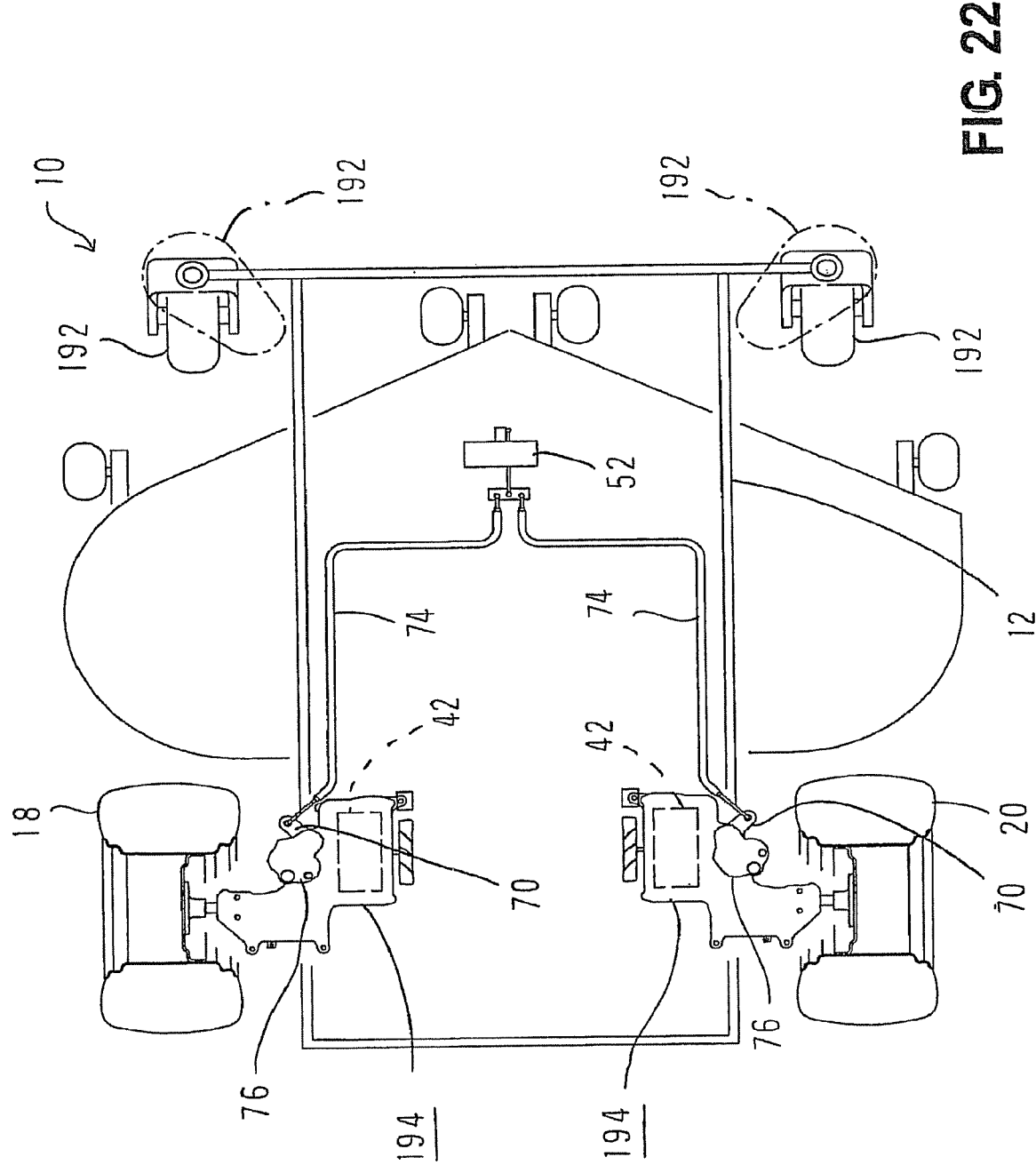
FIG. 22 is a diagram schematically showing a lawnmower vehicle which is a electric vehicle according to a seventh embodiment of the present invention.

In the above-described embodiments, the lawnmower vehicle 10 can be steered by the Ackermann-type steering mechanism. Alternatively, as described below in a seventh embodiment and an eighth embodiment of the present invention, the structure having the brake releasing units 76 and 76A-76E (in the present embodiment, simply referred to with "76"), the brake shaft 54, the friction plate 56, and the braking spring 72 provided in the above-described embodiments can be applied to a lawnmower vehicle 10 having a steering mechanism of a different form. FIG. 22 is a schematic diagram showing a lawnmower vehicle 10 of the seventh embodiment of the present invention.

The lawnmower vehicle 10 of the present embodiment comprises left and right caster wheels 192, left and right drive wheels 18 and 20, and a left and right traction electric motors which drive the drive wheels 18 and 20 independently for the left and the right wheels. Specifically, two caster wheels 192 at left and right are supported on a front of the main frame 12. The caster wheel 192 can be freely rotated in an angle of greater than 360 degrees around a steering control axis in the vertical direction. In the case of the present embodiment, similar to the above-described embodiments, a steering operation element (not shown) is provided, and a steering angle sensor (not shown) for detecting a steering angle of the steering operation element is provided. Two drive wheels 18 and 20 on the left and right are supported on a rear of the main frame 12.

In addition, a motive power generating unit 194 is connected to each of the axles of the drive wheels 18 and 20. The motive power generating unit 194 comprises a housing which is a package supported on the main frame 12, and the brake releasing unit 76 provided on an upper side of the housing. The traction electric motor 42 is provided in the housing, and the rotational shaft of the traction electric motor 42 is operatively connected to the axles of the drive wheels 18 and 20 through the motive power transmission mechanism (not shown). In other words, the axle of each of the drive wheels 18 and 20 can be rotated by the traction electric motor 42. The steering angle detected by the steering angle sensor and an amount of depression which is an amount of operation of the accelerator pedal detected by a pedal sensor are input to the controller (not shown) as detection signals. The controller calculates a target average velocity and a target velocity difference of the traction electric motors 42 based on the steering angle and the amount of depression, and calculates a target torque or a target rotational speed of each of the traction electric motors 42. The controller controls to drive the traction electric motor 42 at the target torque or the target rotational speed.

For example, when the vehicle is run straight, the traction electric motors 42 are controlled to be driven at the same target rotational speed. When, on the other hand, the vehicle is to be turned, the target rotational speeds of the traction electric motors 42 are set to different values. For example, when the vehicle is to be turned to the right while the vehicle is moving forward, the rotational speed of the left side traction electric motor 42 is set higher than the rotational speed of the right side traction electric motor 42. When, on the other hand, the vehicle is to be turned to the left while the vehicle is moving forward, the rotational speed of the right side traction electric motor 42 is set higher than the rotational speed of the left side traction electric motor 42.

Alternatively, in place of the steering operation element, two swinging-type levers on the left and right having the functions of the turning operation element and the acceleration operation element may be provided on both left and right sides of the seat (not shown), and the turning direction and running velocity may be commanded by the left and right levers. For example, moving forward in the straight direction may be commanded by tilting the left and right levers toward the front by the same amount, and the vehicle may be turned to the left or right during the forward movement by setting different amounts of tilt to the front for the left and right levers. In other words, the target rotational speeds of the left and right traction electric motors 42 can be commanded by the amounts of tilt of the left and right levers. The amounts of tilt of the left and right levers are detected by a lever angle sensor and are input to the controller, and the controller calculates the target rotational speed or the target torque of each traction electric motor 42, and controls the driving of each traction electric motor 42.

In FIG. 22, the caster wheels 192 are set as the front wheels and the drive wheels 18 and 20 are set as the rear wheels, but alternatively, the caster wheels 192 may be set as the rear wheels and the drive wheels 18 and 20 may be set as the front wheels. In addition, the number of the caster wheels 192 is not limited to 2, and may be 1 or 3 or greater.

Similar to the above-described embodiments, the brake shaft 54 (refer to FIG. 2 or the like) is provided in the housing of the motive power generating unit 194, and the friction plate fixed on the rotational shaft of the traction electric motor 42 or a member which rotates in connection with the rotational shaft of the traction electric motor 42 is allowed to be frictionally braked by the brake shoe by rotating the brake shaft 54 in the brake realizing direction, which is one direction. In addition, an upper end of the brake shaft 54 is connected to the brake shaft side rotational shaft 78 (refer to FIG. 5 or the like) of the brake releasing unit 76. Moreover, the brake arm 70 is fixed on the brake shaft 54, and the brake arm 70 and the displacement member which is displaced according to the depression of the brake pedal 52 are connected by the brake link 74 (or brake cable). When the brake pedal 52 is operated, that is, when the brake pedal 52 is depressed, the brake shaft 54 is rotated in the brake realizing direction. In addition, the braking spring 72 (refer to FIG. 2 or the like) is connected to the brake arm 70, to apply an elastic force to the brake shaft 54 in a direction to rotate in the brake realizing direction.

Furthermore, the brake releasing motor 82 (refer to FIG. 5 or the like) is provided which rotates the brake shaft 54 in the brake releasing direction by the brake releasing unit 76 during normal running. As the structure for such a brake releasing unit 76, the structure of any one of the above-described embodiments may be employed. In addition, the brake realizing direction and the brake releasing direction of the brake shaft 54 are set opposite for the left and right brake shafts 54 in the plan view as shown in FIG. 22. Because of this, the structures of the brake releasing unit 76 and the brake arm 70 are symmetric, more specifically, symmetric to the left and right, about a virtual plane passing through a center of the vehicle in the width direction. Because of this, for example, as in the first embodiment shown in FIGS. 7A-7C or the like, the approximately S-shaped conductive section 102 and the contact point unit 140 or the like can be commonly used for at least a part of the structures between left and right brake releasing units 76. Alternatively, a parking brake command device may be provided on the lawnmower vehicle 10 to maintain the state where the brake shaft 54 is rotated in the brake realizing direction. The other structures and operations are similar to those of any one of the above-described embodiments.

[Eighth Embodiment]

Figure 23:
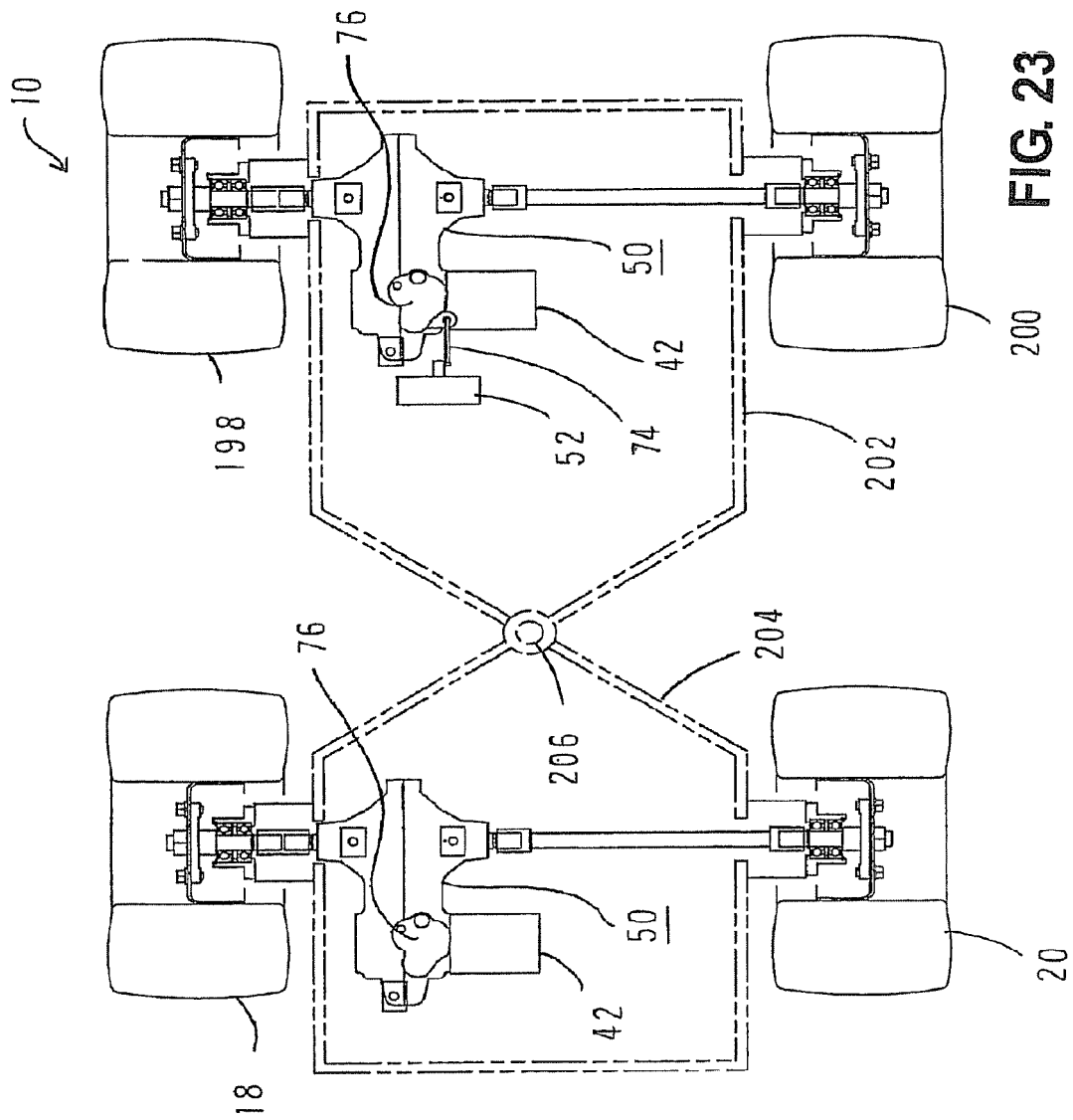
FIG. 23 is a diagram schematically showing a lawnmower vehicle which is a electric vehicle according to an eighth embodiment of the present invention.

FIG. 23 is a schematic diagram showing a lawnmower vehicle 10 of an eighth embodiment of the present invention. The lawnmower vehicle 10 of the present embodiment is a vehicle with an articulated-type turning mechanism comprising an articulated-type steering mechanism, that is, a structure where the body can be bent. The lawnmower vehicle 10 comprises a front frame 202 which supports drive wheels 198 and 200 which are two front wheels, a rear frame 204 which supports drive wheels 18 and 20 which are two rear wheels, a connection section which connects the front frame 202 and the rear frame 204 in a manner to allow bending at the body, a steering operation element (not shown) which is a turn operation element, an accelerator pedal (not shown) and the brake pedal 52. The lawnmower vehicle 10 further comprises a steering device (not shown) which changes the body bending angle between the front frame 202 and the rear frame 204 in connection with the operation of the steering operation element. The steering device comprises a turning cylinder (not shown) connected between the front frame 202 and the rear frame 204, and the turning cylinder is extended and retracted in connection with the operation of the steering operation element, to bend, that is, to swing, the front frame 202 with respect to the rear frame 204 around a center pin 206 provided at a connection section of the frames 202 and 204, so that the body bending angle changes according to the rotational angle of the steering operation element.

A lawn mower 22 (refer to FIG. 1) is provided on a lower side of the front frame 202 or the rear frame 204 between the front drive wheels 198 and 200 and the rear drive wheels 18 and 20. A motive power generating unit 50 including the traction electric motor 42 and the brake releasing unit 76 and 76A-76E (hereinafter simply referred to as "76") having a structure similar to any one of first through sixth embodiments shown in FIGS. 1-21 are provided between the axles of the left and right front drive wheels 198 and 200. The motive power generating unit 50 comprises a motive power transmitting mechanism which has a differential gear mechanism and which operatively connects the traction electric motor 42 and the axle.

With the controller (not shown) provided on the lawnmower vehicle 10, the driving of the traction electric motor 42 of each motive power generating unit 50 is controlled based on the amount of operation of the accelerator pedal. In addition, a displacement member which is displaced according to the amount of depression of the brake pedal 52 is connected with the brake link 74 (or brake cable) to the brake arm 70 of the brake releasing unit 76 provided on the side of the motive power generating unit 50 on the front (right side in FIG. 23). The brake arm 70 is not provided on the brake releasing unit 76 provided on the side of the motive power generating unit 50 on the rear (left side of FIG. 23), but alternatively, it is also possible to apply an elastic force in the brake realizing direction by the braking spring through the brake arm or the like to the brake shaft. Alternatively, the brake releasing unit 76 may be provided only on the side of the front or rear motive power generating unit 50. The other structures and operations are similar to any one of the first through sixth embodiments shown in FIGS. 1-21.

In the present embodiment, similar to the seventh embodiment shown in FIG. 22, it is also possible to provide the motive power generating unit 194 and the brake releasing unit 76 independently for left and right. Alternatively, it is also possible to employ a configuration in which the motive power generating units 50 and 194 and the brake releasing unit 76 are provided only on the front or the rear, set only the front wheels or rear wheels as the drive wheels, and set the remaining wheels as follower wheels which are not driven by the electric motor.

[Ninth Embodiment]

Figure 24:
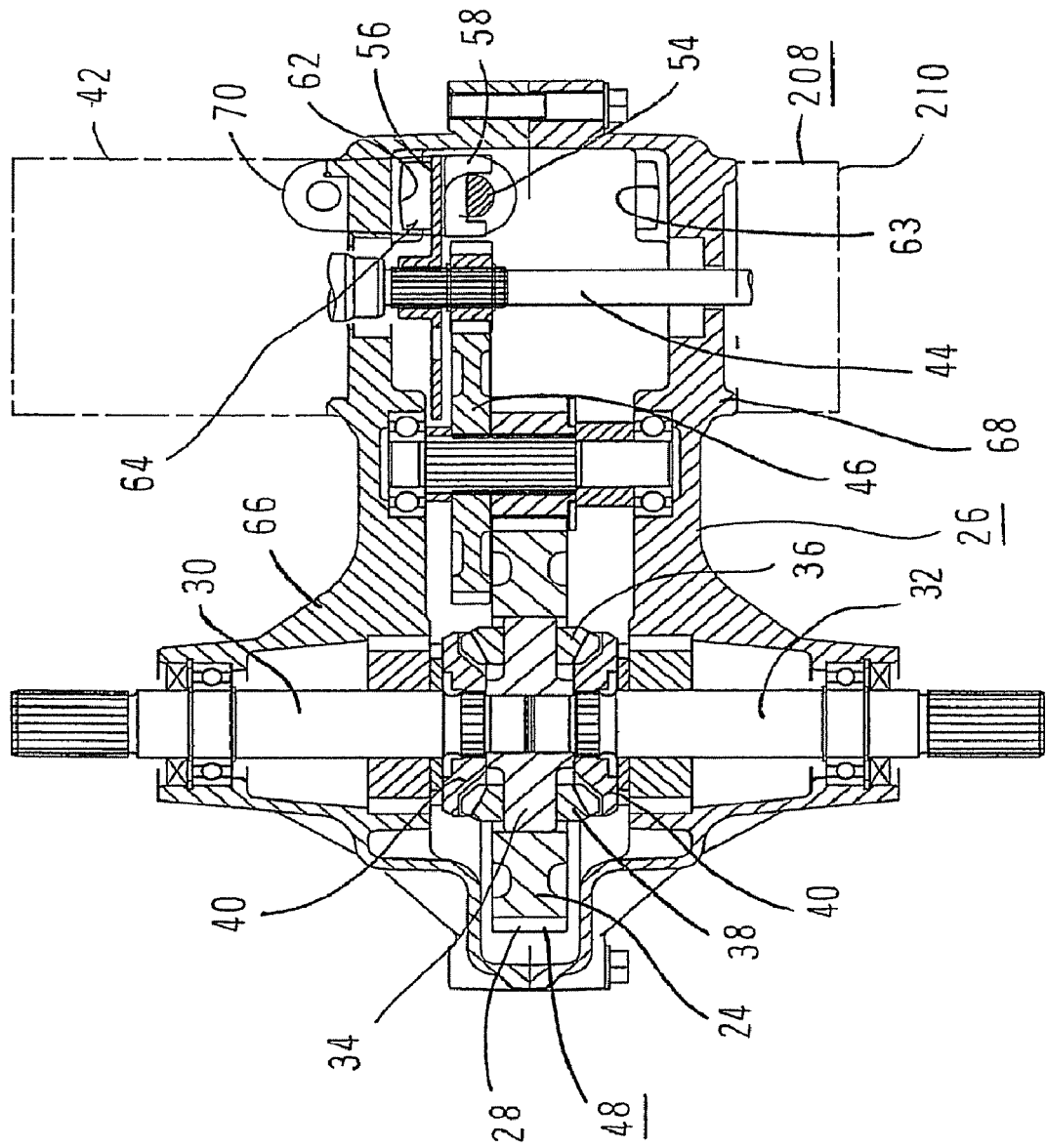
FIG. 24 is a diagram corresponding to FIG. 3 and showing a structure in a ninth embodiment of the present invention and having an electromagnetic brake which enables stopping of rotation of the rotation shaft of the traction electric motor.

FIG. 24 is a diagram corresponding to FIG. 3 and showing a structure in which an electromagnetic brake 208 is provided which enables stopping of the rotation of the rotational shaft 44 of the traction electric motor 42 in a ninth embodiment of the present invention. In the present embodiment, the rotational shaft 44 of the traction electric motor 42 in the configuration of the first embodiment shown in FIGS. 1-10 can be braked by the electromagnetic brake 208. For this purpose, the brake shaft 54 is supported on the gear housing 26 rotatable in two directions, and the frictional plate 56 is connected to the rotational shaft 44 of the traction electric motor 42 in a manner to prohibit relative rotation. The brake shaft 54 can be rotated in the brake realizing direction which is one direction by an operation of the brake pedal 52 (refer to FIG. 1 or the like) which is a brake command device. In addition, in the present embodiment, unlike the first embodiment, the brake releasing unit 76 (FIG. 2 or the like) is not provided.

The friction plate 56 is frictionally braked by the brake shoes 58 and 64 when the brake shaft 54 is rotated in the brake realizing direction. A case 210 which is a package for the electromagnetic brake 208 functioning as the brake releasing unit 76 is fixed on the gear housing 26. The electromagnetic brake 208 has functions to allow free rotation of the rotational shaft 44 of the traction electric motor 42 by being driven when electricity is supplied, and to block the rotation of the rotational shaft 44 of the traction electric motor 42 by being not driven when the supply of electricity is stopped.

For example, the electromagnetic brake 208 comprises a friction plate for electromagnetic braking which is integrally rotated with the rotational shaft 44 of the traction electric motor 42, and a brake plate and an armature placed sandwiching the friction plate for electromagnetic braking. The brake plate is fixed with respect to a yoke member fixed on the case 210, and the armature is movable in the axial direction with respect to the yoke member. The yoke member comprises a spring and a coil, and the spring applies an elastic force to displace the armature to the side of the brake plate. When the electricity is applied to the coil, the armature is attracted to the side of the yoke member by an electromagnetic force. Because of this, when the electricity is supplied to the coil of the electromagnetic brake 208, the armature of the electromagnetic brake 208 is driven, free rotation of the friction plate 56 is enabled, and free rotation of the rotational shaft 44 of the traction electric motor 42 is enabled. On the other hand, when the supply of electricity to the coil is stopped, the driving of the electromagnetic brake 208 is stopped, the armature is pressed against the friction plate for electromagnetic braking by the spring, the friction plate for electromagnetic braking is sandwiched between the brake plate and the armature, and the rotational shaft 44 of the traction electric motor 42 is braked.

During normal running, the spring applies an elastic force to the brake pedal 52 in a direction to swing in the brake releasing direction, and the brake pedal is swung and displaced, and thus the brake shaft 54 is rotated in the brake releasing direction. With such a configuration, free rotation of the traction electric motor 42 is enabled by the driving of the electromagnetic brake 208, and the rotation of the traction electric motor 42 is blocked with the stopping of the driving of the electromagnetic brake 208. Therefore, when the supply of electricity to the traction electric motor 42 is stopped such as, for example, by switching OFF of the power supply switch, the braked state of the drive wheels 18 and 20 (refer to FIG. 1 or the like) is maintained. Because of this, in a structure in which the drive wheels 18 and 20 are driven by the traction electric motor 42, the uncomfortable feeling for the driver with regard to the behavior of the vehicle when the supply of electricity is stopped can be reduced. In other words, with the above-described stopping of the supply of electricity, a brake force is generated during running of the vehicle, and when the vehicle is parked on a slope, even when the brake pedal 52 and the parking brake command device are not operated, the downhill slipping of the vehicle on the slope is prevented. Therefore, the behavior of the vehicle is similar to that of the vehicle in which the wheel is driven by the driving of the hydraulic motor. Therefore, the uncomfortable feeling for the driver can be reduced. The other structures and operations are similar to those of the first embodiment shown in FIGS. 1-10. The structure of the present embodiment having the electromagnetic brake 208 can be applied in combination to a structure in which the brake releasing unit 76 (FIGS. 22 and 23) is omitted in a vehicle having the caster wheel and the vehicle having the articulated type steering mechanism as shown in FIGS. 22 and 23. In the present embodiment, the rotational shaft 44 of the traction electric motor 42 can be directly braked with the electromagnetic brake 208, but alternatively, a configuration may be employed in which free rotation of a coupled rotational member such as gear which rotates in connection with the rotational shaft 44 of the traction electric motor 42 is enabled by the electromagnetic brake 208 to which electricity is supplied, and the rotation of the coupled rotational member is blocked by stopping the supply of electricity to the electromagnetic brake.

[Tenth Embodiment]

Figure 25:
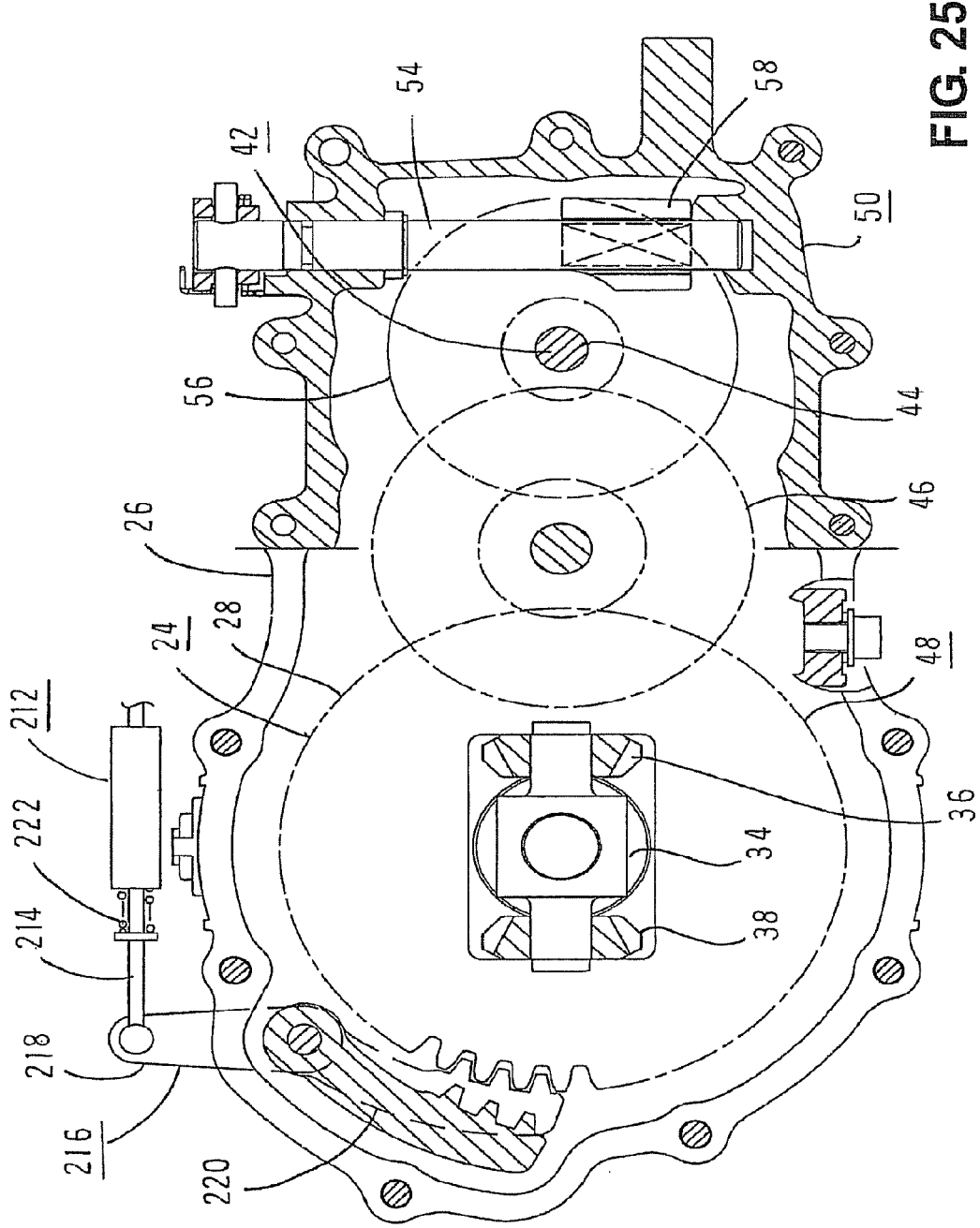
FIG. 25 is a diagram corresponding to FIG. 2 and showing a structure in a tenth embodiment of the present invention and having a ring gear stopping mechanism which enables stopping of rotation of a ring gear of a differential gear mechanism by a link-type actuator.

FIG. 25 is a diagram corresponding to FIG. 2 and showing a structure having a ring gear stopping mechanism which enables, with a link-type actuator 212, stopping of the rotation of the ring gear 28 of the differential gear mechanism 24 in a tenth embodiment of the present invention. In the present embodiment, in the configuration of the first embodiment shown in FIGS. 1-10, the ring gear 28 which is a coupled rotational member that rotates in connection with the rotational shaft 44 of the traction electric motor 42 can be braked by the actuator 212. For this purpose, similar to the ninth embodiment shown in FIG. 24, the brake shaft 54 is supported on the gear housing 26 rotatable in two directions, and the friction plate 56 is connected to the rotational shaft 44 of the traction electric motor 42 in a manner to prohibit relative rotation. In the present embodiment, unlike the first embodiment, the brake releasing unit 76 (FIG. 2 or the like) is not provided. In place of this, the actuator 212 which is the brake releasing unit is provided at a periphery of the gear housing 26. The actuator 212 supports a rod 214 in a manner to allow displacement in the axial direction on a case provided on an upper side of the gear housing 26. In addition, an engagement arm 216 is connected to the rod 214. The engagement arm 216 fixes an engagement section 220 on a support section 218, and a part of the support section 218 and the engagement section 220 are placed in the gear housing 26.

With the connection portion of the support section 218 and the engagement section 220, the engagement arm 216 is supported on a shaft fixed on the gear housing 26 in a manner to allow swinging. Alternatively, a long hole may be formed at a tip of the support section 218, and the engagement arm 216 may be connected to the rod 214 so that the shaft connected to the end of the rod 214 can be moved in the long hole. In addition, the tip of the engagement section 220 is set to oppose the outer peripheral surface of the ring gear 28 so that the engagement arm 216 swings and the teeth provided on the engagement section 220 can be engaged with the teeth on the outer peripheral surface of the ring gear 28 when the rod 214 is elongated. The actuator 212 applies an elastic force in a direction to elongate the rod 214 by a spring 222 provided between the case and the rod 214. The actuator 212 comprises a movement member made of a magnetic material such as iron integrally connected with the rod 214, and a coil provided around the movement member, and is driven such that, when electricity is supplied, the electricity is applied to the coil, and the rod 214 is retracted. Thus, when the electricity is supplied to the actuator 212 and the actuator 212 is driven, the engagement arm 216 does not engage with the ring gear 28, and free rotation of the ring gear 28 which moves in connection with the rotational shaft 44 of the traction electric motor 42 is enabled. When, on the other hand, the supply of electricity to the actuator 212 is stopped, the driving of the actuator 212 is stopped, and the rod 214 is extended by the spring 222, and the engagement arm 216 engages the ring gear 28. Because of this, the rotation of the ring gear 28 which moves in connection with the rotational shaft 44 of the traction electric motor 42 is blocked, and the drive wheels 18 and 20 (refer to FIG. 1 or the like) are braked. In addition, during normal running, an elastic force is applied by the spring to the brake pedal 52 in a direction to swing in the brake releasing direction, and the brake pedal 52 is swung and displaced, and thus the brake shaft 54 is rotated in the brake releasing direction.

According to such a configuration, free rotation of the ring gear 28 is enabled by driving of the actuator 212, and the rotation of the ring gear 28 is stopped with the stopping of the driving of the actuator 212, and thus the braked state of the drive wheels 18 and 20 (refer to FIG. 1 or the like) is maintained when the supply of electricity to the traction electric motor 42 is stopped such as when the power supply switch is switched OFF. Therefore, in a structure in which the drive wheels 18 and 20 are driven by the traction electric motor 42, the uncomfortable feeling for the driver with regard to the behavior of the vehicle when the supply of electricity is stopped can be reduced. More specifically, with the stopping of the supply of electricity as described above, the brake force is generated during the running of the vehicle, and when the vehicle is parked on a slope, the downhill slipping of the vehicle on the slope is prevented even when the brake pedal 52 and the parking brake command device are not operated. Therefore, the behavior of the vehicle becomes similar to that of the vehicle in which the wheel is driven by the driving of the hydraulic motor, and the uncomfortable feeling for the driver can be reduced. The other structures and operations are similar to those of the first embodiment shown in FIGS. 1-10. The structure of the present embodiment in which the actuator 212 is provided can be used in combination in a structure in which the brake release unit 76 (FIGS. 22 and 23) is omitted in the vehicle having the caster wheel or the vehicle having the articulated-type steering mechanism, as shown in FIGS. 22 and 23.

[Eleventh Embodiment]

Figure 26:
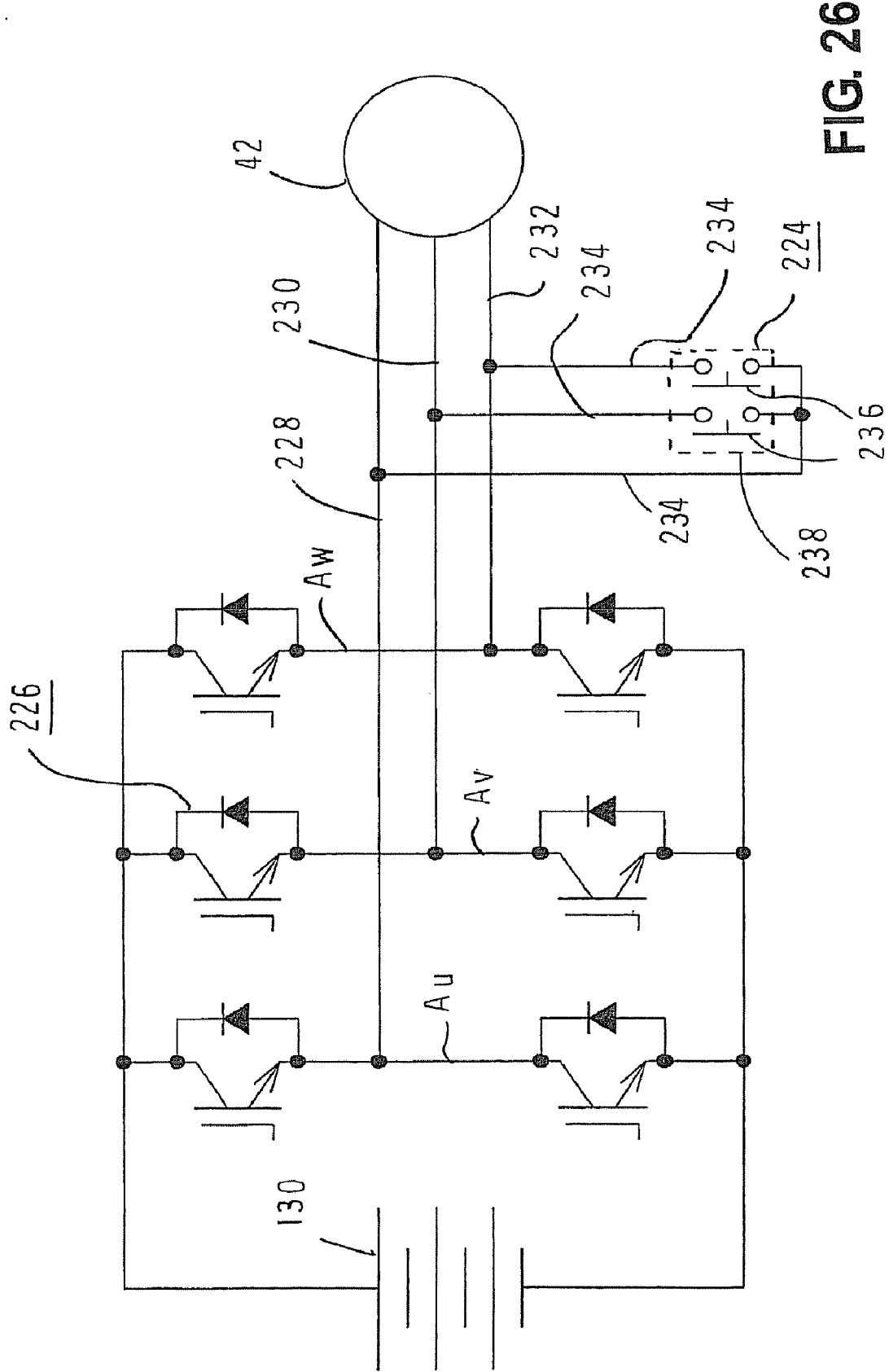
FIG. 26 is a diagram showing a structure which enables stopping of rotation of the traction electric motor by a short-circuiting brake device of an inverter in an eleventh embodiment of the present invention, and which shows a motor driving circuit including the traction electric motor.

FIG. 26 is a diagram showing a structure of an eleventh embodiment of the present invention in which stopping of the rotation of the traction electric motor 42 is enabled by a short-circuiting brake device of an inverter, and shows a motor driving circuit including the traction electric motor 42. In the present embodiment, in the configuration of the first embodiment shown in FIGS. 1-10, the rotation of the rotational shaft of the traction electric motor 42 can be stopped with a short-circuiting brake device 224. For this purpose, three wiring lines 234 are connected to output lines 228, 230, and 232 for connecting arms Au, Av, and Aw of each phase of U phase, V phase, and W phase forming a inverter 226 which drives the traction electric motor 42 and one end of a three-phase stator winding (not shown) of the traction electric motor 42, and a switching switch 238 having an integral connection member 236 which can be simultaneously connected to the terminals of the wiring lines 234 is provided. For the phase arms Au, Av, and Aw of the inverter 226, inverse-parallel connections of a switching element such as a transistor and a diode are connected in series. One end of each of the output lines 228, 230, and 232 is connected to each of the intermediate points of the phase arms Au, Av, and Aw, and the other end of each of the output lines 228, 230, and 232 is connected to the one end of the three-phase stator winding (not shown) of the traction electric motor 42. The other ends of the three-phase stator windings are connected to each other. The battery 130 is connected on the input side of the inverter 226 through a main switch or the like (not shown).

The switching switch 238 comprises, for example, a connection member 236 which can be moved to allow connection and disconnection with respect to the terminal of each wiring line 234, a spring (not shown) which applies an elastic force to the connection member 236 in a direction to connect to the terminal of the wiring line 234, and a coil (not shown) which is supplied with electricity in connection with the connection of the main switch linked to the power supply switch. When electricity is applied to the coil, the movement member made of a magnetic material such as iron provided on the connection member 236 is moved and disconnected from the terminal of the wiring line 234 against the elastic force of the spring. The switching switch 238 and the wiring line 234 form the short-circuiting brake device 224. During normal running, an elastic force is applied by the spring to the brake pedal 52 (refer to FIG. 1 or the like) in a direction to rock in the brake releasing direction, and the brake pedal 52 is swung and displaced, thus rotating the brake shaft 54 (refer to FIG. 2 or the like) in the brake releasing direction. In addition, when the main switch is not connected, such as when the power supply switch is switched OFF, the application of electricity to the coil of the switching switch 38 is stopped, and with the elastic force of the spring, the wiring line 234 is connected by the connection member 236, and the intermediate points of the phase arms Au, Av, and Aw of the inverter 226 are short-circuited. In this case, the driving of the short-circuiting brake device 224 is stopped.

According to such a configuration, free rotation of the traction electric motor 42 is enabled by the driving of the short-circuiting brake device 224, and when the driving of the short-circuiting brake device 224 is stopped, the intermediate points of the phase arms Au, Av, and Aw of the inverter 226 are short-circuited by the switching switch 238 and the rotation of the traction electric motor 42 is stopped. In other words, in this case, the sides of the inverter 226 of the stator windings of the traction electric motor 42 are short-circuited and the rotation of the traction electric motor 42 is stopped. Because of this, the braked state of the drive wheels 18 and 20 (refer to FIG. 1 or the like) is maintained when the supply of electricity to the traction electric motor 42 is stopped such as, for example, when the power supply switch is switched OFF. Thus, in a structure in which the drive wheels 18 and 20 are driven with the traction electric motor 42, the uncomfortable feeling for the driver with regard to the behavior of the vehicle when supply of electricity is stopped can be reduced. In other words, with the stopping of the supply of electricity as described above, the braking force is generated during the running of the vehicle, and when the vehicle is parked on a slope, the downhill slipping of the vehicle on the slope is prevented even when the brake pedal 52 and the parking brake command device are not operated. Because of this, the behavior of the vehicle becomes similar to that of a vehicle in which the axle is driven by the driving of the hydraulic motor. Therefore, the uncomfortable feeling for the driver can be reduced. The other structures and operations are similar to those of the first embodiment shown in FIGS. 1-10. The structure of the present embodiment including the short-circuiting brake device 224 can be used in combination with any of the embodiments described above, including the first embodiment.

[Twelfth Embodiment]

Figure 27:
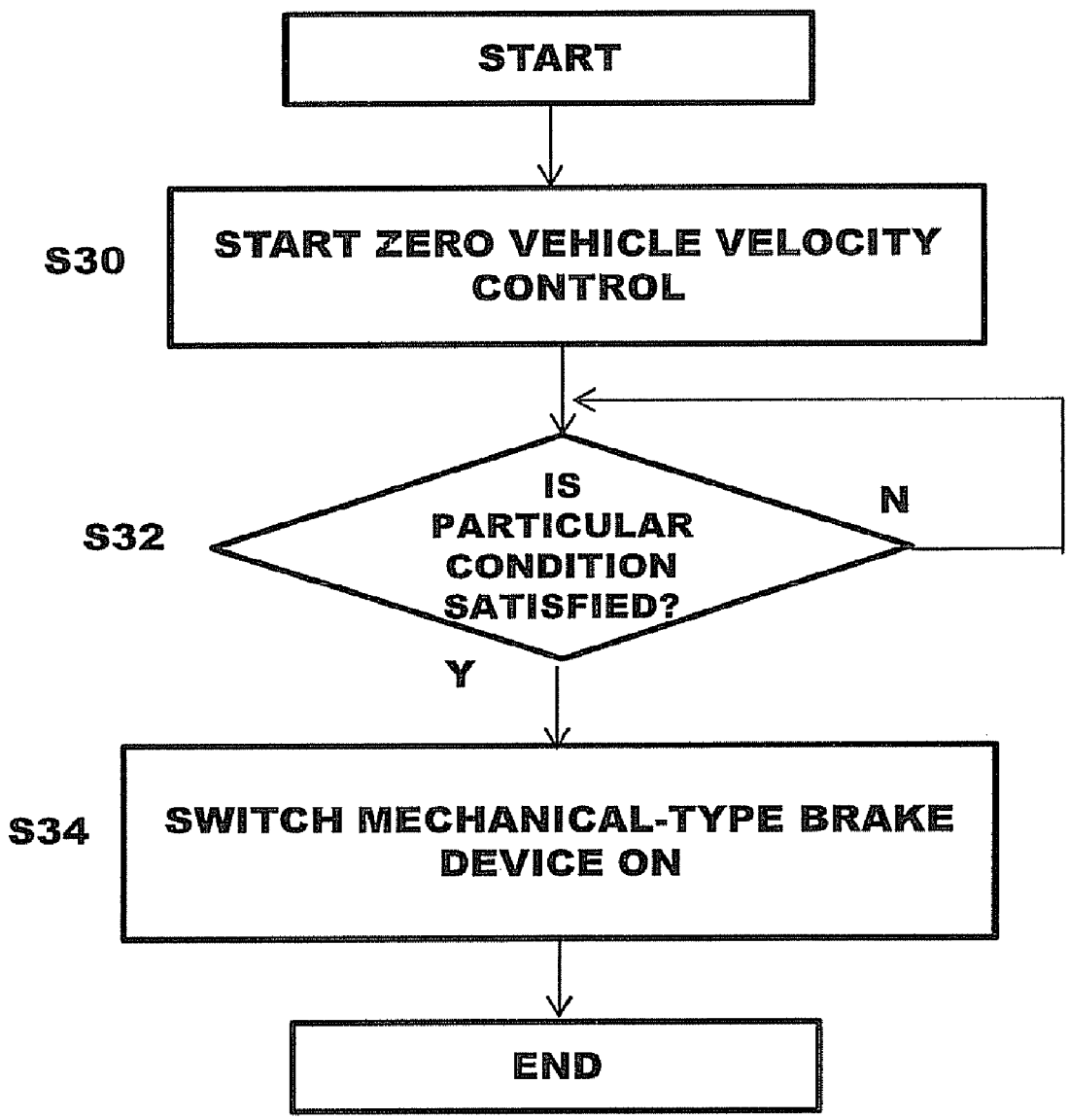
FIG. 27 is a flowchart showing a method of a zero vehicle velocity control for maintaining the vehicle velocity at zero in a twelfth embodiment of the present invention.

FIG. 27 is a flowchart showing a method of executing a zero vehicle velocity control for maintaining the vehicle velocity at zero in a twelfth embodiment of the present invention. In the present embodiment, in one of the configurations of the first through tenth embodiments shown in FIGS. 1-25, execution of the zero vehicle velocity control is enabled. In this case, the controller (not shown) judges that the accelerator pedal is not operated, that is, the accelerator pedal is not depressed, based on an input of a detection signal of a pedal sensor, and controls the driving of the traction electric motor 42 (refer to FIG. 1 or the like) to set the vehicle velocity to 0. Specifically, when the vehicle is parked on a flat place, the driving of the traction electric motor 42 can be simply stopped, but when the vehicle is parked on an inclined surface, the traction electric motor 42 is controlled such that a current is applied to the traction electric motor 42 to generate the torque and the vehicle velocity becomes 0, that is, the rotational speed of the traction electric motor 42 becomes 0, in order to prevent downhill slipping of the vehicle. For this purpose, a rotational speed sensor which detects the rotational speed of the traction electric motor 42 or a rotational angle sensor is provided, and the detected rotational speed or rotational angle is input to the controller.

With such a configuration, even when the accelerator pedal and the brake pedal 52 (refer to FIG. 1 or the like) are not operated on an inclined surface, the downhill slipping of the vehicle can be prevented. However, when such a zero vehicle velocity control is executed, current must be applied in the same state to the three-phase stator windings while the rotation of the traction electric motor 42 is stopped, and thus there is, still a possibility of disadvantages such as burn-out of the traction electric motor 42 and the inverter 226 (Refer to FIG. 26). In order to prevent such disadvantages, in the present embodiment, when a preset particular condition such as that the vehicle speed is zero and the current value is greater than or equal to a predetermined value, is satisfied, a mechanical-type brake device which is one of the braking spring 72, the electromagnetic brake 208, and the link-type actuator 212, is used to execute the zero vehicle velocity control.

That is, as shown in FIG. 27, when the controller judges that the zero vehicle velocity control is to be started in S30 by, for example, the accelerator pedal being not operated, it is judged in S32 whether or not a particular condition is satisfied. If it is judged that the particular condition is satisfied, the process transitions to S34, and the mechanical-type brake device described above is used, that is, the mechanical-type brake device is switched ON. In cases such as a low brake capability of the mechanical-type brake device, the driving of the traction electric motor 42 may be used in combination to the mechanical-type brake device, to execute the zero vehicle velocity control. In this case, the current which is input to the traction electric motor 42 may be set to a small current. Because of this, the traction electric motor 42 can be protected and energy can be conserved. In other words, as the method of using the mechanical-type brake device in S34, there are a first method in which the vehicle velocity is maintained at zero using only the mechanical-type brake device, and a second method in which the driving of the traction electric motor 42 with a small current and the mechanical brake device are both used, when the vehicle attempts to move although the accelerator pedal is not operated such as on the inclined surface. Either one of these methods may be employed. Such a mechanical-type brake device constitutes a protection unit of the traction electric motor 42. The other structures and operations are similar to those of any one of the first through tenth embodiments shown in FIGS. 1-25. The above-described particular condition may alternatively be a condition that the time of continued application of the current to the traction electric motor 42 becomes greater than or equal to a predetermined time which is set in advance. Alternatively, the particular condition may be set in relation to the current value and the time.

What is claimed is:

1. A electric vehicle comprising:
a drive wheel which is driven by a traction electric motor;
a brake command device which can be operated by a driver;
a brake releasing unit which is driven by supply of electricity;
a brake shaft which can be rotated in two directions, wherein the brake shaft is rotatable in a brake realizing direction which is one of the two directions by an operation of the brake command device, and rotatable in a brake releasing direction which is the other one of the two directions by driving of the brake releasing unit;
a friction plate which is operatively connected to the traction electric motor and which is frictionally braked when the brake shaft is rotated in the brake realizing direction; and
a braking spring which applies an elastic force to the brake shaft in a direction to rotate the brake shaft in the brake realizing direction, wherein
the brake releasing unit comprises:
a brake releasing motor which is driven by supply of electricity;
a displacement member which is displaced by driving of the brake releasing motor; and
a displacement permitting spring provided between the displacement member and the brake shaft, and which permits an elastic relative displacement between the displacement member and the brake shaft and applies an elastic force to the brake shaft in a direction to maintain a relative position between the brake shaft and the displacement permitting spring, and
the brake releasing motor rotates the brake shaft against the elastic force of the braking spring in the brake releasing direction through the displacement member and the displacement permitting spring.

2. The electric vehicle according to claim 1, further comprising:
a protection unit which protects the brake releasing motor.

3. The electric vehicle according to claim 2, wherein
the protection unit comprises an actuator which is provided in the brake releasing unit, which is driven by supply of electricity in a state where the brake shaft is rotated by a predetermined angle which is set in advance in the brake releasing direction, to disable the displacement of the displacement member, and which, with stopping of the supply of electricity, enables the displacement of the displacement member and permits rotation of the brake shaft in the brake realizing direction by the braking spring.

4. The electric vehicle according to claim 2, wherein
the protection unit comprises an input current varying mechanism which is provided in the brake releasing unit, and which reduces a current which is input to the brake releasing motor as an amount of displacement is increased when the displacement member is displaced in the brake releasing direction.

5. The electric vehicle according to claim 2, wherein
the protection unit comprises an operative connection mechanism, a lock-type one-way clutch, and an electromagnetic clutch provided in the brake releasing unit,
the operative connection mechanism is provided between a rotational shaft of the brake releasing motor and the displacement member and operatively connects the rotational shaft and the displacement member,
the lock-type one-way clutch is provided in the operative connection mechanism, transmits a rotational force by driving of the brake releasing motor to the side of the displacement member, and blocks transmission of a rotational force from the side of the displacement member to the brake releasing motor by stopping the rotation of a rotational member on the side of the displacement member, and
the electromagnetic clutch is provided in the operative connection mechanism, enables transmission of motive power between the side of the brake releasing motor and the side of the displacement member when electricity is supplied, and blocks the transmission of motive power between the side of the brake releasing motor and the side of the displacement member when the supply of electricity is stopped.

6. A electric vehicle comprising:
a drive wheel which is driven by a traction electric motor;
a brake command device which can be operated by a driver;
a brake releasing unit which is driven by supply of electricity;
a brake shaft which can be rotated in two directions, wherein the brake shaft is rotatable in a brake realizing direction which is one of the two directions by an operation of the brake command device; and
a friction plate which is operatively connected to the traction electric motor and which is frictionally braked when the brake shaft is rotated in the brake realizing direction, wherein the brake releasing unit comprises an electromagnetic brake or a link-type actuator which is driven by supply of electricity and enables free rotation of a rotational shaft of the traction electric motor or of a coupled rotational member which is rotated in a coupled manner with the rotational shaft of the traction electric motor, and the driving of which is stopped by stopping of the supply of electricity, to block the rotation of the rotational shaft of the traction electric motor or the rotation of the coupled rotational member, or a short-circuiting brake device which short-circuits intermediate points of phase arms of an inverter which drives the traction electric motor.

* * * * *